United States Patent
Murata et al.

(10) Patent No.: US 6,445,833 B1
(45) Date of Patent: Sep. 3, 2002

(54) DEVICE AND METHOD FOR CONVERTING TWO-DIMENSIONAL VIDEO INTO THREE-DIMENSIONAL VIDEO

(75) Inventors: Haruhiko Murata, Takatsuki; Yukio Mori, Kadoma; Shuugo Yamashita, Kadoma; Akihiro Maenaka, Kadoma; Seiji Okada, Moriguchi; Kanji Ihara, Higashiosaka, all of (JP)

(73) Assignee: Sanyo Electric Co., Ltd, Osaka (JP)

( * ) Notice: Subject to any disclaimer, the term of this patent is extended or adjusted under 35 U.S.C. 154(b) by 0 days.

(21) Appl. No.: 09/147,518

(22) PCT Filed: Jul. 16, 1997

(86) PCT No.: PCT/JP97/02471

§ 371 (c)(1),
(2), (4) Date: Jan. 13, 1999

(87) PCT Pub. No.: WO98/04087

PCT Pub. Date: Jan. 29, 1998

(30) Foreign Application Priority Data

Jul. 18, 1996 (JP) .............................. 8-189629
Aug. 7, 1996 (JP) .............................. 8-208172
Aug. 7, 1996 (JP) .............................. 8-208173
Sep. 11, 1996 (JP) .............................. 8-240408
Jun. 17, 1997 (JP) .............................. 9-159949

(51) Int. Cl.$^7$ ................................................ G06K 9/36
(52) U.S. Cl. ...................... 382/285; 382/154; 345/419; 356/12; 348/42
(58) Field of Search .................. 382/298, 285, 382/154, 276, 282; 345/473, 419, 433, 664, 679; 356/12; 348/42, 43, 44, 47, 45, 51, 699

(56) References Cited

U.S. PATENT DOCUMENTS

| 5,510,832 A | * | 4/1996 | Garcia ........................... 348/56 |
| 5,682,437 A | * | 10/1997 | Okino et al. ................... 382/100 |
| 5,748,199 A | * | 5/1998 | Palm ............................. 345/473 |
| 5,777,666 A | * | 7/1998 | Tanase et al. ................... 348/13 |
| 5,891,030 A | * | 4/1999 | Johnson et al. ................. 600/407 |
| 5,963,664 A | * | 10/1999 | Kumar et al. ................... 382/154 |

FOREIGN PATENT DOCUMENTS

| EP | 0665697 A2 | 8/1995 |
| EP | 0703716 A2 | 3/1996 |
| JP | 63-232790 | 9/1988 |
| JP | 7-107518 | 4/1995 |
| JP | 7-182533 | 7/1995 |
| JP | 7-222201 | 8/1995 |

OTHER PUBLICATIONS

Abstract of Japanese Patent Publ. No. 63232790; dated Sep. 28, 1988.

* cited by examiner

*Primary Examiner*—Bhavesh Mehta
*Assistant Examiner*—Yosef Kassa
(74) *Attorney, Agent, or Firm*—Arent Fox Kintner Plotkin & Kahn, PLLC

(57) ABSTRACT

A perspective image characteristic value is extracted from a 2D input image signal for each of plural parallax calculation regions defined in a one-field screen on a field-by-field basis. Parallax information per predetermined unit area of the one-field screen is generated by using the perspective image characteristic value extracted per parallax calculation region. A first image signal and a second image signal are generated from a signal of the 2D input image signal which resides in each predetermined unit area, the first and second image signals having a horizontal phase difference therebetween based on the parallax information on the predetermined unit area.

13 Claims, 50 Drawing Sheets

FIG. 15

| F1 | F2 | F3 | F4 | F5 | F6 | F7 | F8 | F9 | F10 |
|---|---|---|---|---|---|---|---|---|---|
| F11 | F12 | F13 | F14 | F15 | F16 | F17 | F18 | F19 | F20 |
| F21 | F22 | F23 | F24 | F25 | F26 | F27 | F28 | F29 | F30 |
| F31 | F32 | F33 | F34 | F35 | F36 | F37 | F38 | F39 | F40 |
| F41 | F42 | F43 | F44 | F45 | F46 | F47 | F48 | F49 | F50 |
| F51 | F52 | F53 | F54 | F55 | F56 | F57 | F58 | F59 | F60 |

FIG. 17

| 2 | 2 | 1 | 1 | 0 | 0 | 1 | 1 | 2 | 2 |
|---|---|---|---|---|---|---|---|---|---|
| 2 | 2 | 4 | 4 | 6 | 6 | 4 | 4 | 2 | 2 |
| 2 | 4 | 6 | 8 | 10 | 10 | 8 | 6 | 4 | 2 |
| 4 | 6 | 8 | 8 | 10 | 10 | 8 | 8 | 6 | 4 |
| 2 | (4) | (6) | (6) | (8) | (8) | (6) | (6) | (4) | 2 |
| 2 | 2 | (4) | (4) | (6) | (6) | (4) | (4) | 2 | 2 |

| PARALLAX UL | HORIZONTAL ADDRESS | | | | |
|---|---|---|---|---|---|
| VERTICAL ADDRESS | | 0~m | m~2m | 2m~3m | 3m~4m | 4m~0 |
| | 0~n | E1 | E1 | E2 | E3 | E4 |
| | n~2n | E1 | E1 | E2 | E3 | E4 |
| | 2n~3n | E5 | E5 | E6 | E7 | E8 |
| | 3n~4n | E9 | E9 | E10 | E11 | E12 |

(b)

| PARALLAX UR | HORIZONTAL ADDRESS | | | | |
|---|---|---|---|---|---|
| VERTICAL ADDRESS | | 0~m | m~2m | 2m~3m | 3m~4m | 4m~0 |
| | 0~n | E1 | E2 | E3 | E4 | E4 |
| | n~2n | E1 | E2 | E3 | E4 | E4 |
| | 2n~3n | E5 | E6 | E7 | E8 | E8 |
| | 3n~4n | E9 | E10 | E11 | E12 | E12 |

(c)

| PARALLAX DL | HORIZONTAL ADDRESS | | | | |
|---|---|---|---|---|---|
| VERTICAL ADDRESS | | 0~m | m~2m | 2m~3m | 3m~4m | 4m~0 |
| | 0~n | E1 | E1 | E2 | E3 | E4 |
| | n~2n | E5 | E5 | E6 | E7 | E8 |
| | 2n~3n | E9 | E9 | E10 | E11 | E12 |
| | 3n~4n | E9 | E9 | E10 | E11 | E12 |

(d)

| PARALLAX DR | HORIZONTAL ADDRESS | | | | |
|---|---|---|---|---|---|
| VERTICAL ADDRESS | | 0~m | m~2m | 2m~3m | 3m~4m | 4m~0 |
| | 0~n | E1 | E2 | E3 | E4 | E4 |
| | n~2n | E5 | E6 | E7 | E8 | E8 |
| | 2n~3n | E9 | E10 | E11 | E12 | E12 |
| | 3n~4n | E9 | E10 | E11 | E12 | E12 |

NOTE: "0~m" DENOTING A RANGE OF NOT LESS THAN "0" AND LESS THAN "m"

| G1 | G1 | G1 | G1 | G3 | G3 |
|----|----|----|----|----|----|
| G1 | G1 | G1 | G1 | G3 | G3 |
| G1 | G1 | G1 | G1 | G3 | G3 |
| G1 | G5 | G4 | G4 | G4 | G2 |
| G1 | G5 | G4 | G4 | G4 | G2 |
| G1 | G4 | G4 | G4 | G4 | G2 |
| G1 | G1 | G4 | G3 | G3 | G2 |
| G1 | G1 | G1 | G1 | G1 | G1 |
| G1 | G1 | G1 | G1 | G1 | G1 |
| G1 | G1 | G1 | G1 | G1 | G3 |

FIG. 37

| 1 | 1 | 1 | 2 | 2 | 2 | 2 | 1 | 1 | 1 |
|---|---|---|---|---|---|---|---|---|---|
| 1 | 1 | 1 | 2 | 3 | 4 | 4 | 2 | 1 | 1 |
| 2 | 2 | 2 | 3 | 4 | 6 | 6 | 3 | 2 | 2 |
| 3 | 3 | 4 | 4 | 6 | 6 | 6 | 4 | 3 | 3 |
| 4 | 4 | 5 | 5 | 6 | 7 | 7 | 5 | 4 | 4 |
| 5 | 5 | 5 | 6 | 6 | 7 | 7 | 5 | 5 | 5 |

FIG. 39

| 2 | 2 | 2 | 4 | 2 | 2 |
|---|---|---|---|---|---|
| 2 | 2 | 4 | 6 | (4) | 2 |
| 1 | 4 | 6 | 8 | (6) | (4) |
| 1 | 4 | 8 | 8 | (6) | (4) |
| 0 | 6 | 10 | 10 | (8) | (6) |
| 0 | 6 | 10 | 10 | (8) | (6) |
| 1 | 4 | 8 | 8 | (6) | (4) |
| 1 | 4 | 6 | 8 | (6) | (4) |
| 2 | 2 | 4 | 6 | (4) | 2 |
| 2 | 2 | 2 | 4 | 2 | 2 |

DEVICE AND METHOD FOR CONVERTING TWO-DIMENSIONAL VIDEO INTO THREE-DIMENSIONAL VIDEO

BACKGROUND OF THE INVENTION

1. Field of the Invention

The present invention relates generally to an apparatus and method for converting two-dimensional images into three-dimensional images.

2. Related Art

[1] There has been known a method for converting 2D images into 3D images, which method utilizes field memories for generating an image signal (hereinafter referred to as "delayed image signal") time-delayed relative to an original 2D image signal so as to output either one of the original 2D image signal and the delayed image signal as a left-eye image signal and the other as a right-eye image signal. Unfortunately, however, this method has a disadvantage of high costs because the field memories are necessary for generating the image signal time-delayed relative to the original 2D image signal. In addition, this method is adapted to convert only 2D motion images into 3D motion images.

It is, therefore, an object of the invention to provide an apparatus and method for converting the 2D images into the 3D images, which apparatus and method negate the need for the field memories for generating the image signal time-delayed relative to the original 2D image signal, thereby accomplishing the cost reduction.

It is another object of the invention to provide an apparatus and method for converting the 2D images into the 3D images, which apparatus and method are adapted to produce stereoscopic images even from the original 2D image signal representing still images.

[2] There has already been developed an apparatus for providing a stereoscopic image by committing a signal to display on a 3D display unit, the signal representing a 3D image composed of a left-eye image and a right-eye image having parallax therebetween. Furthermore, an apparatus for generating a 3D image signal from a 2D image signal has already been developed.

However, an apparatus has yet to be developed which is adapted to perform a real-time processing on the 3D image signal for adjustment of a stereoscopic effect of the 3D images produced from the 3D image signal.

It is, therefore, an object of the invention to provide an apparatus and method for performing the real-time processing on the 3D image signal for adjustment of the stereoscopic effect of the 3D images produced from the 3D image signal.

[3] There has been known a 2D/3D image converter which generates, from a 2D image, a first image signal used as a reference and a second image signal time-delayed relative to the first image signal and outputs either one of these image signals as the left-eye image signal and the other as the right-eye image signal thereby converting the 2D image into the 3D image.

As to the first image signal, the original 2D image signal is used as it is. A delay value of the second image signal relative to the first image signal depends upon a motion speed of an image represented the 2D image signal. The second image signal is generated in the following manner.

More specifically, a predetermined number of fields of the 2D image signal inputted in the 2D/3D image converter, which precede the current field, are stored in a plurality of field memories on a field-by-field basis. Then, out of the 2D image signals stored in the respective field memories, read out is a 2D image signal having a delay value determined based on the motion speed of the image represented by the 2D image signal. The 2D image signal read out from the field memory is the second image signal. The left-eye and right-eye image signals thus obtained are each changed in rate to twice the normal rate in order to prevent the occurrence of flickers when the left-eye and right-eye images are viewed through a time division shutter glasses.

FIG. 55 diagrammatically illustrates a construction of a prior-art 2D/3D image converter for generating a double-speed 3D image signal from the 2D image signal.

The 2D/3D image converter includes an integrated circuit (LSI) 1100 for converting the 2D image signal into the 3D image signal, a plurality of delay field memories 1200 connected to the integrated circuit 1100, and a doubling circuit 1300 for doubling frequencies of the left-eye and right-eye image signals outputted from the integrated circuit 1100.

FIG. 55 shows only components of the integrated circuit 1100 that are involved in the writing of data to and the reading of data from the delay field memories 1200. More specifically, the figure shows the components of the integrated circuit 1100, which include a write data path 1101, a write timing generating section 1102, a read data path 1103 and a read timing generating section 1104. Besides these components, the integrated circuit 1100 includes a motion vector sensing section, an interface connected to a CPU, and the like.

The write timing generating section 1102 and the read timing generating section 1104 are each supplied with a reference clock signal CLK generated based on a horizontal synchronizing signal HSYNC of the 2D image signal, a vertical synchronizing signal VSYNC of the 2D image signal, and a horizontal synchronizing signal HD generated based on the horizontal synchronizing signal Hsync as timed to the reference clock signal CLK. A frequency $f_{CLK}$ of the reference clock signal CLK is given by the following equation (1) with $f_H$ denoting a frequency of the horizontal synchronizing signal HD:

$$f_{CLK} = 910 f_H \tag{1}$$

The integrated circuit (LSI) 1100 is supplied with a luminance signal (Y signal) and color difference signals (R-Y and B-Y signals) which three signals compose the 2D image signal. The integrated circuit 1100 outputs the right-eye and left-eye image signals having a relative time difference therebetween. The right-eye image signal is composed of a right-eye luminance signal Y(R) and right-eye color difference signals R-Y(R) and B-Y(R) whereas the left-eye image signal is composed of a left-eye luminance signal Y(L) and color difference signals R-Y(L) and B-Y(L).

Either one of the right-eye and left-eye image signals is generated from a signal of the 2D image signal inputted in the integrated circuit 1100, which signal is sent to the read data path 1103 via the write data path 1101. The other of the right-eye and left-eye image signals is generated from a signal of the 2D image signal inputted in the integrated circuit 1100, which signal is sent to the read data path 1103 via the write data path 1101 and the delay field memory 1200.

The Y, R-Y and B-Y signals inputted in the write data path 1101 are written to the field memories 1200 based on the reference signal CLK. Specifically, a clock frequency for writing to the delay field memories 1200 is equal to the frequency $f_{CLK}$ of the reference clock signal CLK.

The signals stored in the field memories 1200 are read out based on the reference clock signal CLK. That is, a clock frequency for reading from the delay field a memories 1200 is also equal to the frequency $f_{CLK}$ of the reference clock signal CLK.

Accordingly, the right-eye luminance signal Y(R) the right-eye color difference signals R-Y (R) and B-Y (R) the left-eye luminance signal Y (L), and the left-eye color difference signals R-Y (L) and B-Y (L), which are outputted from the integrated circuit 1100, each have the same horizontal and vertical frequencies with the horizontal and vertical frequencies of the 2D image signals.

The doubling circuit 1300 includes double-speed field memories 1301–1306 for respectively storing the right-eye luminance signal Y (R), the right-eye color difference signals R-Y (R) and B-Y (R), the left-eye luminance signal Y (L), and the left-eye color difference signals R-Y (L) and B-Y (L), which are outputted from the integrated circuit 1100; a double-speed field-memory write timing generating circuit 1307 for controlling the writing of data to these double-speed field memories 1301–1306, and a double-speed field-memory read timing generating circuit 1308 for controlling the reading of data from these double-speed field memories 1301–1306.

When the right-eye image signal is read out, the right-eye luminance signal Y (R) is read out from the double-speed field memory 1301, the right-eye color difference signal R-Y (R) is read out from the double-speed field memory 1302, and the right-eye color difference signal B-Y (R) is read out from the double-speed field memory 1303. When the left-eye image signal is read out, the left-eye luminance signal Y (L) is read out from the double-speed field memory 1304, the left-eye color difference signal R-Y (L) is read out from the double-speed field memory 1305 and the left-eye color difference signal B-Y (L) is read out from the double-speed field memory 1306.

The reference clock signal CLK is applied as the writing clock to the double-speed field memories 1301–1306 and the double-speed field-memory write timing generating circuit 1307. A clock signal CLKa with a frequency twice the frequency of the reference clock signal CLK is applied as the reading clock to the double-speed field memories 1301–1306 and the double-speed field-memory read timing generating circuit 1308.

As indicated by the following equation (2), a frequency $f_{CLKa}$ of the read clock signal CLKa is twice the frequency $f_{CLK}$ of the write clock signal CLK:

$$f_{CLKa}=2f_{CLK} \quad (2)$$

Thus, an image signal outputted from the doubling circuit 1300 has horizontal and vertical frequencies twice the horizontal and vertical frequencies of the 2D image signal.

FIG. 56 is a timing chart showing signals in respective parts of an arrangement wherein four delay field memories are provided and the left-eye image signal is delayed relative to the right-eye image signal by two fields.

The prior-art 2D/3D image converter requires the doubling circuit including the field memories for generating the double-speed 3D image signal, thus suffering high costs.

It is therefore, an object of the invention to provide a 2D/3D image converter which includes a reduced number of field memories from that of field memories in the prior-art image converter and hence, accomplishes the cost reduction.

DISCLOSURE OF THE INVENTION

A first apparatus for converting two-dimensional images into three-dimensional images according to the invention comprises characteristic value extracting means for extracting, from an inputted two-dimensional image signal, a perspective image characteristic value of each of plural parallax calculation regions defined in a one-field screen on a field-by-field basis; parallax information generating means for generating parallax information on each of predetermined unit areas in the one-field screen by using the image characteristic value extracted per parallax calculation region; and phase control means for generating a first image signal and a second image signal from a signal of the inputted two-dimensional image signal which resides in each predetermined unit area, the first and second image signals having a horizontal phase difference therebetween based on the parallax information related to the predetermined unit area.

For example, the parallax information generating means includes means for generating perspective image information per parallax calculation region by using the perspective image characteristic value of each parallax calculation region; and means for converting the perspective image information per parallax calculation region into parallax information per parallax calculation region.

For example, the parallax information generating means includes means for generating perspective image information per parallax calculation region by using the perspective image characteristic value of each parallax calculation region; means for correcting a perspective image information piece on a parallax calculation region which is included in a group of parallax calculation regions located vertically lower in screen (hereinafter referred to as "vertical screen position") than a parallax calculation region having a perspective image information piece indicative of the nearest perspective position and which has a perspective image information piece indicative of a perspective position a predetermined value or more farther from a perspective position indicated by a perspective image information piece on a parallax calculation region immediately thereabove, the perspective image information piece on the former parallax calculation region being corrected to indicate a perspective position closer to that indicated by the perspective image information piece on the latter parallax calculation region; and means for converting the corrected perspective image information piece on each parallax calculation region into a parallax information piece on each parallax calculation region.

For example, the parallax information generating means includes first means for dividing all the parallax calculation regions in the one-field screen into groups associated with respective objects included in the one-field screen by using the perspective image characteristic value of each parallax calculation region; second means for generating perspective image information per group by using grouping results given by the first means and the perspective image characteristic value of each parallax calculation region; third means for generating perspective image information per parallax calculation region by using the perspective image information per group; and fourth means for converting the perspective image information per parallax calculation region into parallax information per parallax calculation region.

The first means has the following features:

(1) The first means is adapted to divide all the regions in the one-field screen into groups based on a histogram showing a number of parallax calculation regions for each perspective characteristic value, each group including parallax calculation regions with perspective image characteristic values close to one another.

(2) The first means includes means for dividing all the regions in the one-field screen into groups based on a histogram showing a number of parallax calculation regions for each perspective image characteristic value, each group including parallax calculation regions with perspective image characteristic values close to one another; and means which, when a single group includes a plurality of regions spatially separated from each other, divides the spatially separated regions into different groups.

(3) The first means includes means for dividing all the regions in the one-field screen into groups based on a histogram showing a number of parallax calculation regions for each perspective image characteristic value, each group including parallax calculation regions with perspective image characteristic values close to one another; means which, when a single group includes a plurality of regions spatially separated from each other, divides the spatially separated regions into different groups; and means which, when there is a group including a predetermined number of parallax calculation regions or fewer, checks perspective image characteristic values of the parallax calculation regions of the group and parallax calculation regions adjacent to the group to determine whether or not to combine the group with any one of neighboring groups, and combines the group with the neighboring group when the group is determined to be combined therewith.

(4) The first means includes means for dividing all the regions of the one-field screen into groups based on a histogram showing a number of parallax calculation regions for each perspective image characteristic value, each group including parallax calculation regions with perspective image characteristic values close to one another; means which, when a single group includes a plurality of regions spatially separated from each other, divides the spatially separated regions into different groups; means which, when there is a group including a predetermined number of parallax calculation regions or fewer, checks perspective image characteristic values of the parallax calculation regions of the group and parallax calculation regions adjacent to the group to determine whether or not to combine the group with any one of neighboring groups, and combines the group with the neighboring group when the group is determined to be combined therewith; and means which checks perspective image characteristic values of parallax calculation regions of adjacent groups to determine whether to combine them together or not, and combines the two groups together when they are determined to be combined together.

For example, the second means is adapted to calculate the perspective image information on each group by using the perspective image characteristic value of each parallax calculation region of each group and a weighting factor previously defined for each parallax calculation region.

The third means has the following features:

(1) The third means includes means for correcting a perspective image information piece on a parallax calculation region which is included in a group of parallax calculation regions located vertically lower in screen than a parallax calculation region having a perspective image information piece indicative of the nearest perspective position and which has a perspective image information piece indicative of a perspective position a predetermined value or more farther from a perspective position indicated by a perspective image information piece on a parallax calculation region immediately thereabove, the perspective image information piece on the former parallax calculation region being corrected to indicate a closer perspective position to that indicated by the perspective image information piece on the latter parallax calculation region.

(2) The third means includes means for correcting a perspective image information piece on a parallax calculation region which is included in a group of parallax calculation regions located vertically lower in screen than a parallax calculation region having a perspective image information piece indicative of the nearest perspective position and which has a perspective image information piece indicative of a perspective position a predetermined value or more farther from a perspective position indicated by a perspective image information piece on a parallax calculation region immediately thereabove, the perspective image information piece on the former parallax calculation region being corrected to indicate a closer perspective position to that indicated by the perspective image information piece on the latter parallax calculation region; and means for correcting perspective image information pieces on respective pairs of parallax calculation regions included in adjacent groups and defining a boundary portion therebetween, thereby to limit a difference between the perspective image information pieces on the respective pairs within a predetermined range.

(3) The third means includes means for correcting a perspective image information piece on a parallax calculation region which is included in a group of parallax calculation regions located vertically lower in screen than a parallax calculation region having a perspective image information piece indicative of the nearest perspective position and which has a perspective image information piece indicative of a perspective position a predetermined value or more farther from a perspective position indicated by a perspective image information piece on a parallax calculation region immediately thereabove, the perspective image information piece on the former parallax calculation region being corrected to indicate a closer perspective position to that indicated by the perspective image information piece on the latter parallax calculation region; means for correcting perspective image information pieces on respective pairs of parallax calculation regions included in adjacent groups and defining a boundary portion therebetween thereby to limit a difference between the perspective image information pieces on the respective pairs within a predetermined range; and means for smoothing perspective image information pieces on parallax calculation regions of the same group thereby to limit a difference in the perspective image information pieces thereon within a predetermined range.

For example, the phase control means includes first storage means having a capacity to store the two-dimensional image signal representing up to the number of pixels included in one horizontal line and temporarily storing the two-dimensional image signal; second storage means having a capacity to store the two-dimensional image signal representing up to the number of pixels included in one horizontal line and temporarily storing the two-dimensional image signal; first read-address control means which controls a read address of the first storage means relatively to a standard read address decided based on a horizontal/vertical position of the inputted two-dimensional image signal according to the parallax information related to the predetermined unit area including the horizontal/vertical position of the inputted two-dimensional image signal, thereby generating the first image signal a horizontal phase of which leads from a reference horizontal phase defined by said standard read address by a value based on said parallax information; and second read-address control means which controls a read address of the second storage means relatively to said standard read address according to the parallax information related to the predetermined unit area including the horizontal/vertical position of the inputted two-dimensional image signal, thereby generating the second image signal a horizontal phase of which lags from the reference horizontal phase defined by said standard read address by a value based on said parallax information.

For example, the perspective image characteristic value is an optional one selected from the group consisting of luminance high-frequency component integration value, luminance contrast, luminance integration value, R-Y component integration value, B-Y component integration value and chrome integration value or an optional combination of the above. The luminance high-frequency component is meant to define high-frequency parts of frequency components of the luminance signal. The luminance contrast is meant to define intermediate-frequency parts of the frequency components of the luminance signal. The luminance integration value is meant to define a DC component of the frequency components of the luminance signal. The predetermined unit area is an area consisting of one pixel, for example.

A method for converting two-dimensional images into three-dimensional images comprising the steps of a first step of extracting, from an inputted two-dimensional image signal, a perspective image characteristic value of each of plural parallax calculation regions defined in a one-field screen on a field-by-field basis; a second step of generating parallax information on each of predetermined unit areas in the one-field screen by using the image characteristic value extracted per parallax calculation region; and a third step of generating a first image signal and a second image signal from a signal of the inputted two-dimensional image signal which resides in each predetermined unit area, the first and second image signals having a horizontal phase difference therebetween based on the parallax information related to the predetermined unit area.

For example, the second step includes a step of generating perspective image information on each parallax calculation region by using the perspective image characteristic value of each parallax calculation region; and a step of converting the perspective image information per parallax calculation region into parallax information per parallax calculation region.

For example, the second step includes a step of generating perspective image information on each parallax calculation region by using the perspective image characteristic value of each parallax calculation region; a step of correcting a perspective image information piece on a parallax calculation region which is included in a group of parallax calculation regions located vertically lower in screen than a parallax calculation region having a perspective image information piece indicative of the nearest perspective position and which has a perspective image information piece indicative of a perspective position a predetermined value or more farther from a perspective position indicated by a perspective image information piece on a parallax calculation region immediately thereabove, the perspective image information piece on the former parallax calculation region being corrected to indicate a closer perspective position to that indicated by the perspective image information piece on the latter parallax calculation region; and a step of converting the corrected perspective image information piece on each parallax calculation region into parallax information piece on each parallax calculation region.

For example, the third step includes a step of temporarily storing the inputted two-dimensional image signal in first storage means and second storage means, each storage means capable of storing the inputted two-dimensional image signal representing up to the number of pixels included in one horizontal line; a step of controlling a read address of the first storage means relatively to a standard read address decided based on a horizontal/vertical position of the inputted two-dimensional image signal according to parallax information related to a predetermined unit area including the horizontal/vertical position of the inputted two-dimensional image signal, thereby generating the first image signal a horizontal phase of which leads from a reference horizontal phase defined by said standard read address by a value based on said parallax information; and a step of controlling a read address of the second storage means relatively to said standard read address according to the parallax information related to the predetermined unit area including the horizontal/vertical position of the inputted two-dimensional image signal, thereby generating the second image signal a horizontal phase of which lags from the reference horizontal phase defined by said standard read address by a value based on said parallax information.

As the perspective image characteristic value, there is used an optional one selected from the group consisting of luminance high-frequency component integration value, luminance contrast, luminance integration value and chroma integration value or an optional combination of the above. Specifically, the luminance high-frequency component integration value may be used as the perspective image characteristic value. Otherwise, the luminance contrast may be used as the perspective image characteristic value. A combination of the luminance high-frequency component integration value and the luminance contrast may be used as the perspective image characteristic value. Alternatively, a combination of the luminance high-frequency component integration value, the luminance contrast and the luminance integration value may be used as the perspective image characteristic value. Further, a combination of the luminance high-frequency component integration value, the luminance contrast and the chroma integration value may be used as the perspective image characteristic value. Alternatively, a combination of the luminance high-frequency component integration value, the luminance contrast, the luminance integration value and the chroma integration value may be used as the perspective image characteristic value.

The predetermined unit area consists of one pixel, for example.

A second apparatus for converting two-dimensional images into three-dimensional images according to the invention comprises motion vector sensing means for sensing, from an inputted two-dimensional image signal, a motion vector of each of plural motion-vector detection regions defined in a one-field screen on a field-by-field basis; parallax information generating means for generating parallax information on each predetermined unit area in the one-field screen by using a horizontal component of the motion vector sensed per motion-vector detection region; and phase control means for generating a first image signal and a second image signal from a signal of the inputted two-dimensional image signal which resides in each predetermined unit area, the first and second image signals having a horizontal phase difference therebetween based on parallax information related to the predetermined unit area.

For example, the parallax information generating means is adapted to generate the parallax information per predetermined unit area of the one-field screen based on a horizontal component of the motion vector sensed per motion-vector detection region, a maximum horizontal component value, a motion vector detection region presenting the maximum horizontal component value, a minimum horizontal component value, a motion-vector detection region presenting the minimum horizontal component value, and information indicative of whether an image corresponding to each motion-vector detection region represents an object or a background.

For example, the phase control means includes first storage means having a capacity to store the inputted two-dimensional image signal representing up to the number of pixels included in one horizontal line and temporarily storing the inputted two-dimensional image signal; second storage means having a capacity to store the inputted two-dimensional image signal representing up to the number of pixels included in one horizontal line and temporarily storing the inputted two-dimensional image signal; first read-address control means which controls a read address of the first storage means relatively to a standard read address decided based on a horizontal/vertical position of the inputted two-dimensional image signal according to parallax information on a predetermined unit area including the horizontal/vertical position of the inputted two-dimensional image signal, thereby generating the first image signal a horizontal phase of which leads from a reference horizontal phase defined by said standard read address by a value based on said parallax information; and second read-address control means which controls a read address of the second storage means relatively to said standard read address according to the parallax information on the predetermined unit area including the horizontal/vertical position of the inputted two-dimensional image signal, thereby generating the second image signal a horizontal phase of which lags from the reference horizontal phase defined by said standard read address by a value based on said parallax information.

The predetermined unit area is an area consisting of one pixel, for example.

A second method for converting two-dimensional images into three-dimensional images according to the invention comprises the steps of a first step of sensing, from an inputted two-dimensional image signal, a motion vector of each of plural motion-vector detection regions defined in a one-field screen on a field-by-field basis; a second step of generating parallax information on each predetermined unit area in the one-field screen by using a horizontal component of the motion vector sensed per motion-vector detection region; and a third step of generating a first image signal and a second image signal from a signal of the inputted two-dimensional image signal which resides in each predetermined unit area, the first and second image signals having a horizontal phase difference therebetween based on parallax information related to the predetermined unit area.

In the second step, for example, the parallax information is generated per predetermined unit area of the one-field screen by using a horizontal component of the motion vector sensed per motion-vector detection region, a maximum horizontal component value, a motion-vector detection region presenting the maximum horizontal component value, a minimum horizontal component value, a motion-vector detection region presenting the minimum horizontal component value, and information indicative of whether an image corresponding to each motion-vector detection region represents an object or a background.

For example, the third step includes a step of temporarily storing the inputted two-dimensional image signal in first storage means and second storage means, each storage means having a capacity to store the inputted two-dimensional image signal representing up to the number of pixels included in one horizontal line; a step of controlling a read address of the first storage means relatively to a standard read address decided based on a horizontal/vertical position of the inputted two-dimensional image signal according to parallax information related to a predetermined unit area including the horizontal/vertical position of the inputted two-dimensional image signal, thereby generating the first image signal a horizontal phase of which leads from a reference horizontal phase defined by said standard read address by a value based on the parallax information; and a step of controlling a read address of the second storage means relatively to said standard read address according to the parallax information related to the predetermined unit area including the horizontal/vertical position of the inputted two-dimensional image signal, thereby generating the second image signal a horizontal phase of which lags from the reference horizontal phase defined by said standard read address by a value based on said parallax information.

The predetermined area consists of one pixel, for example.

A first stereoscopic effect adjusting method for adjusting a stereoscopic effect of a tree-dimensional image according to the invention is characterized by controlling a sharpness of an image contour per predetermined unit area of the three-dimensional image according to perspective image information on each predetermined unit area of a one-field screen displaying the three-dimensional image. The predetermined area consists of one pixel, for example.

More specifically, the sharpness of the image contour is controlled such that an area representing a near-view image is increased in the sharpness of the image contour while an area representing a distant-view image is decreased in the sharpness of the image contour. This enhances the stereoscopic effect of the reproduced image because the human eye perceives the nearer object in the sharper outline and the more distant object in the more blurred outline.

A second stereoscopic effect adjusting method for adjusting a stereoscopic effect of a three-dimensional image according to the invention is characterized by controlling a chroma per predetermined unit area of the three-dimensional image according to perspective image information on each predetermined unit area of a one-field screen displaying the three-dimensional image. The predetermined unit area consists of one pixel, for example.

More specifically, the chroma of the image is controlled such that an area representing a near-view image is increased in the image chroma while an area representing a distant-view image is decreased in the image chroma. This enhances the stereoscopic effect of the reproduced image because the human eye perceives the nearer object in the more vivid colors and the more distant object in the paler colors.

A third stereoscopic effect adjusting method for adjusting a stereoscopic effect of a three-dimensional image according to the invention is characterized by controlling a sharpness of an image contour and a chroma per predetermined unit area of the three-dimensional image according to perspective image information on each predetermined unit area of a one-field screen displaying the three-dimensional image. The predetermined unit area consists of one pixel, for example.

More specifically, the sharpness of the image contour is controlled such that an area representing a near-view image is increased in the sharpness of the image contour while an area representing a distant-view image is decreased in the sharpness of the image contour and that the area representing the near-view image is increased in the image chroma while the area representing the distant-view image is decreased in the image chroma. This enhances the stereoscopic effect of the reproduced image because the human eye perceives the nearer object in the sharper outline and the more vivid colors but the more distant object in the more blurred outline and the paler colors.

A first stereoscopic effect adjusting apparatus comprises image contour controlling means for controlling a sharpness of an image contour per predetermined unit area of a three-dimensional image according to perspective image information on each predetermined unit area of a one-field screen displaying the three-dimensional image. The predetermined unit area is an area consisting of one pixel, for example.

For example, the image contour controlling means is adapted to control the sharpness of image contour such that an area representing a near-view image is increased in the sharpness of image contour while an area representing a distant-view image is decreased in the sharpness of image contour. This enhances the stereoscopic effect of the reproduced image because the human eye perceives the nearer object in the sharper outline but the more distant object in the more blurred outline.

A specific example of the image contour controlling means is adapted to decrease a ratio of a low-frequency component and to increase a ratio of a high-frequency component of the three-dimensional image signal in an area representing a near-view image, and to increase a ratio of the low-frequency component and to decrease a ratio of the high-frequency component of the three-dimensional image signal in an area representing a distant-view image.

A second stereoscopic effect adjusting apparatus according to the invention comprises chroma controlling means for controlling a chroma of each predetermined unit area of a three-dimensional image according to perspective image information on each predetermined unit area of a one-field screen displaying the three-dimensional image. The predetermined unit area is an area consisting of one pixel, for example.

For example, the chroma controlling means is adapted to control the image chroma by increasing an image chroma of an area representing a near-view image and by decreasing an image chroma of an area representing a distant-view image. This enhances the stereoscopic effect of the reproduced image because the human eye perceives the nearer object in the more vivid colors but the more distant object in the paler colors.

A third stereoscopic effect adjusting apparatus according to the invention comprises image contour controlling means for controlling a sharpness of an image contour per predetermined unit area of a three-dimensional image according to perspective image information on each predetermined unit area of a one-field screen displaying the three-dimensional image; and chroma controlling means for controlling a chroma per predetermined unit area of the three-dimensional image according to the perspective image information on each predetermined unit area of the one-field screen displaying the three-dimensional image. The predetermined unit area is an area consisting of one pixel, for example.

For example, the image contour controlling means is adapted to control the sharpness of the image contour by increasing a sharpness of an image contour related to an area representing a near-view image and by decreasing a sharpness of an image contour related to an area representing a distant-view image, whereas the chroma controlling means is adapted to control the image chroma by increasing a chroma of the area representing the near-view image and by decreasing a chroma of the area representing the distant-view image.

This enhances the stereoscopic effect of the reproduced image because the human eye perceives the nearer object in the sharper outline and the more vivid colors but the more distant object in the more blurred outline and the paler colors.

For example, the image contour controlling means is adapted to decrease a ratio of a low-frequency component and increase a ratio of a high-frequency component of the three-dimensional image signal in an area representing a near-view image, and to increase a ratio of the low-frequency component and decrease a ratio of the high-frequency component of the three-dimensional image signal in an area representing a distant-view image.

A two-dimensional/three-dimensional image converter according to the invention comprises a plurality of field memories serving to store a predetermined number of fields of an inputted two-dimensional image signal which are earlier than the current field, and means for reading, from the plural field memories, respective pairs of image signals having a relative time difference therebetween and outputting one of the image signal pair as a left-eye image signal and the other as a right-eye image signal, the two-dimensional/three-dimensional image converter wherein a read clock for each field memory has a frequency set to twice the frequency of a write clock for the field memory.

Since the read clock for each field memory is set to twice the frequency of the write clock for the field memory, the left-eye image signal or the right-eye image signal read from each field memory has a horizontal frequency and a vertical frequency which are each twice the frequency of the two-dimensional image signal.

BRIEF DESCRIPTION OF THE DRAWINGS

FIG. 15 is a schematic diagram showing parallax calculation regions actually defined;

FIG. 17 is a schematic diagram showing corrected depth information on the respective parallax calculation regions;

FIGS. 23a–23d are tables showing selection rules followed by a parallax selection circuit;

FIG. 30 is a schematic diagram showing a result of a grouping processing based on the histogram of FIG. 29;

FIG. 32 is a schematic diagram showing a result of the grouping processing based on the graph of FIG. 31;

FIG. 37 is a schematic diagram showing background weight components previously defined for the respective parallax calculation regions;

FIG. 39 is a schematic diagram showing corrected depth information on the respective parallax calculation regions;

MOST PREFERRED MODE FOR CARRYING OUT THE INVENTION

[1] First Embodiment

Now referring to FIGS. 1 to 26, a first embodiment of the invention will be described.

Figure 1:
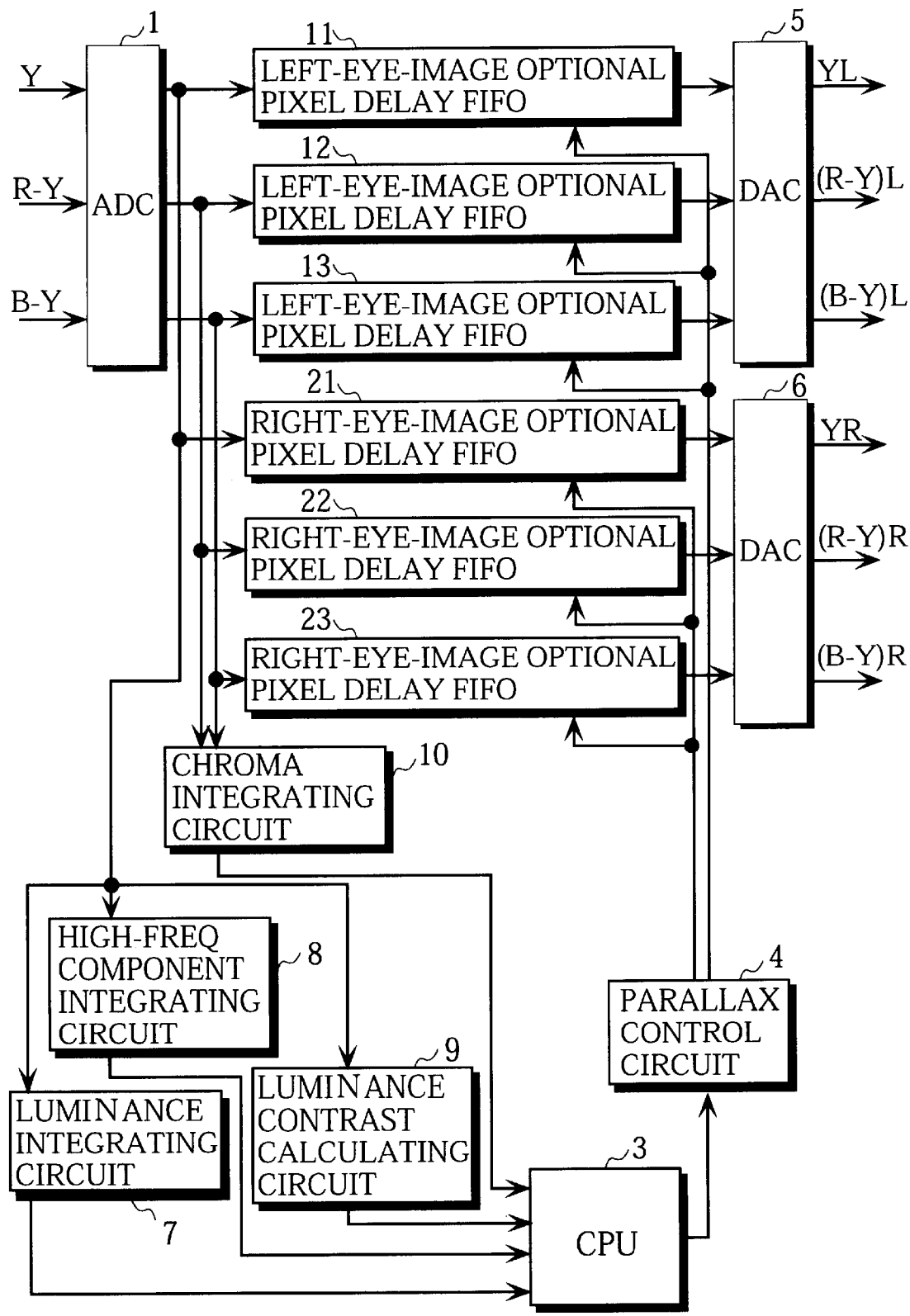
FIG. 1 is a block diagram showing an exemplary whole construction of a 2D/3D image conversion apparatus according to the invention.

FIG. 1 is a block diagram showing a whole construction of a 2D/3D image conversion apparatus for converting two-dimensional images into three-dimensional images.

A luminance signal Y and color difference signals R-Y and B-Y which compose a 2D image signal are respectively converted into a digital Y signal, R-Y signal and B-Y signal by an AD conversion circuit 1 (ADC).

The Y signal is supplied to a luminance integrating circuit 7, a high-frequency component integrating circuit 8 and a luminance contrast calculating circuit 9 as well as to a first left-eye-image optional pixel delay FIFO 11 and a first right-eye-image optional pixel delay FIFO 21. The R-Y signal is supplied to a chroma integrating circuit 10 as well as to a second left-eye-image optional pixel delay FIFO 12 and a second right-eye-image optional pixel delay FIFO 22. The B-Y signal is supplied to the chroma integrating circuit 10 as well as to a third left-eye-image optional pixel delay FIFO 13 and a third right-eye-image optional pixel delay FIFO 23.

Figure 2:
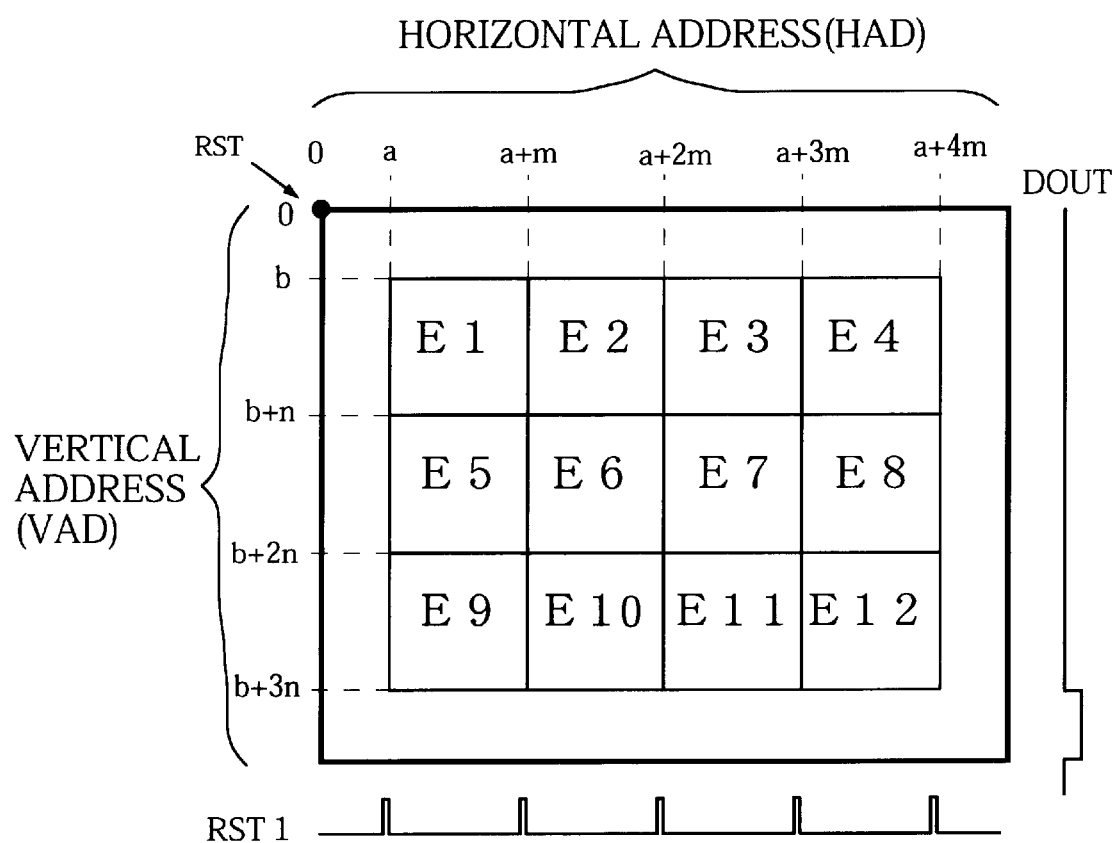
FIG. 2 is a schematic diagram showing parallax calculation regions.

As shown in FIG. 2, the luminance integrating circuit 7 calculates a luminance integration value of each of plural parallax calculation regions E1–E12 previously defined in a one-field screen on a field-by-field basis. The high-frequency component integrating circuit 8 calculates a high-frequency component integration value of each of the parallax calculation regions E1–E12 on a field-by-field basis. The luminance contrast calculating circuit 9 calculates a luminance contrast of each of the parallax calculation regions E1–E12 on a field-by-field basis. The chroma integrating circuit 10 calculates a chroma integration value of each of the parallax calculation regions E1–E12 on a field-by-field basis.

A perspective image characteristic value of each parallax calculation region E1–E12 includes the luminance integration value of each parallax calculation region E1–E12, the high-frequency component integration value of each parallax calculation region E1–E12, the luminance contrast of each parallax calculation region E1–E12 and the chroma integration value of each parallax calculation region E1–E12.

It should be understood that the one-field screen actually includes a total of 60 parallax calculation regions F1–F60 in an arrangement of 6 rows and 10 columns, as shown in FIG. 15. However, it is assumed for easy reference purposes that a total of 12 parallax calculation regions E1–E12 in an arrangement of 3 rows and 4 columns are defined in a one-field screen, as shown in FIG. 2.

A CPU 3 generates parallax information on the respective parallax calculation regions E1–E12 based on information supplied from the luminance integrating circuit 7, the high-frequency component integrating circuit 8, luminance contrast calculating circuit 9 and chroma integrating circuit 10. In this example, the parallax information is generated such that an image corresponding to an object located the more to the front, like a subject of a scene, has the smaller parallax value while an image corresponding to an object located the more to the back, like a background of the scene, has the greater parallax value. A method of generating the parallax information will hereinafter be described in detail.

The parallax information per parallax calculation region E1–E12 thus given by the CPU 3 is sent to a parallax control circuit 4. The parallax control circuit 4, in turn, generates parallax information per pixel position in each field based on the parallax information on each parallax calculation region E1–E12. Based on the parallax information per pixel position, the parallax control circuit 4 controls read addresses of FIFOs 11–13 and 21–23 to read the image signal (Y, R-Y and B-Y signals) therefrom such that the read addresses of FIFOs 11–13 are shifted from those of FIFOs 21–23, respectively. Hence, the left-eye image signal read out from the left-eye-image optional pixel delays FIFOs 11–13 has a different horizontal phase from that of the right-eye image signal read out from the right-eye-image optional pixel delays FIFOs 21–23.

The left-eye image signal (YL signal, (R-Y) L signal and (B-Y) L signal) read out from the left-eye-image optional pixel delays FIFOs 11–13 is converted into an analog signal by a DA conversion circuit (DAC) 5 and then supplied to an unillustrated three-dimensional display unit. The right-eye image signal (YR signal, (R-Y) R signal and (B-Y) R signal) read out from the right-eye-image optional pixel delays FIFOs 21–23 is converted into an analog signal by a DA conversion circuit (DAC) 6 and then supplied to the unillustrated three-dimensional display unit.

Since the left-eye image signal has a different horizontal phase from that of the right-eye image signal, a parallax is produced between the left eye image and the right eye image. Hence, by viewing the left eye image with the left eye alone and the right eye image with the right eye alone, a three-dimensional image is established wherein the subject is located to the front against the background.

Figure 3:
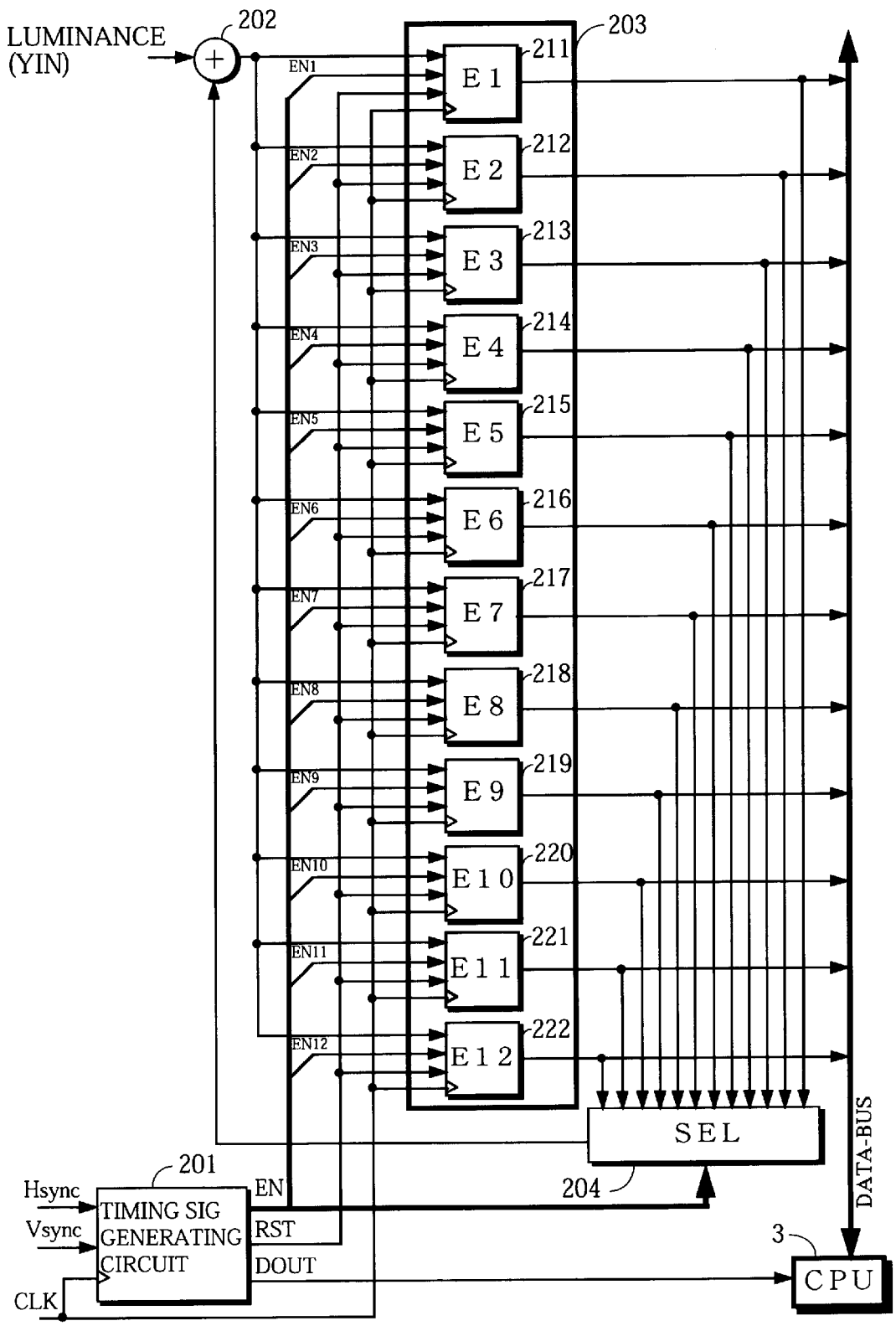
FIG. 3 is a block diagram showing a configuration of a luminance integrating circuit.

FIG. 3 diagrammatically illustrates a configuration of the luminance integrating circuit 7.

There are shown horizontal addresses (HAD) and vertical addresses (VAD) of the respective parallax calculation regions E1–E12 in FIG. 2 wherein "m" represents a number of horizontal pixels of each parallax calculation region E1–E12, "n" represents a number of vertical pixels of each parallax calculation region, and (a, b) represents coordinates of an upper left vertex of a first parallax calculation region E1.

The luminance integrating circuit 7 includes a timing signal generating circuit 201, an adder circuit 202, a luminance integration register group 203 and a selection circuit (SEL) 204. The luminance integration register group 203 includes first to twelfth luminance integration registers 211–222 corresponding to the respective parallax calculation regions E1–E12.

The timing signal generating circuit 201 is supplied with a horizontal synchronizing signal Hsync and a vertical synchronizing signal Vsync of an input image signal, and a clock signal CLK for detection of a horizontal address of each horizontal period.

The timing signal generating circuit 201 serves to output first to twelfth enable signals EN1–EN12, a reset signal RST and an output timing signal DOUT based on the horizontal synchronizing signal Hsync, vertical synchronizing signal Vsync and clock signal CLK.

The enable signals EN1–EN12 correspond to the parallax calculation regions E1–E12, respectively, and are normally at L level, rising to H level when the horizontal/vertical position of the input image signal is in a region corresponding thereto. The first to twelfth enable signals EN1–En12 are inputted in first to twelfth luminance integration registers 211–222 as a write signal, respectively. The first to twelfth enable signals EN1–EN12 are supplied to the selection circuit 204, as well. The selection circuit 204 selectively outputs input data in correspondence to any one of the enable signals that is at H level.

The reset signal RST is outputted as timed to a start of a valid image of each field of the input image signal and is supplied to the respective luminance integration registers 211–222. Responding to the inputted reset signal RST, the luminance integration registers 211–222 each have a content thereof reset to 0.

As shown in FIG. 2, the timing signal DOUT is at H level during a given period of time starting from when the vertical position of the input image signal passes a vertically lowermost position of the parallax calculation region E12 in the lowest row. The output timing signal DOUT is supplied to the CPU 3.

The reset signal is outputted as timed to the start of the valid image of the input image signal for resetting the contents of the respective luminance integration registers 211–222 to 0. Where the horizontal/vertical position of the input image signal is in the first parallax calculation region E1, the first enable signal EN1 rises to H level, so that a luminance value retained by the first luminance integration register 211 is supplied to the adder circuit 202 via the selection circuit 204 while the Y signal of the input image signal is applied to the adder circuit 202.

Accordingly, the luminance value retained by the first luminance integration register 211 and the Y signal of the input image signal are added together by the adder circuit 202. A resultant sum is stored in the first luminance integration register 211. That is, when the horizontal/vertical position of the input image signal is in the first parallax calculation region E1, luminance values of the pixels in the first parallax calculation region E1 are sequentially integrated while the integration results are accordingly stored in the first luminance integration register 211.

In this manner, the luminance integration values of the respective parallax calculation regions E1–E12 are stored in the corresponding luminance integration registers 211–222. When the output timing signal DOUT rises to H level, the luminance integration values stored in the respective luminance integration registers 211–222 in correspondence to the parallax calculation regions E1–E12 are supplied to the CPU 3 via a data bus (DATA-BUS)

Figure 4:
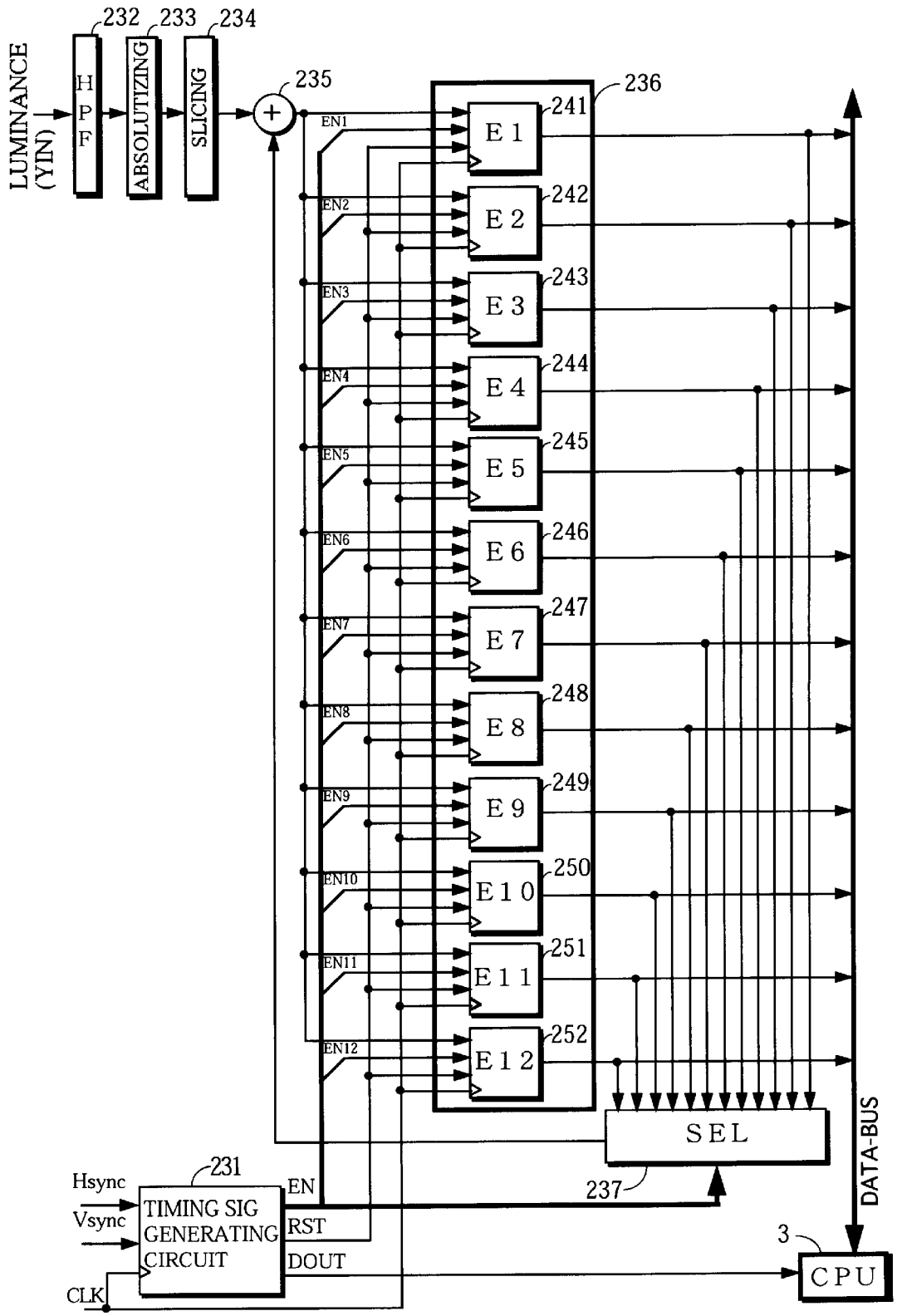
FIG. 4 is a block diagram showing a configuration of a high-frequency component integrating circuit.

FIG. 4 diagrammatically illustrates a configuration of the high-frequency component integrating circuit 8. The high-frequency component integrating circuit 8 includes a timing signal generating circuit 231, a high-pass filter (HPF) 232, an absolutizing circuit 233, a slicing circuit 234, an adder circuit 235, a high-frequency component integration register group 236 and a selection circuit 237. The high-frequency component integration register group 236 includes first to twelfth high-frequency component integration registers 241–252 in correspondence to the parallax calculation regions E1–E12.

Input and output signals of the timing signal generating circuit 231 are the same with those of the timing signal generating circuit 201 shown in FIG. 3.

Figure 5:
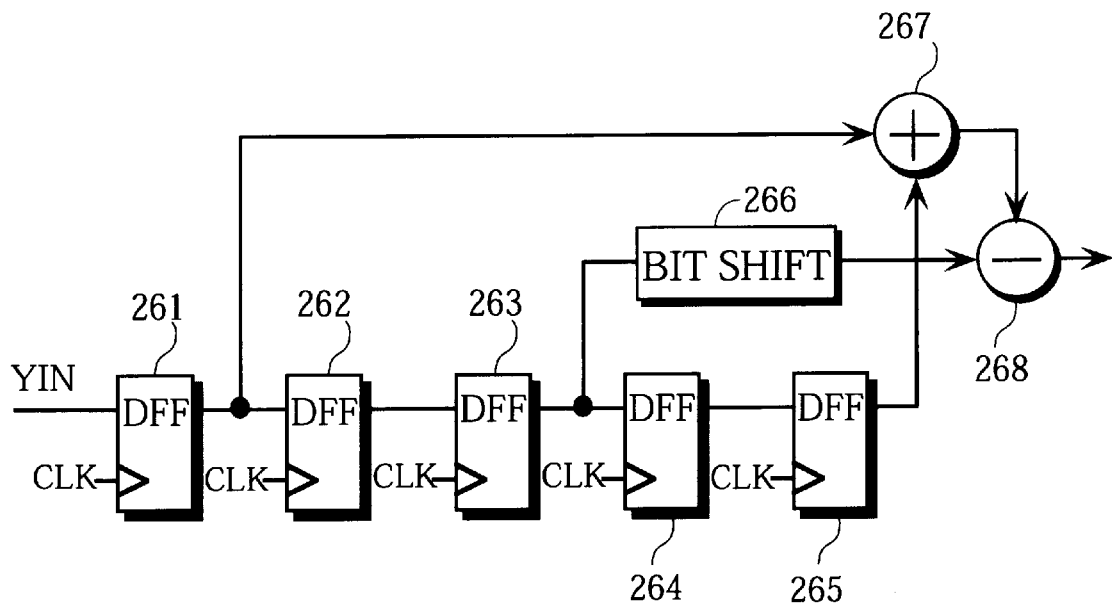
FIG. 5 is a circuit diagram showing an exemplary configuration of a high-pass filter 232 in FIG. 4.

As shown in FIG. 5, for example, the high-pass filter 232 includes five D flip-flops 261–165, a bit shift circuit 266 for providing an output at twice the value of an input value, an adder 267 and a subtractor 268, and have tap factors of −1, 0, 2, 0 and −1.

Figure 6:
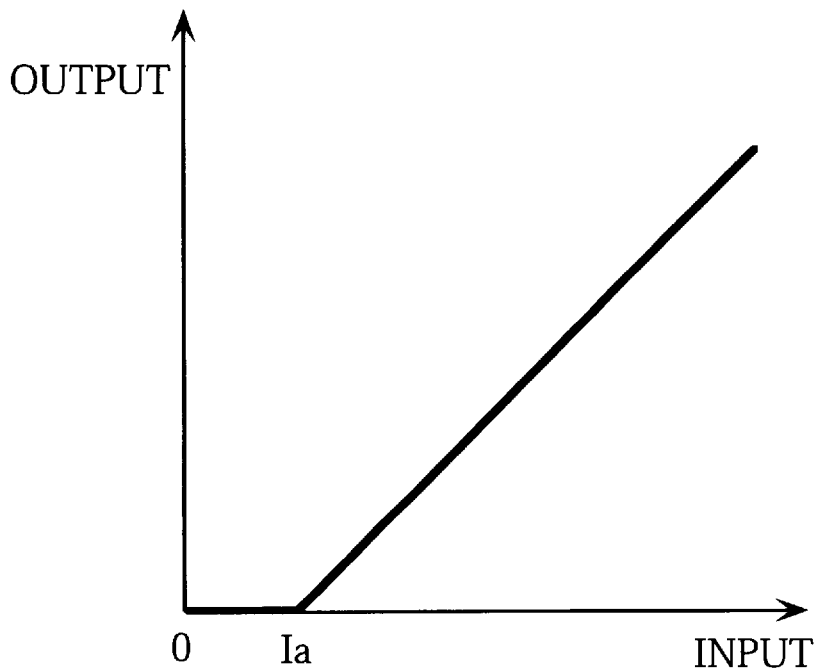
FIG. 6 is a graphical representation of input/output characteristics of a slicing circuit 234 in FIG. 4.

The slicing circuit 234 may have input/output characteristics shown in FIG. 6. The circuit is adapted to provide an output of 0 with respect to an input in a range of between 0 and Ia in order to prevent noises from being extracted as a high-frequency component.

Thus, the high-pass filter 232 extracts a high-frequency component of Y signal of the input image signal, an absolute value of which component is obtained by the absolutizing circuit 233 and from which component noises are removed by the slicing circuit 234.

The reset signal is outputted as timed to the start of a valid image of the input image signal so as to reset contents of the high-frequency component integration registers 241–252 to 0. Where the horizontal/vertical position of the input image signal is in the first parallax calculation region E1, the first enable signal EN1 rises to H level so that the high-frequency component retained by the first high-frequency component integration register 241 is supplied to the adder circuit 235 via the selection circuit 237 while the high-frequency component of Y signal (or the output from the slicing circuit 234) of the input image signal is supplied to the adder circuit 235.

Thus, the high-frequency component retained by the first high-frequency component integration register 241 and that of Y signal of the input image signal are added together by the adder circuit 235. A resultant sum is stored in the first high-frequency component integration register 241. That is, when the horizontal/vertical position of the input image signal is in the first parallax calculation region E1, high-frequency components of the pixels in the first parallax calculation region E1 are sequentially integrated while integration results are accordingly stored in the first high-frequency component integration register 241.

In this manner, high-frequency component integration values of the respective parallax calculation regions E1–E12 are stored in the corresponding high-frequency component integration registers 241–252. When the output timing signal DOUT rises to H level, the high-frequency component integration values stored in the respective high-frequency component integration registers 241–252 in correspondence to the parallax calculation regions E1–E12 are supplied to the CPU 3 via a data bus.

Figure 7:
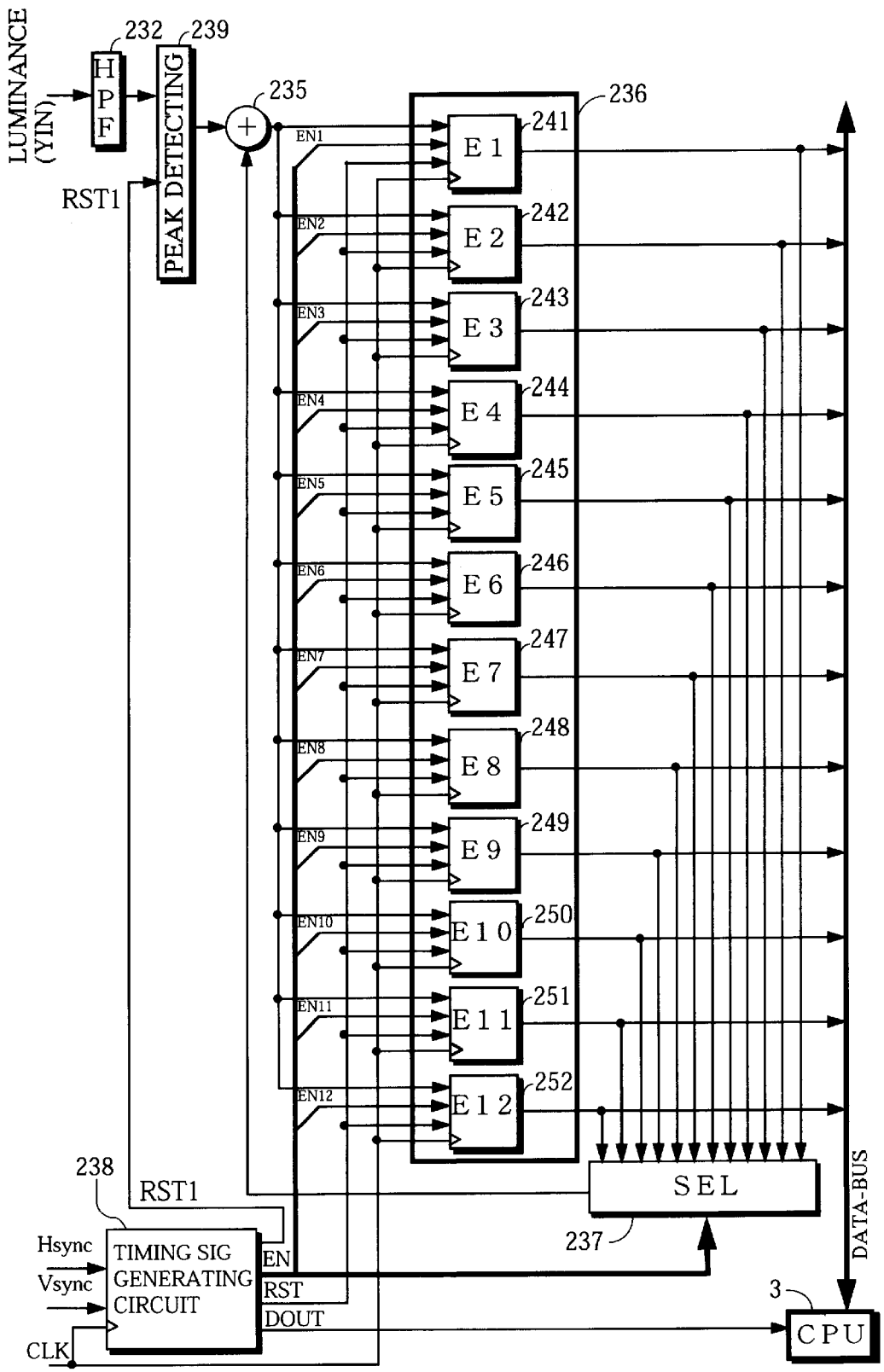
FIG. 7 is a block diagram showing another exemplary configuration of the high-frequency component integrating circuit.

FIG. 7 diagrammatically illustrates another exemplary configuration of the high-frequency component integration circuit 8.

This high-frequency component integration circuit 8 includes a timing signal generating circuit 238, the high-pass filter 232, a peak detecting circuit 239, the adder circuit 235, the high-frequency component integration register group 236 and the selection circuit 237.

The timing signal generating circuit 238 operates substantially the same way with the timing signal generating circuit 201 of FIG. 3 except for that a trigger pulse (region boundary signal RST1) is outputted when the input image signal reaches a horizontal position immediately before the parallax calculation region E1, E5 or E9 and the last horizontal position of each parallax calculation region E1–E12, as shown in FIG. 2. The region boundary signal RST1 is supplied to the peak detecting circuit 239.

Figure 8:
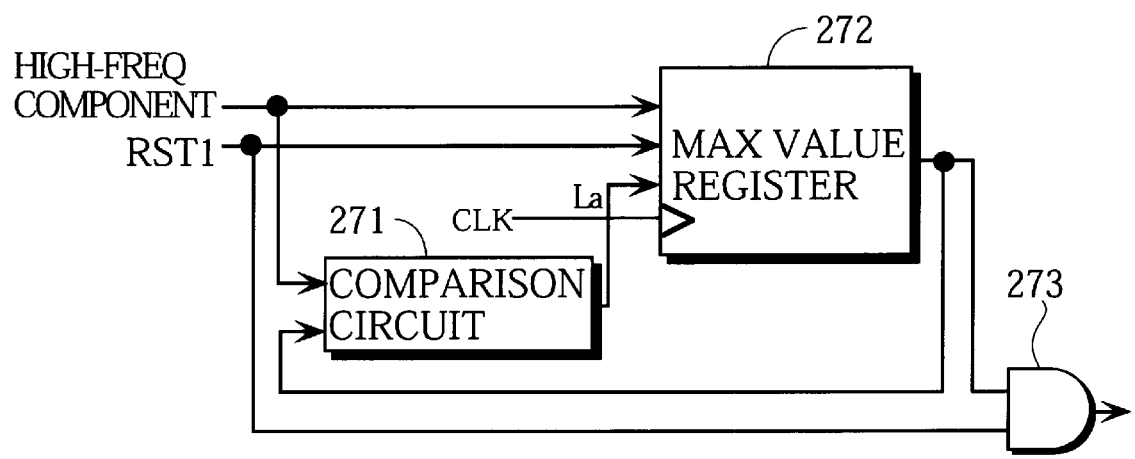
FIG. 8 is a circuit diagram showing an exemplary configuration of a peak detecting circuit 239 in FIG. 7.
Figure 9:
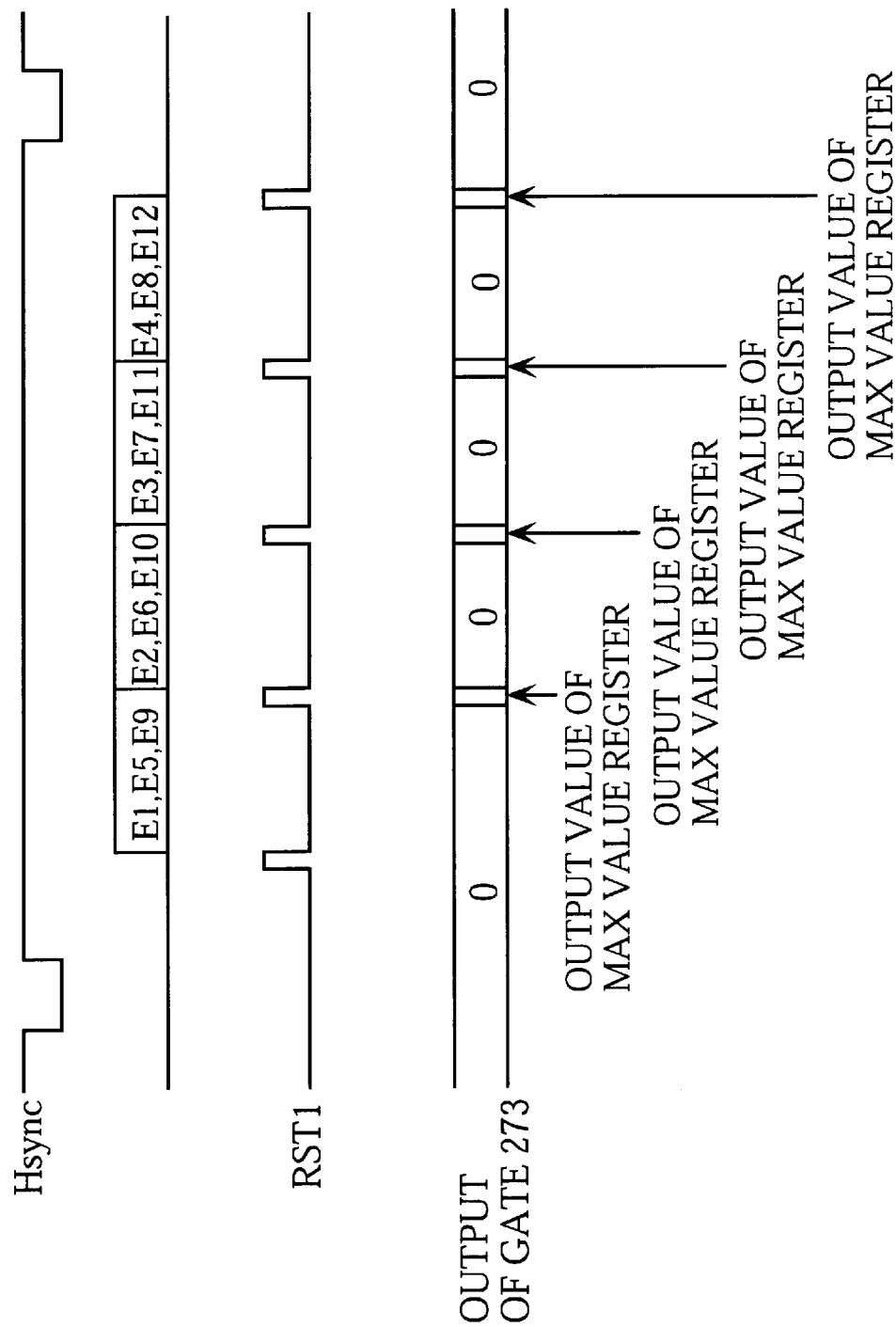
FIG. 9 is a timing chart showing signals in respective parts of the peak detecting circuit 239.

The high-frequency component of Y signal extracted by the high-pass filter 232 is supplied to the peak detecting circuit 239. The peak detecting circuit 239 detects the maximum value of the high-frequency components for each horizontal line of each parallax calculation region E1–E12. The peak detecting circuit 239 may include a comparison circuit 271, a maximum value register 272 and a gate 273, as shown in FIG. 8. FIG. 9 is a timing chart showing the horizontal synchronizing signal Hsync, the region boundary signal RST1 and an output from the gate 273.

The maximum value register 272 is supplied with the high-frequency component of Y signal extracted by the high-pass filter 232, the region boundary signal RST1, a judgment signal La from the comparison circuit 271 and the clock signal CLK. The comparison circuit 271 compares the output from the maximum value register 272 and the high-frequency component of Y signal of the input image signal so as to raise the judgment signal La to H level when determining the high-frequency component of Y signal to be greater than the output from the maximum value register 272.

Rising to H level, the region boundary signal RST1 resets a content of the maximum value register 272 to 0. If the judgment signal La from the comparison circuit 271 is at H level while the region boundary signal RST1 is at L level, the high-frequency component of Y signal is stored in the maximum value register 272. That is, the content of the maximum value register 272 is updated. Thus, in each period during which the region boundary signal RST1 is at L level, the maximum value register 272 stores the maximum value of high-frequency components of Y signal with respect to the respective pixels in one horizontal line of any one of the parallax calculation regions E1–E12 that corresponds to the horizontal/vertical position of the input image signal.

The gate 273 provides an output of the maximum value register 272 in response to the region boundary signal RST1 rising to H level while providing an output of 0 when the region boundary signal RST1 is at L level. That is, each time the region boundary signal RST1 rises to H level, the gate circuit 273 outputs the maximum value of the high-frequency components of Y signal with respect to one horizontal line of a given parallax calculation region E1–E12, the maximum value stored in the maximum value register 272. Hence, integration values of maximum values of high-frequency components of Y signal with respect to the respective horizontal lines of the respective parallax calculation regions are stored in the corresponding high-frequency integration registers 241–252 (see FIG. 7).

Figure 10:
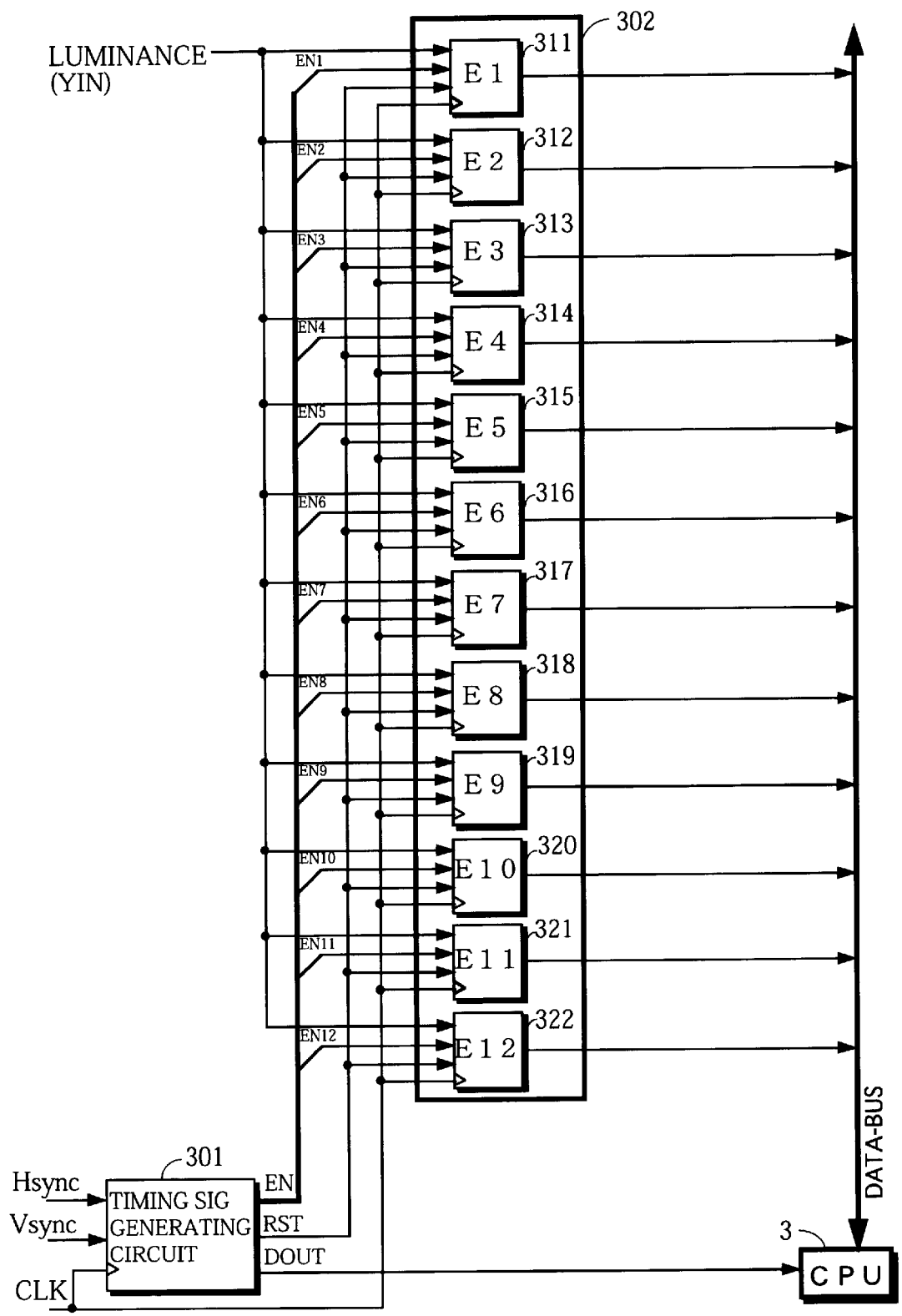
FIG. 10 is a block diagram showing a configuration of a luminance contrast calculating circuit.

FIG. 10 diagrammatically illustrates a configuration of the luminance contrast calculating circuit 9.

The luminance contrast calculating circuit 9 includes a timing signal generating circuit 301 and a luminance contrast sensing circuit group 302. The luminance contrast sensing circuit group 302 includes first to twelfth luminance contrast sensing circuits 311–322 corresponding to the parallax calculation regions E1–E12, respectively.

The timing signal generating circuit 301 provides the same input and output signals as those of the timing signal generating circuit 201 shown in FIG. 3.

Figure 11:
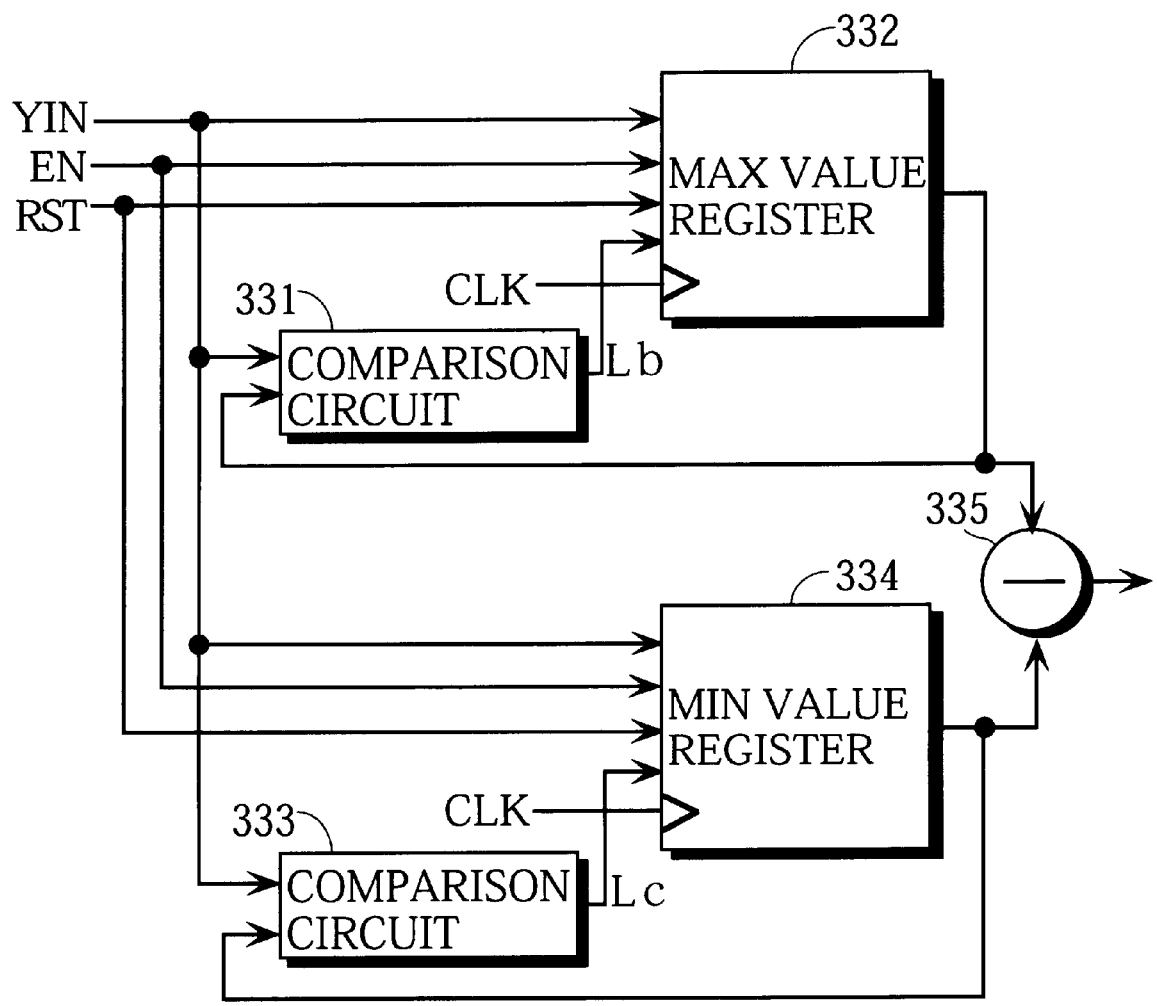
FIG. 11 is a circuit diagram showing a configuration of a luminance contrast sensing circuit in FIG. 10.

As shown in FIG. 11, the luminance contrast sensing circuits 311–322 each include a first comparison circuit 331, a maximum value register 332, a second comparison circuit 333, a minimum value register 334 and a subtractor 335.

The maximum value register 332 is supplied with Y signal of the input image signal, any one of the enable signals EN (N=1,2 . . . 12) of any one of the regions E1–E12 corresponding to any one of the luminance contrast sensing circuits, a reset signal RST, a judgment signal Lb outputted from the first comparison circuit 331 and a clock signal CLK. The first comparison circuit 331 compares the output value of the maximum value register 332 with Y signal of the input image signal so as to raise the judgment signal Lb to H level when determining Y signal of the input image signal to be greater than the output value from the maximum value register 332.

Raised to H level, the reset signal RST resets a content of the maximum value register 332 to 0. When the enable signal EN of any one of the regions E1–E12 corresponding to the luminance contrast sensing circuit and the judgment signal Lb are both at H level, Y signal is stored in the maximum value register 332. That is, the content of the maximum value register 332 is updated. Accordingly, immediately before the output timing signal DOUT is outputted, the maximum value of luminance values of the respective pixels in any one of the parallax calculation regions E1–E12 corresponding to the luminance contrast sensing circuit is stored in the maximum value register 332.

The minimum value register 334 is supplied with Y signal of the input image signal, an enable signal EN (N=1,2 . . . 12) of any one of the regions E1–E12 corresponding to any one of luminance contrast sensing circuits, the reset signal RST, a judgment signal Lc outputted from the second comparison circuit 333 and the clock signal CLK. The second comparison circuit 333 compares the output value from the minimum value register 334 with Y signal of the input image signal so as to raise the judgment signal Lc to H level when determining Y signal of the input image signal to be smaller than the output value from the minimum value register 334.

When the reset signal RST rises to H level, a predetermined maximum value is set in the minimum value register 334. When the enable signal EN of any one of the regions E1–E12 corresponding to the luminance contrast sensing circuit and the judgment signal Lc are both at H level, Y signal is stored in the minimum value register 334. That is, the content of the minimum value register 334 is updated. Accordingly, immediately before the output timing signal DOUT is outputted, the minimum value of luminance values of the pixels in any one of the parallax calculation regions E1–E12 corresponding to the luminance contrast sensing circuit is stored in the minimum value register 334.

As a result, at the time of output of the output timing signal DOUT, an output from the subtractor 335 has a value equal to a difference (luminance contrast) between the maximum value and the minimum value of the luminance values of the pixels in any one of the parallax calculation regions E1–E12 corresponding to the luminance contrast sensing circuit. In response to the output timing signal DOUT, the subtractor 335 applies the output (luminance contrast) to the CPU 3.

Figure 12:
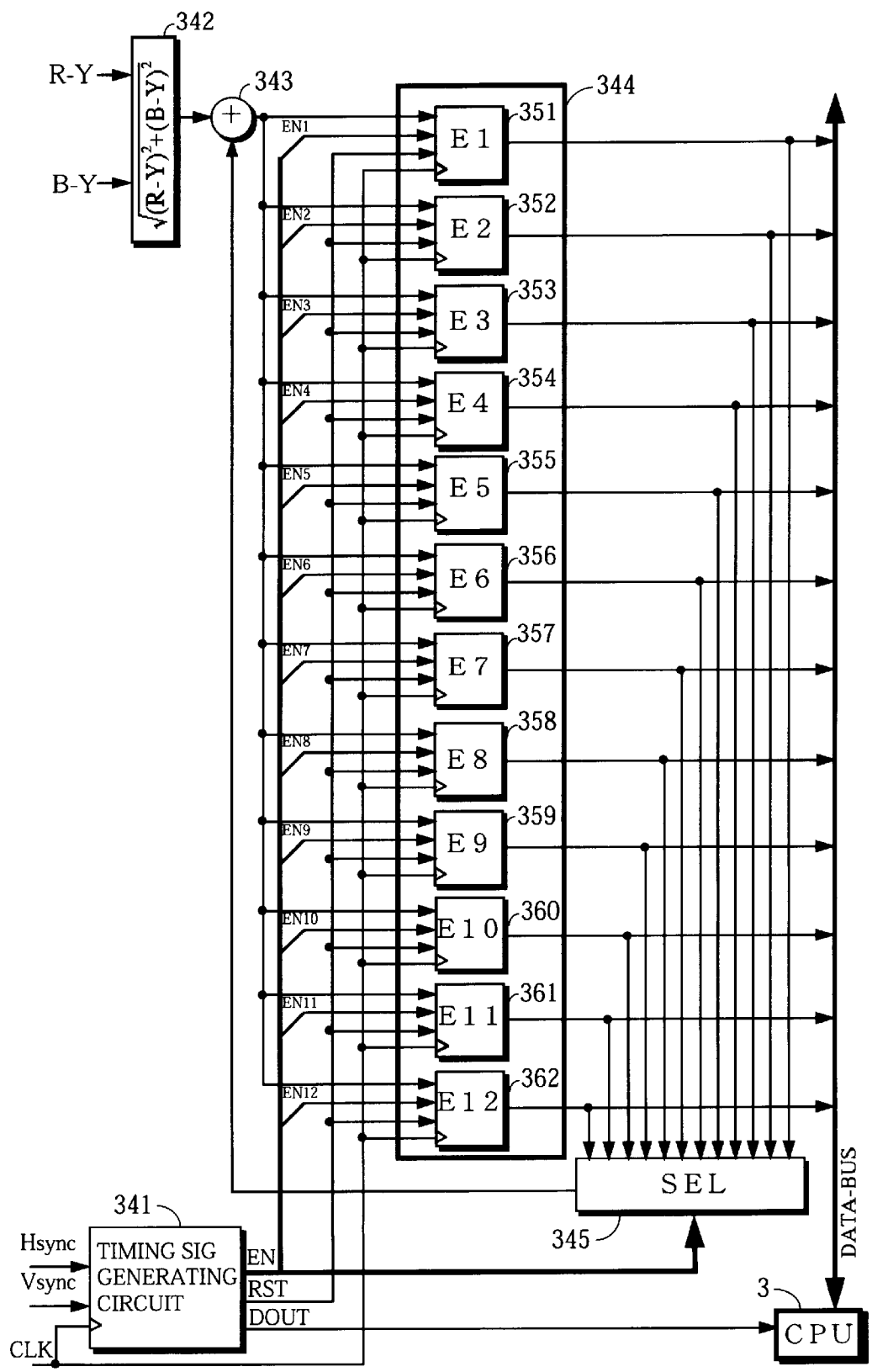
FIG. 12 is a circuit diagram showing a configuration of a chroma integrating circuit.

FIG. 12 diagrammatically illustrates a configuration of the chroma integrating circuit 10.

The chroma integrating circuit 10 includes a timing signal generating circuit 341, a chroma calculating circuit 342, an adder circuit 343, a chroma integration register group 244 and a selector circuit 345. The chroma integration register group 344 includes first to twelfth chroma integration registers 351–362 corresponding to the parallax calculation regions E1–E12, respectively.

The timing signal generating circuit 341 provides the same input and output signals as those of the timing signal generating circuit 201 shown in FIG. 3.

The chroma calculating circuit 342 arithmetically finds a value SA1 with respect to a chroma by using the following equation (3):

$$SA1=(R-Y)^2+(B-Y)^2 \ldots (3)$$

wherein (R-Y) denotes a value of (R-Y) signal of the input image signal and (B-Y) denotes a value of (B-Y) signal of the input image signal.

The reset signal RST is outputted as timed to the start of the valid image of the input image signal for resetting contents of the respective chroma integration registers 351–362 to 0. Where the horizontal/vertical position of the input image signal is in the first parallax calculation region E1, the first enable signal EN1 rises to H level, so that a chroma retained by the first chroma integration register 351 is supplied to the adder circuit 343 via the selection circuit 345 while the chroma determined by the chroma calculating circuit 342 is applied to the adder circuit 343.

Thus, the chroma retained by the first chroma integration register 351 and the chroma given by the chroma calculating circuit 342 are added together by the adder circuit 343. A resultant sum is stored in the first chroma integration register 351. That is, when the horizontal/vertical position of the input image signal is in the first parallax calculation region E1, chromas of the pixels in the first parallax calculation region E1 are sequentially integrated while the integration results are accordingly stored in the first chroma integration register 351.

In this manner, the chroma integration values of the respective parallax calculation regions E1–E12 are stored in the corresponding chroma integration registers 351–362. When the output timing signal DOUT rises to H level, the chroma integration values stored in the respective chroma integration registers 351–362 in correspondence to the parallax calculation regions E1–E12 are supplied to the CPU 3 via a data bus.

Figure 13:
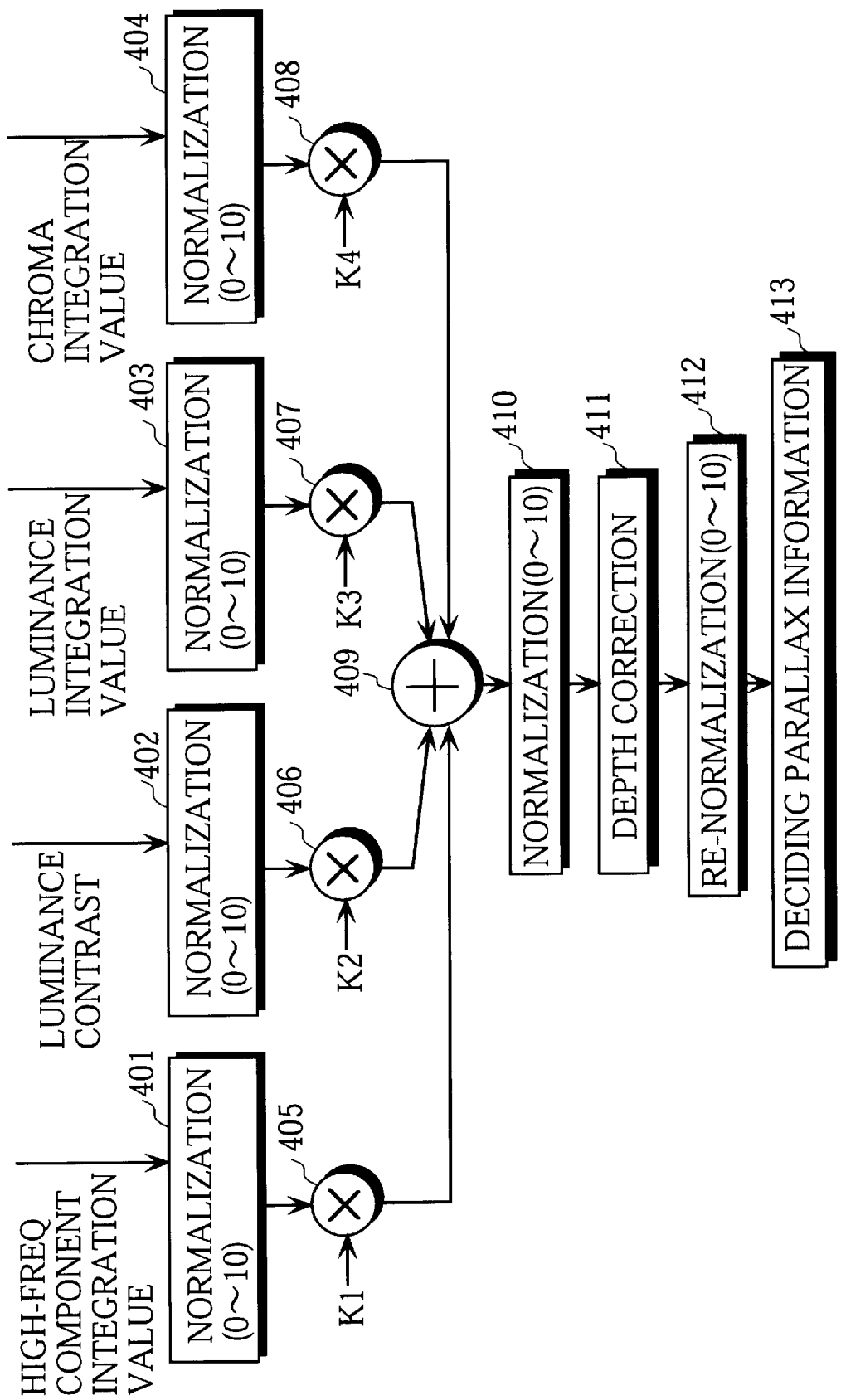
FIG. 13 is a block diagram illustrating a parallax information generating procedure taken by a CPU.

FIG. 13 diagrammatically illustrates a method of calculating a parallax value taken by the CPU 3.

First normalizing means 401 serves to normalize a high-frequency component integration value per parallax calculation region E1–E12 in a range of between 0 and 10. Second normalizing means 402 serves to normalize a luminance contrast per parallax calculation region E1–E12 in a range of between 0 and 10. Third normalizing means 403 serves to normalize a luminance integration value per parallax calculation region E1–E12 in a range of between 0 and 10. Fourth normalizing means 404 serves to normalize a chroma integration value per parallax calculation region E1–E12 in a range of between 0 and 10.

The high-frequency component integration value per parallax calculation region E1–E12 thus normalized is multiplied by a factor K1 by multiplying means 405 and subsequently, the product is applied to adding means 409.

The normalized luminance contrast per parallax calculation region E1–E12 is multiplied by a factor K2 by multiplying means 406 and subsequently, the product is applied to the adding means 409. The normalized luminance integration value per parallax calculation region E1–E12 is multiplied by a factor K3 by multiplying means 407 and subsequently, the product is applied to the adding means 409. The normalized chroma integration value per parallax calculation region E1–E12 is multiplied by a factor K4 by multiplying means 408 and subsequently, the product is applied to the adding means 409.

Specific examples of the factors K1 to K4 are K1=0.6, K2=0.2, K3=0.1, K4=0.1, or K1=0.75, K2=0.25, K3=0.0, K4=0.0.

The set values of these factors K1 to K4 are controlled whereby an optional one selected from the group consisting of the high-frequency component integration value, the luminance contrast, the luminance integration value and the chroma integration value or an optional combination thereof may be used as the perspective image characteristic value.

That is, the high-frequency component integration value alone may be used as the perspective image characteristic value. The luminance contrast alone may be used as the perspective image characteristic value. Alternatively, a combination of the high-frequency component integration value and luminance contrast may be used as the perspective image characteristic value. Further, a combination of the high-frequency component integration value, luminance contrast and luminance integration value may be used as the perspective image characteristic value. A combination of the high-frequency component integration value, luminance contrast and chroma integration value may be used as the perspective image characteristic value. An alternative combination of the high-frequency component integration value, luminance contrast, luminance integration value and chroma integration value may be used as the perspective image characteristic value.

Figure 14:
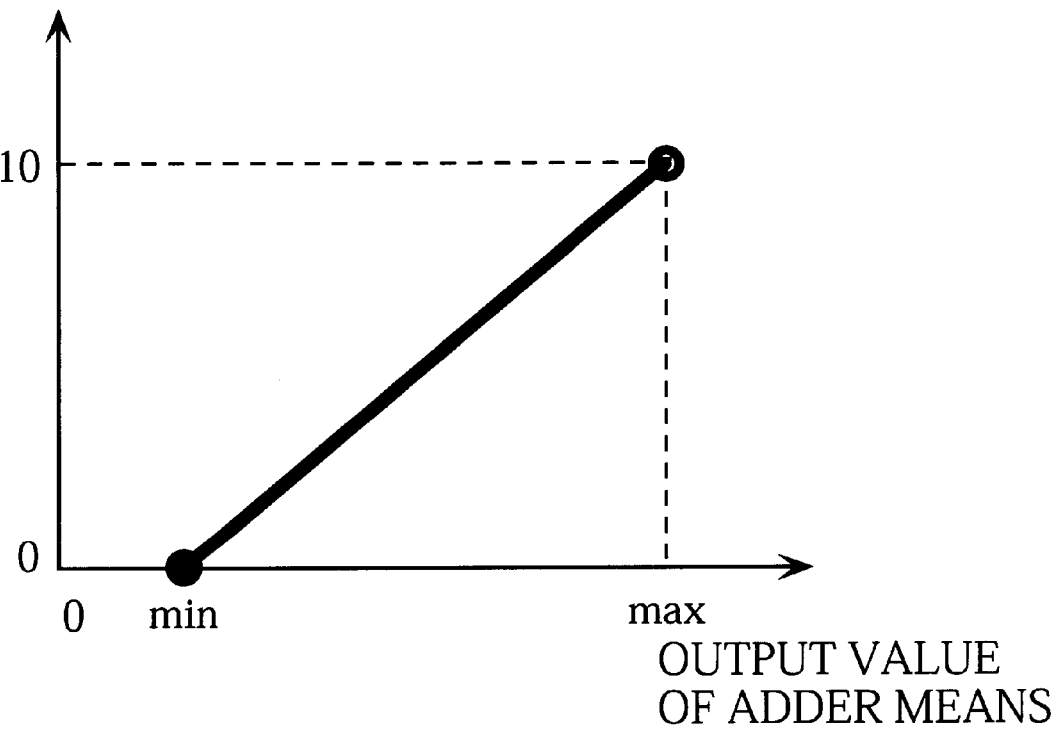
FIG. 14 is a graphical representation of a relation between input and output of normalizing means 410 in FIG. 13.

The adding means 409 serves to add up the respective values of each parallax calculation region E1–E12 given by multiplying means 405 to 408. A sum per parallax calculation region E1–E12 given by the adding means 409 is normalized by fifth normalizing means 410 in a range of between 0 and 10 (hereinafter referred to as "depth information"). FIG. 14 shows a relation between the output value from the adding means 409 and the depth information given by the fifth normalizing means 410. The depth information per parallax calculation region E1–E12 is meant to define the perspective image information per parallax calculation region E1–E12. The depth information per parallax calculation region E1–E12 given by the fifth normalizing means 410 is supplied to a depth correcting means 411.

In typical images, a subject is located to the front while a background is located to the rear. In most cases, the focus is on the subject. Therefore, it is believed that the more to the front is an object, the greater are the high-frequency component, contrast, luminance and chroma. Hence, it is assumed in the embodiment hereof that a region with a greater high-frequency component integration value, luminance contrast, luminance integration value and chroma integration value represents an object located correspondingly more to the front.

Accordingly, it may be determined that a region with the greater depth information piece given by the adding means 409 represents an object located the more to the front. If a perspective position of the region representing the object located most to the front is set on a screen position of the 3D display unit, the depth information given by the adding means 409 and a depth value from the screen position are indirectly proportional.

Now, description will hereinbelow be made on a depth correction processing performed by the depth correcting means 411.

The description of the depth correction processing is more easily understood if it is made by way of example of the parallax calculation regions actually defined. Accordingly, the depth correction processing performed by the depth correcting means 411 will be described by way of example of 60 parallax calculation regions actually defined with respect to one image field. FIG. 15 shows 60 parallax calculation regions F1–F60 actually defined in the one field.

First, there is calculated a mean value of depth information on the parallax calculation regions F1–F60 on a row-by-row basis. Where the parallax calculation regions F1–F60 have respective depth information pieces of values as shown in FIG. 16, mean values of depth information on first to sixth rows of the regions are 1.2, 3.6, 6.0, 7.2, 4.0 and 1.2.

Subsequently, of the rows of parallax calculation regions, extracted is a region row wherein foreground object(s) occupy a greater area than in any other region rows. That is, the region row having the greatest mean value of the depth information is extracted. According to the example of FIG. 16, the forth row of regions is extracted.

Subsequently, regions of rows lower than the extracted row are each adjusted in the depth information piece thereof so that the depth information piece on each region is not sharply decreased from that of a region right thereabove. More specifically, each region of the rows lower than the extracted row, that has a depth information piece smaller than a region right thereabove by not less than 3, is changed in the depth information piece thereof to a value smaller than that of the region thereabove by 2.

Figure 16:
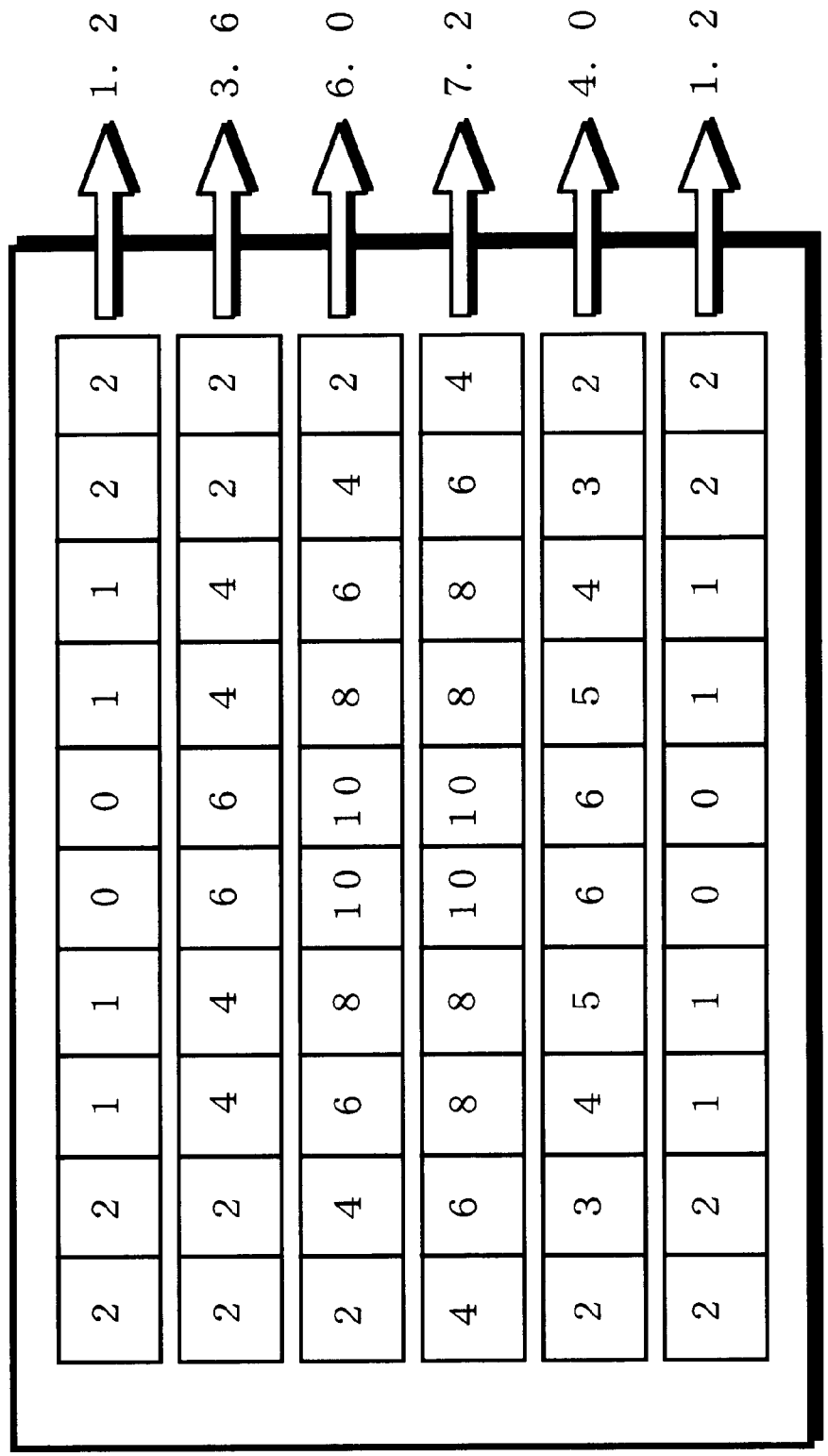
FIG. 16 is a schematic diagram showing one example of depth information on the respective parallax calculation regions prior to a depth correction processing.
Figure 18:
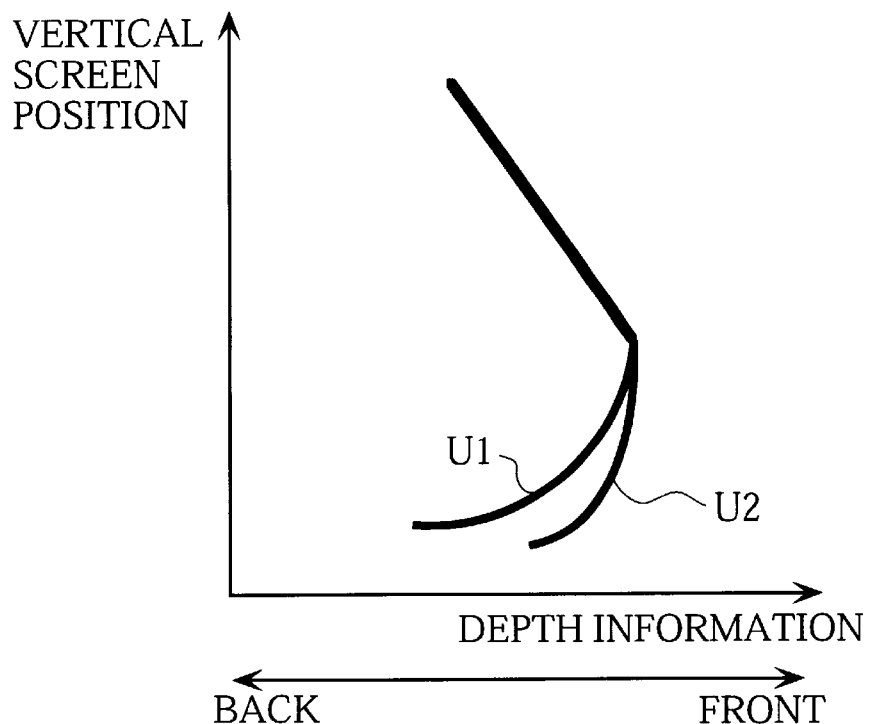
FIG. 18 is a graphical representation of a relation of the depth information versus vertical screen position prior to the depth correction processing and a relation of the corrected depth information versus the vertical screen position.
Figure 25:
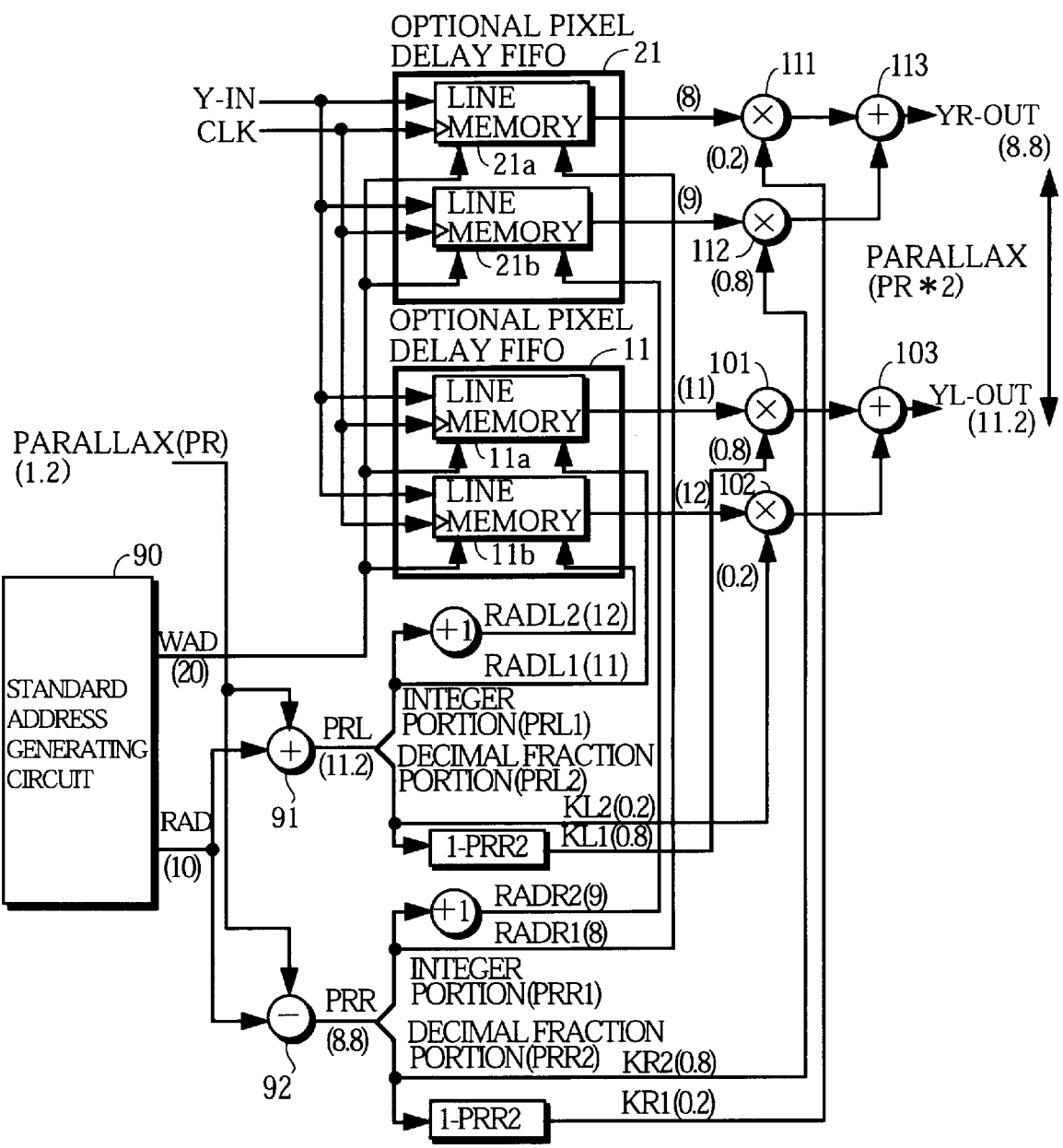
FIG. 25 is a block diagram showing a configuration of the parallax control circuit with values appended to respective addresses in a case where parallax information=1.2.

In the example of FIG. 16, out of the regions F41 to F50 of the fifth row, the regions F42 to F49 having the depth information smaller than the respective regions thereabove by not less than 3 are first corrected in their depth information, as shown in FIG. 17. Subsequently, of the regions F51 to F60 of the sixth row, the regions F53 to F58 having the depth information pieces smaller than those (corrected information pieces) of the respective regions thereabove by not less than 3 are corrected in the depth information pieces thereof.

Where depth information has such a relation with a vertical screen position at an optional horizontal position as represented by a curve U1 in FIG. 25, the relation of the depth information versus the vertical level screen position is corrected to that represented by a curve U2 in FIG. 25.

It is for the following reason that, of the rows of parallax calculation regions, the regions of the rows below the region row wherein the foreground object(s) occupy a greater area than in these rows are corrected in the depth information thereof.

In most cases, objects on the front of the scene are located on the lower side of the screen. In addition, images of the objects located on the lower side of the screen, such as of ground and the like, often have little variation. The image with little variation like that of the ground has a low high-frequency component and therefore, has a low depth information value despite being located to the front. Hence, the depth correction is provided in order to increase the depth information value with respect to the image of the foreground object and with a low high-frequency component to a degree that the depth information value of such a region is not excessive of that of a region thereabove.

The depth information on the respective parallax calculation regions (actually F1 to F60 but assumed to be E1 to E12 for easy reference purposes) thus corrected by the depth correcting means 411 is normalized by renormalizing means 412 in a range of between 0 and 10. The depth information per region E1–E12 given by the renormalizing means 412 is converted into parallax information per region E1–E12 by parallax information decision means 413.

The parallax information decision means 413 converts the depth information per region E1–E12 into the parallax information per region based on a predetermined relation between the depth information and the parallax information. The relation of the depth information versus the parallax information is indirectly proportional as represented by a straight line S1 or S2 shown in FIG. 19.

Figure 19:
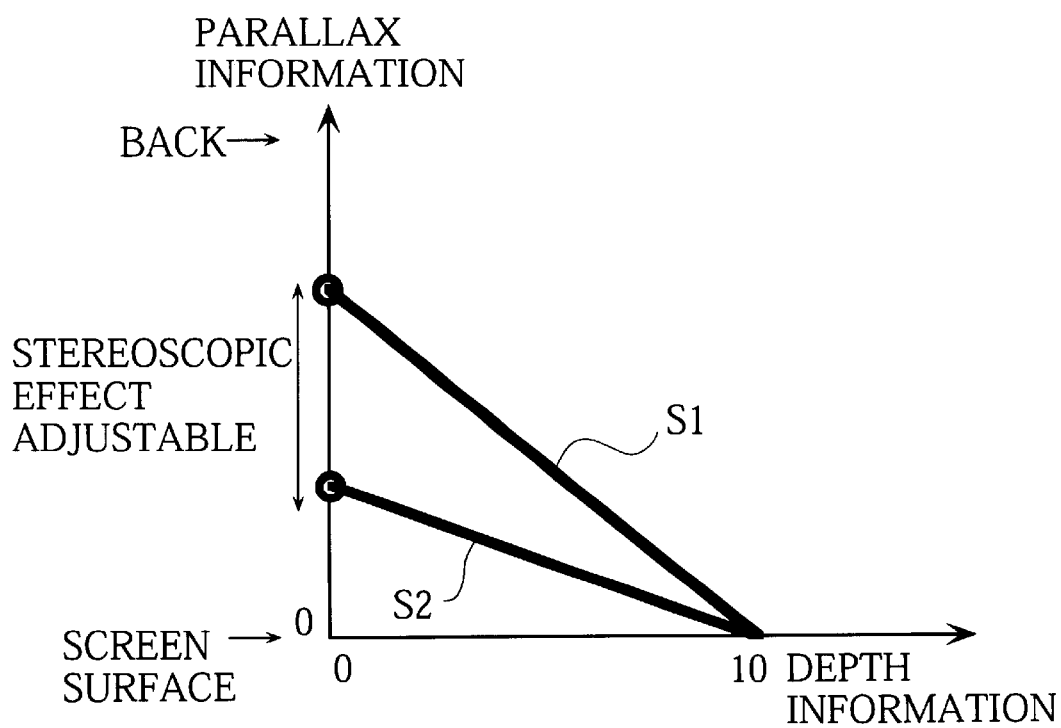
FIG. 19 is a graphical representation of a relation between the depth information and parallax information.

Referring to FIG. 19, the relation of the depth information versus the parallax information represented by the straight line S1 is used for obtaining a 3D image featuring a relatively great stereoscopic effect. On the other hand, the relation of the depth information versus the parallax information represented by the straight line S2 is used for obtaining a 3D image featuring a relatively small stereoscopic effect. The stereoscopic effect of the 3D image can be adjusted by controlling the relation of the parallax information versus the depth information in a range of between the straight lines S1 and S2.

The parallax information per parallax calculation region E1–E12 thus obtained is supplied to the parallax control circuit 4 (see FIG. 1). It is to be noted that the depth correction performed by the depth correcting means 411 may be omitted.

Figure 20:
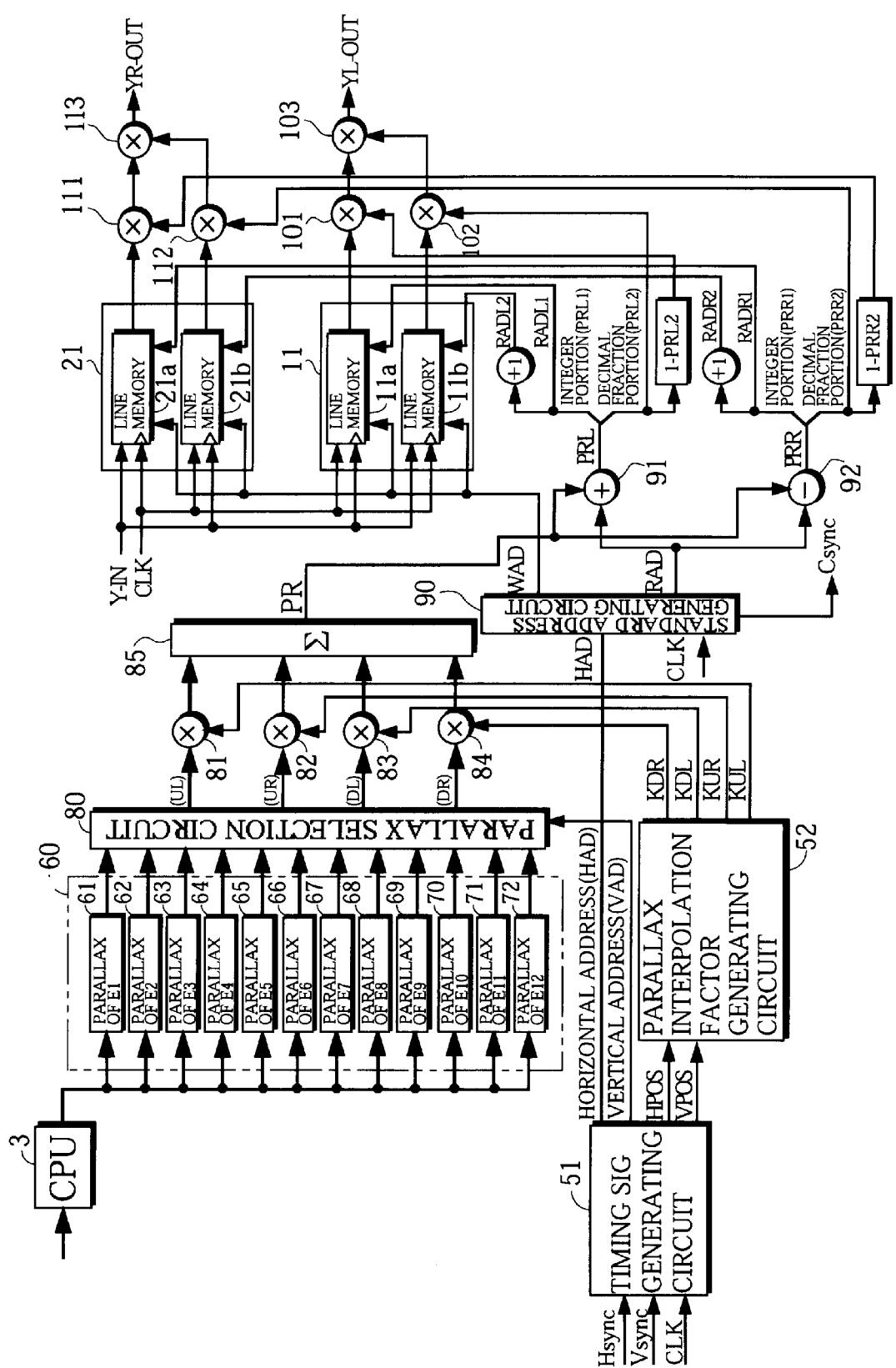
FIG. 20 is a block diagram showing essential configurations of a parallax control circuit and optional pixel delays FIFOs.

FIG. 20 diagrammatically illustrates essential configurations of the parallax control circuit and the optional pixel delays FIFOs shown in FIG. 1.

Out of the optional pixel delays FIFOs 11 to 13 and 21 to 23, only the left-eye-image optional pixel delay FIFO 11 and the right-eye-image optional pixel delay FIFO 21 related to Y signal are shown in FIG. 20. However, the other optional pixel delays FIFOs 12–13 and 22–23 have the same configuration and are subject to the same control and therefore, a description thereof is omitted.

It is to be noted that the parallax information calculated by the CPU 3 pertains a central position of the respective parallax calculation regions E1–E12. The parallax control circuit 4 serves to obtain parallax information with respect to the respective pixel positions in the one-field screen based on the parallax information with respect to the central position of the respective parallax calculation regions E1–E12. The read addresses of the left-eye-image optional pixel delays FIFOs 11–13 and of the right-eye-image optional pixel delays FIFOs 21–23 are controlled based on the parallax information per pixel position in order to produce, from the 2D image signal in each pixel position, a left eye image and a right eye image which have parallax therebetween based on the parallax information with respect to the pixel position.

The parallax information on the respective pixel positions in the one-field screen is generated by means of a timing signal generating circuit 51, a parallax interpolation factor generating circuit 52, parallax information storage means 60, a parallax selection circuit 80, first to fourth multipliers 81–84 and an adder circuit 85.

The horizontal synchronizing signal Hsync and the vertical synchronizing signal Vsync of the input image signal are applied to the timing signal generating circuit 51. In addition, the clock signal CLK for detecting the horizontal address of each horizontal period is also applied to the timing signal generating circuit 51.

Based on the horizontal synchronizing signal Hsync, vertical synchronizing signal Vsync and clock signal CLK, the timing signal generating circuit 51 generates and outputs a horizontal address signal HAD indicative of an absolute horizontal position of the input image signal, a vertical address signal VAD indicative of an absolute vertical position of the input image signal, a relative horizontal position signal HPOS indicative of a relative horizontal position of the input image signal and a relative vertical position signal VPOS indicative of a relative vertical position of the input image signal.

Now, the relative horizontal position and the relative vertical position of the input image signal will be described.

Figure 21:
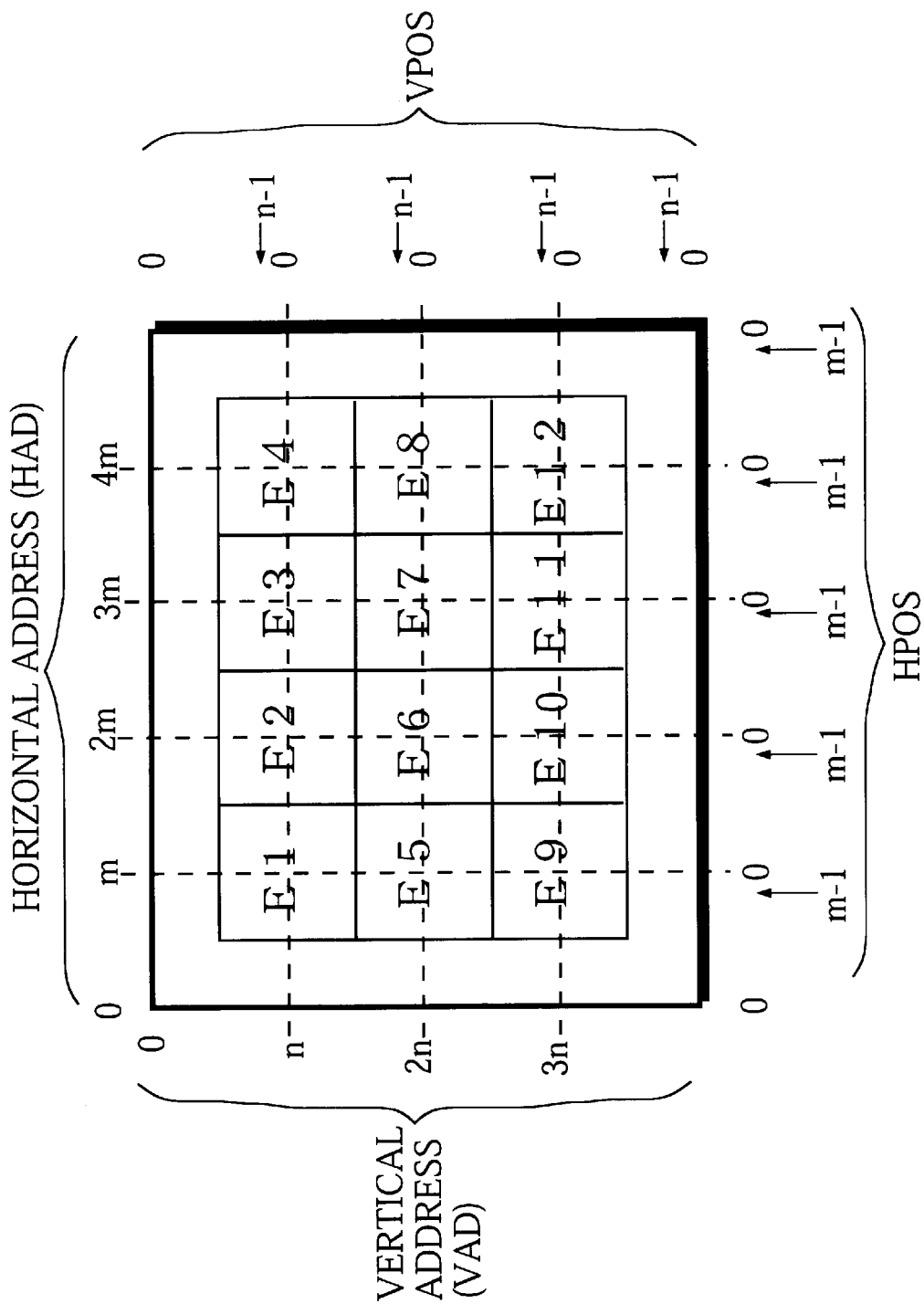
FIG. 21 is a schematic diagram showing relative horizontal positions and relative vertical positions.

As shown in FIG. 21, the parallax calculation regions E1–E12 of FIG. 2 are defined in the following manner. A whole screen is divided into 20 regions (hereinafter referred to as "first segment region") arranged in 4 rows and 5 columns, as indicated by broken lines in FIG. 21. A rectangular area having four vertexes positioned at respective centers of upper left, upper right, lower left and lower right first segment regions is divided into 12 regions (hereinafter referred to as "second segment region") arranged in 3 rows and 4 columns. These 12 second segment regions are defined as the parallax calculation regions E1–E12, respectively.

In the figure, "m" denotes a number of horizontal pixels of the first or second segment region whereas "n" denotes a number of vertical pixels of the first or second segment region. The relative horizontal position of the input image signal is denoted by any one of the numerals of not less than 0 to (m−1) with "0" indicating a left end position and "(m−1)" indicating a right end position of each first segment region. A relative vertical position of the input image signal is denoted by any one of the numerals of not less than 0 to (n−1) with "0" indicating an upper end position and (n−1) indicating a lower end position of each first segment region.

The relative horizontal position signal HPOS and the relative vertical position signal VPOS of the input image signal are supplied to the parallax interpolation factor generating circuit 52. Based on the relative horizontal position signal HPOS, relative vertical position signal VPOS and the following equations (4), the parallax interpolation factor generating circuit 52 generates and outputs a first parallax interpolation factor KUL, a second parallax interpolation factor KUR, a third parallax interpolation factor KDL and a fourth parallax interpolation factor KDR:

$$KUL=\{(m-HOPS)/m\}\times\{(n-VPOS)/n\}$$

$$KUR=(HPOS/m)\times\{(N-VPOS)/n\}$$

$$KDL=\{(m-HPOS)/m\}\times(VPOS/n)$$

$$KDR=(HPOS/m)\times(VPOS/n) \quad (4)$$

Figure 22:
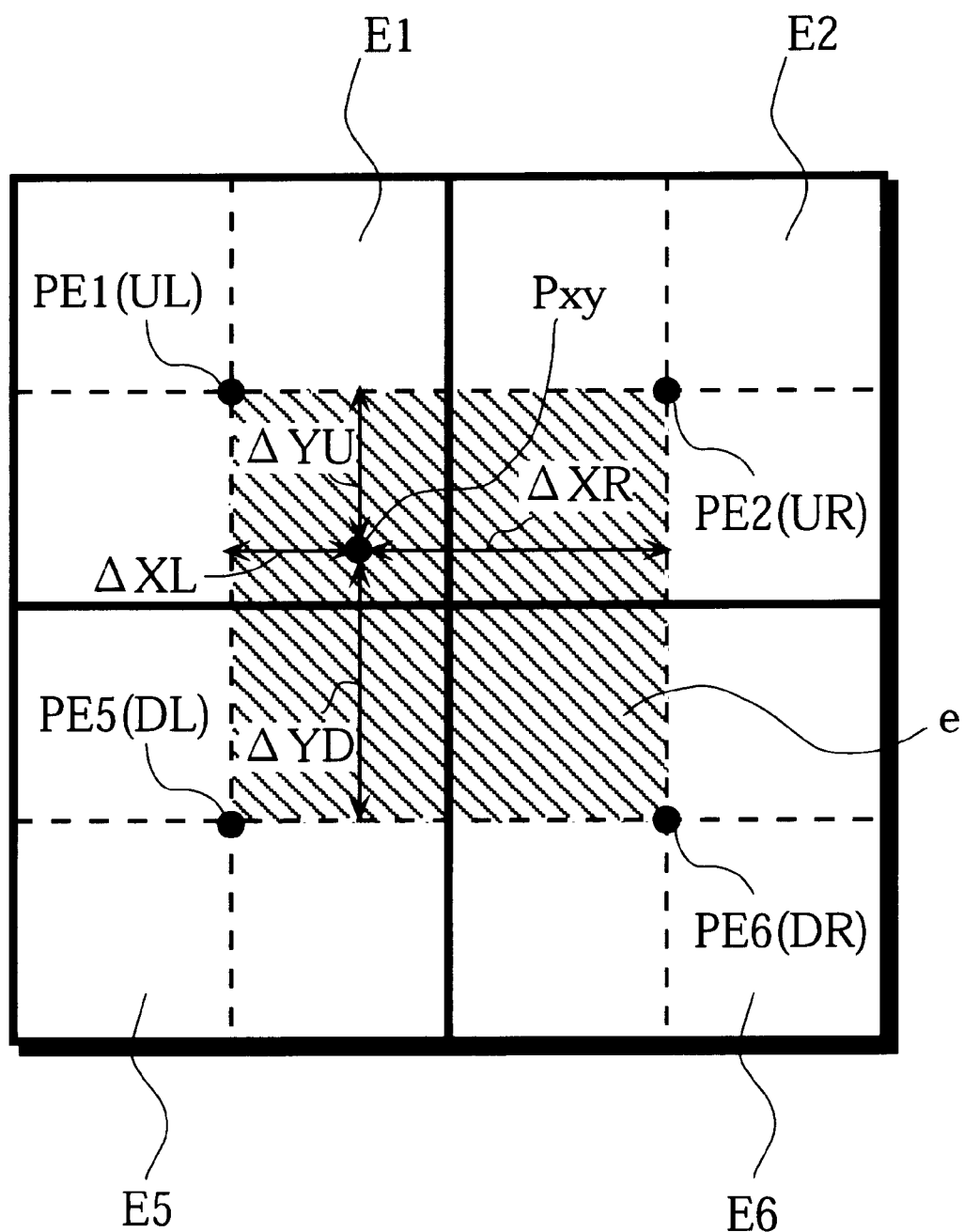
FIG. 22 is a schematic diagram illustrating a method of generating parallax information on a target pixel.

Now referring to FIG. 22, description will be made on a basic concept of a method of generating the parallax information on each pixel position in the one-field screen. It is assumed that a horizontal/vertical position (hereinafter referred to as "target position") indicated by the horizontal address signal HAD and the vertical address signal VAD is at Pxy in FIG. 22. How to obtain parallax information on the target position Pxy will be described as below.

(1) First, out of the parallax information on the respective parallax calculation regions E1–E12 calculated by the CPU 3, parallax information pieces on the parallax calculation regions E1, E2, E5 and E6 are first extracted as UL, UR, DL and DR, respectively, in this example. The regions E1, E2, E5 and E6 include four vertexes PE1, PE2, PE5, PE6 of a first segment region with the target position Pxy at their respective centers. More specifically, the parallax information piece on the region E1, wherein the upper left vertex of the first segment region with the target position Pxy is located at the center thereof, is extracted as a first parallax information UL, the parallax information piece on the region E2 with the upper right vertex of the first segment region located at its center being extracted as a second parallax information UR, the parallax information piece on the region E5 with the lower left vertex of the first segment region located at its center as a third parallax information DL and the parallax information piece on the region E6 with the lower right vertex of the first segment region located at its center as a fourth parallax information DR.

It is to be noted that in a case where only one of the four vertexes of a first segment region with the target position is at the center of a parallax calculation region like when the first segment region is at the upper left corner of the screen, a parallax information piece on this parallax calculation region is extracted as the first to the fourth parallax information pieces UL, UR, DL, DR.

In a case where only lower two of the four vertexes of a first segment region with the target position are located at the respective centers of parallax calculation regions like when the first segment region with the target pixel adjoins an upper-left-corner first segment region on its right side, parallax information pieces on parallax calculation regions corresponding to the lower two vertexes of the first segment region are extracted also as parallax information pieces UL and UR on parallax calculation regions corresponding to the upper two vertexes thereof.

In a case where only right-hand two of the four vertexes of a first segment region with the target position are located at the respective centers of parallax calculation regions like when the first segment region with the target pixel is immediately under the upper-left-corner first segment region, parallax information pieces on the parallax calculation regions corresponding to the right-hand two vertexes of the first segment region are extracted also as parallax information pieces UL, DL on parallax calculation regions corresponding to the left-hand two vertexes thereof.

In a case where only upper two of the four vertexes of a first segment region with the target position are located at the respective centers of parallax calculation regions like when the first segment region with the target pixel adjoins a lower-right-corner first segment region on its left side, parallax information pieces on the parallax calculation regions corresponding to the upper two vertexes of the first segment region are extracted also as parallax information pieces DL, DR on parallax calculation regions corresponding to the lower two vertexes thereof.

In a case where only left-hand two of the four vertexes of a first segment region with the target position are located at the respective centers of parallax calculation regions like when the first segment region with the target pixel is located immediately above the lower-right-corner first segment region, parallax information pieces on the parallax calculation regions corresponding to the left-hand two vertexes of the first segment region are extracted also as parallax information pieces UR, DR on parallax calculation regions corresponding to the right-hand two vertexes thereof.

(2) Subsequently, the first to fourth parallax interpolation factors KUL, KUR, KDL and KDR are determined.

The first parallax interpolation factor KUL is given by a product of a ratio $\{(m-HPOS)/m\}$ of a distance $\Delta XR$ between the target position Pxy and a right side of a first segment region e with the target position Pxy versus a horizontal length m of the first segment region e, and a ratio $\{(n-VPOS)/n\}$ of a distance $\Delta YD$ between the target position Pxy and a lower side of the first segment region e versus a vertical length n of the first segment region e. That is, the first parallax interpolation factor KUL correspondingly increases as a distance between an upper left vertex PE1 of the first segment region e with the target position Pxy and the target position Pxy decreases.

The second parallax interpolation factor KUR is given by a product of a ratio (HPOS/m) of a distance $\Delta XL$ between the target position Pxy and a left side of the first segment region e with the target position Pxy versus the horizontal length m of the first segment region e, and a ratio $\{(n-VPOS)/n\}$ of a distance $\Delta YD$ between the target position Pxy and the lower side of the first segment region e versus the vertical length n of the first segment region e. That is, the second parallax interpolation factor KUR correspondingly increases as a distance between an upper right vertex PE2 of the first segment region e with the target position Pxy and the target position Pxy decreases.

The third parallax interpolation factor KDL is given by a product of a ratio $\{(m-HPOS)/m\}$ of a distance $\Delta XR$ between the target position Pxy and the right side of the first segment region e with the target position Pxy versus the horizontal length m of the first segment region e, and a ratio (VPOS/n) of a distance $\Delta YU$ between the target position Pxy and an upper side of the first segment region e versus the vertical length n of the first segment region e. That is, the third parallax interpolation factor KDL correspondingly increases as a distance between a lower left vertex PE5 of the first segment region e with the target position Pxy and the target position Pxy decreases.

The fourth parallax interpolation factor KDR is given by a product of a ratio (HPOS/m) of a distance $\Delta XL$ between the target position Pxy and the left side of the first segment region e with the target position Pxy versus the horizontal length m of the first segment region e, and a ratio (VPOS/n) of a distance $\Delta YU$ between the target position Pxy and the upper side of the first segment region e versus the vertical length n of the first segment region e. That is, the fourth parallax interpolation factor KDR correspondingly increases as a distance between a lower right vertex PE6 of the first segment region e with the target position Pxy and the target position Pxy decreases.

(3) The first to the fourth parallax information pieces UL, UR, DL, DR extracted in the aforesaid step (1) are respectively multiplied by the first to the fourth parallax interpolation factors KUL, KUR, KDL, KDR given in the aforesaid step (2). Then, parallax information on the target position Pxy is generated by summing up the resultant four products.

The parallax information storage means 60 includes first to twelfth parallax registers 61–72 in corresponding relation with the regions E1–E2, respectively. The first to twelfth parallax registers 61–72 respectively store the parallax information pieces on the regions E1–E12 generated by the CPU 3.

The parallax selection circuit 80 is provided rearwardly of the parallax information storage means 60. The parallax selection circuit 80 is supplied with the parallax information by the parallax registers 61–72 respectively. Furthermore, the parallax selection circuit 80 is also supplied with the horizontal address signal HAD and the vertical address signal VAD by the timing signal generating circuit 51.

According to a rule shown in FIG. 23a, the parallax selection circuit 80 selectively outputs parallax information on a region corresponding to a horizontal address signal HAD and a vertical address signal VAD (in the example shown in FIG. 22, the parallax calculation region wherein the upper left vertex of the first segment region with the target position is located at the center thereof) as the first parallax information UL. Further according to a rule shown in FIG. 23b, the parallax selection circuit 80 selectively outputs parallax information on a region corresponding to a horizontal address signal HAD and a vertical address signal VAD (in the example of FIG. 22, the parallax calculation region wherein the upper right vertex of the first segment region with the target position is located at the center thereof) as the second parallax information UR.

According to a rule shown in FIG. 23c, the parallax selection circuit 80 selectively outputs parallax information on a region corresponding to a horizontal address signal HAD and a vertical address signal VAD (in the example of FIG. 22, the parallax calculation region wherein the lower left vertex of the first segment region with the target position is located at the center thereof) as the third parallax information DL. Further according to a rule shown in FIG. 23d, the parallax selection circuit 80 selectively outputs parallax information on a region corresponding to a horizontal address signal HAD and a vertical address signal VAD (in the example of FIG. 22, the parallax calculation region wherein the lower right vertex of the first segment with the target position is located at the center thereof) as the fourth parallax information DR. In FIG. 23, a representation "a~b" like "0~m" denotes a value of not less than "a" and less than "b".

The first parallax information UL, the second parallax information UR, the third parallax information DL and the fourth parallax information DR, which are selected by the parallax selection circuit 80, are applied to the first to the fourth multipliers 81–84, respectively.

The first to the fourth multipliers 81–84 also receives from the parallax interpolation factor generating circuit 52 the first parallax interpolation factor KUL, the second parallax interpolation factor KUR, the third parallax interpolation factor KDL and the fourth parallax interpolation factor KDR, respectively.

The first multiplier 81 multiplies the first parallax information UL by the first parallax interpolation factor KUL. The second multiplier 82 multiplies the second parallax information UR by the second parallax interpolation factor KUR. The third multiplier 83 multiplies the third parallax information DL by the third parallax interpolation factor KDL. The fourth multiplier 84 multiplies the fourth parallax information DR by the fourth parallax interpolation factor KDR.

Outputs of these multipliers 81–84 are added together by the adder circuit 85 for generating parallax information PR on the target position.

The optional pixel delays FIFOs 11 and 21 each include a pair of line memories 11a–11b or 21a–21b for performing horizontal phase control on a basis smaller than one pixel. The respective pairs of line memories 11a–11b and 21a–21b of the optional pixel delays FIFOs 11, 21 are supplied with Y signal and the clock signal CLK.

The horizontal address signal HAD outputted from the timing signal generating circuit 51 is also applied to a standard address generating circuit 90. The standard address generating circuit 90 generates and outputs a standard write address WAD and a standard read address RAD for each of the line memories 11a–11b and 21a–21b of the optional pixel delays FIFOs 11 and 21. Further, the standard address generating circuit 90 also outputs a synchronizing signal Csync added to the left-eye image signal and the right-eye image signal which are generated by the 2D/3D converter. A horizontal synchronizing signal represented by the synchronizing signal Csync is delayed relative to the horizontal synchronizing signal Hsync of the input image signal by a predetermined number of clocks.

The standard read address RAD is delayed relative to the standard write address WAD by a predetermined number of clocks so that the horizontal phase of the image signal inputted in the respective optional pixel delays FIFOs 11, 21 may lead or lag relative to a reference horizontal phase defined by the standard read address. The standard write address WAD outputted from the standard address generating circuit 90 is applied to the respective pairs of line memories 11a–11b and 21a–21b of the optional pixel delays FIFOs 11, 21 as a write control signal indicative of an address to write to.

The standard read address RAD outputted from the standard address generating circuit 90 is applied to an adder 91 and a subtractor 92. The adder 91 and the subtractor 92 are also supplied with the parallax information PR on the target position which is supplied from the adder circuit 85.

The adder 91 serves to add the parallax information PR to the standard read address RAD, thereby giving a left-eye image read address PRL.

An integer portion PRL1 of the left-eye image read address PRL is applied, as a read address RADL1, to the first line memory 11a of the left-eye image optional pixel delay FIFO 11. This permits Y signal to be read out from an address of the first line memory 11a in correspondence to the address RADL1. The Y signal thus read out is applied to a first left-eye image multiplier 101.

An address value given by adding 1 to the integer portion PRL1 of the left-eye image read address PRL is applied as a read address RADL2 to the second line memory 11b of the left-eye image optional pixel delay FIFO 11. This permits Y signal to be read out from an address of the second line memory 11b in correspondence to the address RADL2. The Y signal thus read out is applied to a second left-eye image multiplier 102.

The read address RADL1 for the first line memory 11a differs from the read address RADL2 for the second line memory 11b by "1" and therefore, the Y signal read out from the first line memory 11a has a horizontal position shifted by "1" from that of the Y signal read out from the second line memory 11b.

A decimal fraction portion PRL2 of the left-eye image read address PRL is applied, as a second left-eye image interpolation factor, to the second left-eye image multiplier 102. A value (1–PRL2), which is obtained by subtracting the decimal fraction portion PRL2 of the left-eye image read address PRL from 1, is applied to the first left-eye image multiplier 101, as a first left-eye image interpolation factor.

Thus, the first left-eye image multiplier 101 multiplies the Y signal read out from the first line memory 11a by the first left-eye image interpolation factor (1–PRL2). The second left-eye image multiplier 102 multiplies the Y signal read out from the second line memory 11b by the second left-eye image interpolation factor PRL2. The resultant Y signals thus given by these multipliers 101, 102 are added together by an adder 103 and then outputted as a left-eye image Y signal YL-OUT.

Thus is obtained the left-eye image Y signal, a horizontal phase value of which lags relative to the reference horizontal phase defined by the standard read address RAD by a value based on the parallax information on the target position.

The subtractor 92 serves to subtract the parallax information PR from the standard read address RAD, thereby giving a right-eye image read address PRR.

An integer portion PRR1 of the right-eye image read address PRR is applied, as a read address RADR1, to the first line memory 21*a* of the right-eye image optional pixel delay FIFO 21. This permits Y signal to be read out from an address of the first line memory 21*a* in correspondence to the address RADR1. The Y signal thus read out is applied to a first right-eye image multiplier 111.

An address value, which is given by adding 1 to the integer portion PRR1 of the right-eye image read address PRR, is applied, as a read address RADR2, to the second line memory 21*b* of the right-eye image optional pixel delay FIFO 21. This permits Y signal to be read out from an address of the second line memory 21*b* in correspondence to the address RADR2. The Y signal thus read out is applied to a second right-eye image multiplier 112.

The read address RADR1 for the first line memory 21*a* differs from the read address RADR2 for the second line memory 21*b* by 1 and therefore, the Y signal read out from the first line memory 21*a* has a horizontal position shifted by 1 from that of the Y signal read out from the second line memory 21*b*.

A decimal fraction portion PRR2 of the right-eye image read address PRR is applied, as a second right-eye image interpolation factor, to the second right-eye image multiplier 112. A value (1−PRR2), which is obtained by subtracting the decimal fraction portion PRR2 of the right-eye image read address PRR from 1, is applied to the first right-eye image multiplier 111, as a first right-eye image interpolation factor.

Thus, the first right-eye image multiplier 111 serves to multiply the Y signal read out from the first line memory 21*a* by the first right-eye image interpolation factor (1−PRR2). The second right-eye image multiplier 112 serves to multiply the Y signal read out from the second line memory 21*b* by the second right-eye image interpolation factor PRR2. The resultant Y signals thus given by these multipliers 111, 112 are added together by an adder 113 and then outputted as a right-eye image Y signal YR-OUT.

Thus is obtained the right-eye image Y signal, a horizontal phase value of which leads relative to the reference horizontal phase defined by the standard read address RAD by a value based on the parallax information on the target position.

Figure 24:
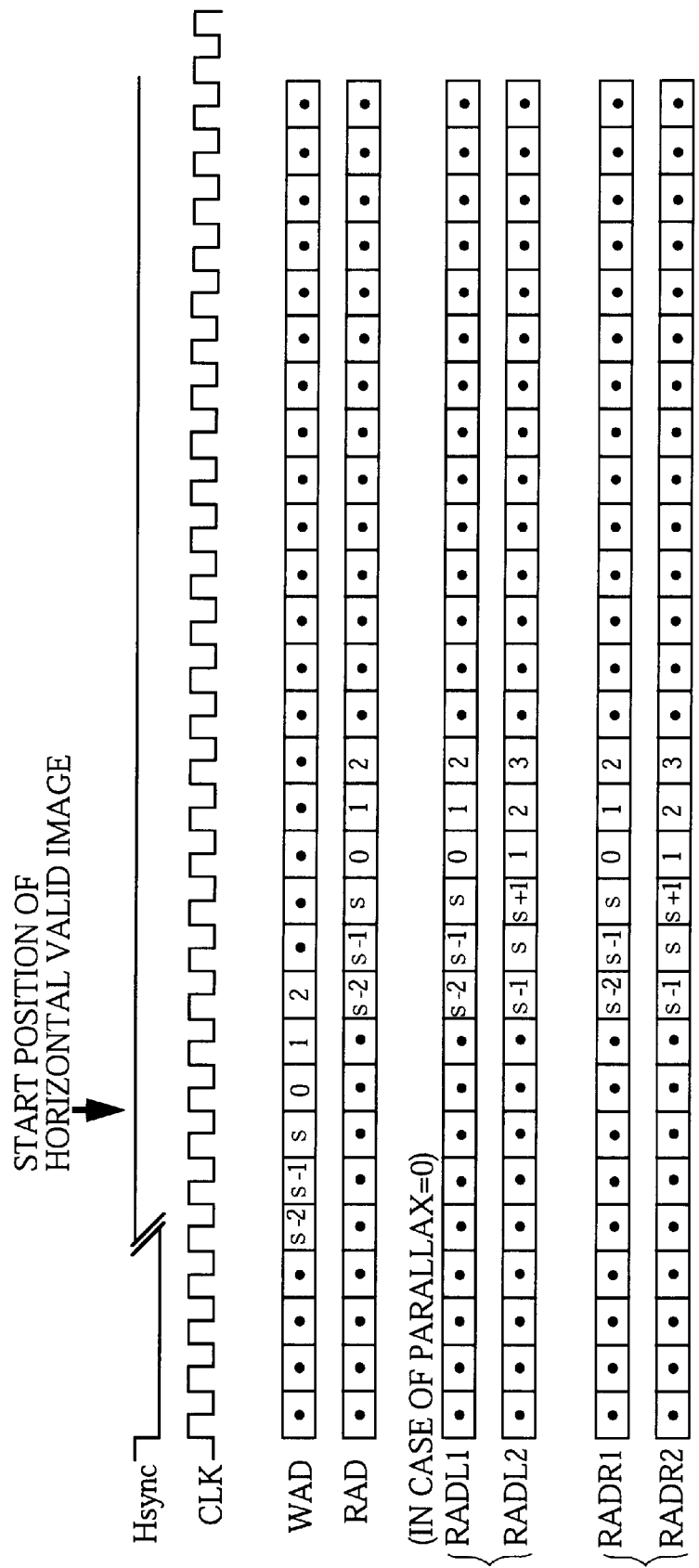
FIG. 24 is a timing chart showing signals in respective parts in a case where parallax information=0.

FIG. 24 is a timing chart showing signals in the respective parts when the parallax information on the target position is 0.

Where the parallax information is 0, the left-eye image read address PRL outputted from the adder 91 and the right-eye image read address PRR outputted from the subtractor 92 are both equal to the standard read address RAD, consisting only of the integer portion without the decimal fraction portion.

Therefore, the read address RADL1 for the first line memory 11*a* of the left-eye image optional pixel delay FIFO 11 and the read address RADR1 for the first line memory 21*a* of the right-eye image optional pixel delay FIFO 21 are both equal to the standard read address RAD.

On the other hand, the read address RADL2 for the second line memory 11*b* of the left-eye image optional pixel delay FIFO 11 and the read address RADR2 for the second line memory 21*b* of the right-eye image optional pixel delay FIFO 21 are both at a value greater than the standard read address RAD by 1.

The first left-eye image interpolation factor (1−PRL2) and the first right-eye image interpolation factor (1−PRR2) are both at a value of 1 whereas the second left-eye image interpolation factor PRL2 and the second right-eye image interpolation factor PRR2 are both at a value of 0.

As a result, the Y signal read out from the address of the first line memory 11*a* of the left-eye image optional pixel delay FIFO 11 in correspondence to the standard address RAD is outputted from the adder 103 as the left-eye image Y signal YL-OUT, whereas the Y signal read out from the address of the first line memory 21*a* of the right-eye image optional pixel delay FIFO 21 in correspondence to the standard address RAD is outputted from the adder 113 as the right-eye image Y signal YR-OUT. That is, the two Y signals having the same horizontal phase shift value or the two Y signals without parallax are outputted as the left-eye image Y signal and the right-eye image Y signal.

Figure 26:
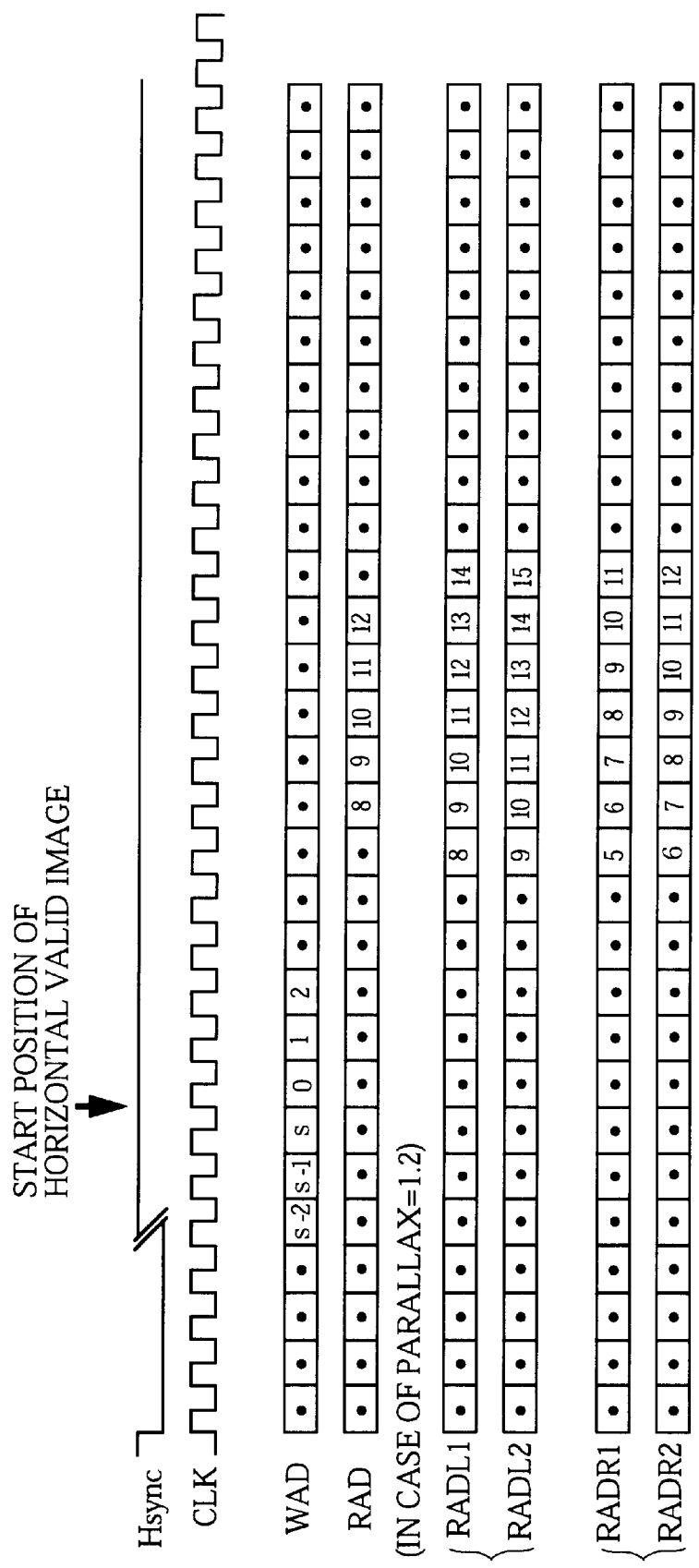
FIG. 26 is a timing chart showing signals in the respective parts in a case where parallax information=1.2.

FIG. 25 is a block diagram showing specific values of the respective addresses in a case where the standard write address WAD for a certain target position is at 20, the standard read address for the target position is at 10 and the parallax information on the target position is 1.2. FIG. 26 is a timing chart showing signals at the respective parts in this example.

In this case, a left-eye image read address PLR outputted from the adder 91 is at 11.2, the integer portion PRL1 of which is 11 and the decimal fraction portion PRL2 of which is 0.2.

Accordingly, the read address RADL1 for the first line memory 11*a* of the left-eye image optional pixel delay FIFO 11 is at 11 whereas the read address RADL2 for the second line memory 11*b* thereof is at 12. On the other hand, the first left-eye image interpolation factor KL1{=(1−PRL2)} is 0.8 whereas the second left-eye image interpolation factor KL2 (=PRL2) is 0.2.

Thus, a Y signal ($Y_{11}$) is read out from the address 11 of the first line memory 11*a* of the left-eye image optional pixel delay FIFO 11 so that the first multiplier 101 outputs a signal ($0.8 \times Y_{11}$) given by multiplying the read Y signal ($Y_{11}$) by 0.8.

On the other hand, a Y signal ($Y_{12}$) is read out from the address 12 of the second line memory 11*b* of the left-eye image optional pixel delay FIFO 11 so that the second multiplier 102 outputs a signal ($0.2 \times Y_{12}$) given by multiplying the read Y signal ($Y_{12}$) by 0.2. Then, the adder 103 outputs a left-eye image Y signal YL-OUT which is equal to $0.8 \times Y_{11} + 0.2 \times Y_{12}$. In other words, the Y signal corresponding to the read address of 11.2 is outputted as the left-eye image Y signal YL-OUT.

The subtractor 92 outputs a right-eye image read address PRR of 8.8, the integer portion of which is 8 and the decimal fraction portion of which is 0.8.

Accordingly, a read address RADR1 for the first line memory 21*a* of the right-eye image optional pixel delay FIFO 21 is at 8 whereas a read address RADR2 for the second line memory 21*b* is at 9. On the other hand, the first right-eye image interpolation factor KR1{=(1−PPR2)} is 0.2 whereas the second right-eye image interpolation factor KR2(=PRR2) is 0.8.

Thus, a Y signal($Y_8$) is read out from the address 8 of the first line memory 21*a* of the right-eye image optional pixel delay FIFO 21 so that the first multiplier 111 outputs a signal ($0.2 \times Y_8$) given by multiplying the read Y signal ($Y_8$) by 0.2.

On the other hand, a Y signal ($Y_9$) is read out from the address 9 of the second line memory 21*b* of the right-eye image optional pixel delay FIFO 21 so that the second multiplier 112 outputs a signal ($0.8 \times Y_9$) given by multiplying the read Y signal ($Y_9$) by 0.8. Then, the adder 113 outputs a right-eye image Y signal YR-OUT equal to $0.2 \times Y_8 + 0.8 \times Y_9$. In other words, the Y signal corresponding to the read address of 8.8 is outputted as the right-eye image Y signal YR-OUT.

As a result, there are obtained left-eye and right-eye images each having a parallax of 11.2−8.8=2.4, which is twice the parallax information piece of 1.2.

The 2D/3D image conversion apparatus according to the above embodiment eliminates the need for the field memories for generating the image signal timed delayed relative to the original 2D image signal and hence, accomplishes the cost reduction. Additionally, the 2D/3D image conversion apparatus of the above embodiment is adapted to produce the stereoscopic image even from the original 2D image signal representing the still image.

[Second Embodiment]

Now referring to FIGS. 2, 15 and 27 to 42, a second embodiment of the invention will be described.

Figure 27:
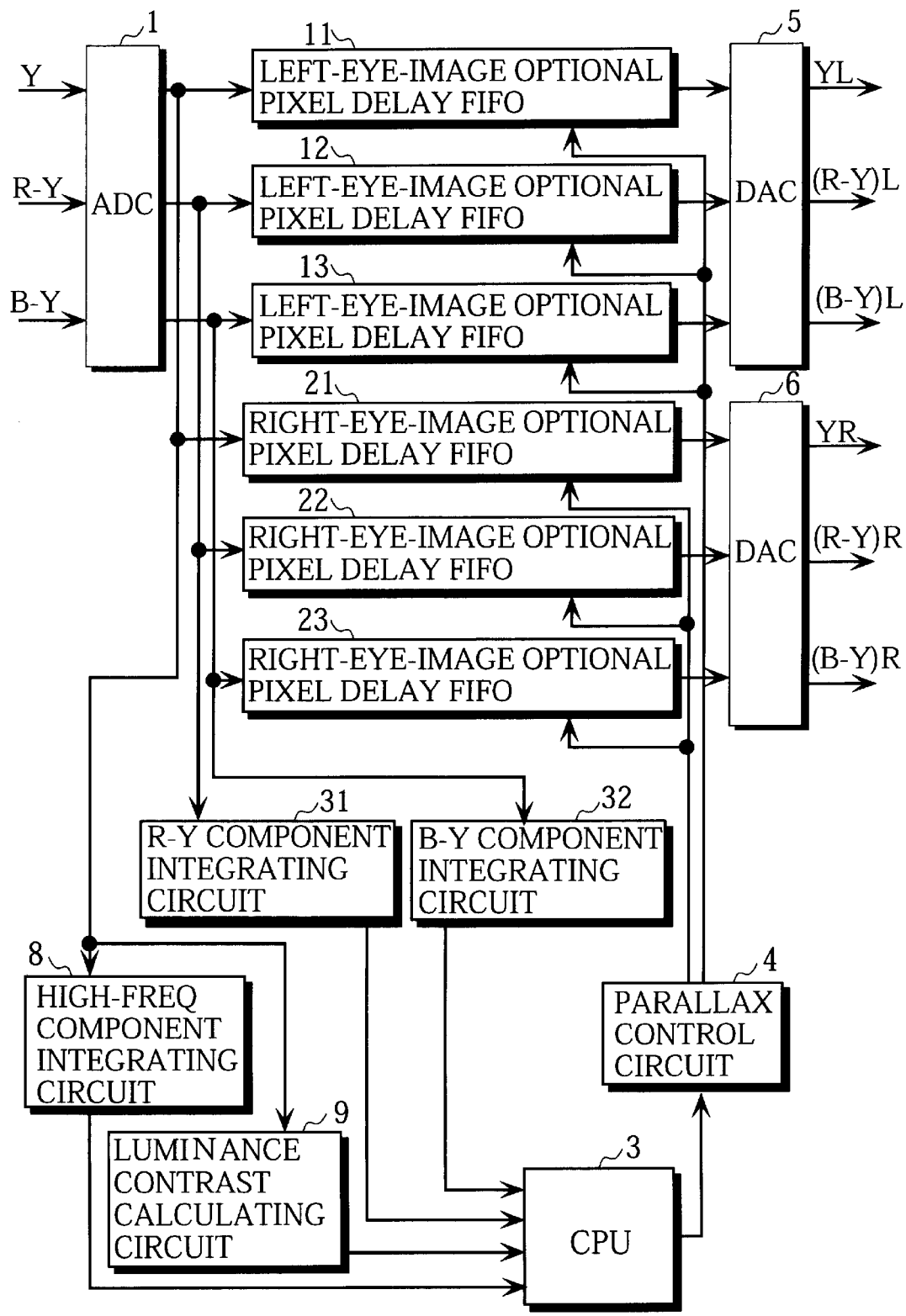
FIG. 27 is a block diagram showing an exemplary whole construction of a 2D/3D image conversion apparatus according to the invention.

FIG. 27 is a block diagram showing a whole construction of a 2D/3D image conversion apparatus for converting two-dimensional images into three-dimensional images. In the figure, like parts to those shown in FIG. 1 are represented by like reference numerals, respectively.

The luminance signal Y and color difference signals R-Y and B-Y, which compose the 2D image signal, are respectively converted into the digital Y signal, R-Y signal and B-Y signal by the AD conversion circuit 1 (ADC)

Y signal is supplied to the luminance integrating circuit 7, the high-frequency component integrating circuit 8 and the luminance contrast calculating circuit 8 as well as to the first left-eye-image optional pixel delay FIFO 11 and the first right-eye-image optional pixel delay FIFO 21. R-Y signal is supplied to an R-Y component integrating circuit 31 as well as to the second left-eye-image optional pixel delay FIFO 12 and the second right-eye-image optional pixel delay FIFO 22. B-Y signal is supplied to a B-Y component integrating circuit 32 as well as to the third left-eye-image optional pixel delay FIFO 13 and the third right-eye-image optional pixel delay FIFO 23.

The high-frequency component integrating circuit 8 has the same configuration with the circuit 8 of FIG. 1, calculating a high-frequency component integration value of each of the parallax calculation regions E1–E12 on a field-by-field basis, the parallax calculation regions E1–E12 being previously defined in the one-field screen, as shown in FIG. 2.

The luminance contrast calculating circuit 9 has the same configuration with the circuit 9 of FIG. 1, calculating a luminance contrast of each of the parallax calculation regions E1–E12 on a field-by-field basis.

The R-Y component integrating circuit 31 calculates an integration value of R-Y component of each of the parallax calculation regions E1–E12 on a field-by-field basis. The B-Y component integrating circuit 32 calculates an integration value of B-Y component of each of the parallax calculation regions E1–E12 on a field-by-field basis. The R-Y component integrating circuit 31 and the B-Y component integrating circuit 32 are essentially configured the same way as the luminance integrating circuit shown in FIG. 3. More specifically, the R-Y component integrating circuit 31 is established by inputting the R-Y component to a like circuit to the luminance integrating circuit of FIG. 3.

Likewise, the B-Y component integrating circuit 32 is established by inputting the B-Y component to the like circuit to the luminance integrating circuit of FIG. 3.

The high-frequency component integration values, luminance contrasts, R-Y component integration values and B-Y component integration values of the respective parallax calculation regions E1–E12 are used as the perspective image characteristic values of the respective parallax calculation regions E1–E12.

In actual practice, the one-field screen includes a total of 60 parallax calculation regions arranged in 6 rows and 10 columns, as shown in FIG. 15. However, it is assumed for easy reference purposes that a total of 12 parallax calculation regions E1–E12 as arranged in 3 rows and 4 columns are defined in the one-field screen, as shown in FIG. 2.

The CPU 3 generates parallax information on the respective parallax calculation regions E1–E12 based on information supplied from the high-frequency component integrating circuit 8, luminance contrast calculating circuit 9, R-Y component integrating circuit 31 and B-Y component integrating circuit 32. In this example, the parallax information is generated such that a region representing an object located more to the front, like the subject of the scene, has correspondingly a smaller parallax value, while a region representing an object located more to the back, like the background of the scene, has correspondingly a greater parallax value. A method of generating the parallax information will hereinafter be described in detail.

The parallax information per parallax calculation region E1–E12 thus calculated by the CPU 3 is sent to a parallax control circuit 4. The parallax control circuit 4, in turn, generates parallax information per pixel position in each field based on the parallax information per parallax calculation region E1–E12. Based on the parallax information per pixel position, the parallax control circuit 4 controls the read addresses of FIFOs 11–13 and 21–23 to read the image signal (Y, R-Y and B-Y signals) therefrom such that the read addresses of the left-eye-image optional pixel delays FIFOs 11–13 are shifted from the read addresses of the right-eye-image optional pixel delays FIFOs 21–23, respectively. Hence, the left-eye image signal read out from the left-eye-image optional pixel delays FIFOs 11–13 has a different horizontal phase from the right-eye image signal read out from the right-eye-image optional pixel delays FIFOs 21–23 does.

The left-eye image signal (YL signal, (R-Y) L signal and (B-Y) L signal) read out from the left-eye-image optional pixel delays FIFOs 11–13 is converted into an analog signal by the DA conversion circuit (DAC) 5 before supplied to an unillustrated 3D display unit. The right-eye image signal (YR signal, (R-Y) R signal and (B-Y) R signal) read out from the right-eye-image optional pixel delays FIFOs 21–23 is converted into an analog signal by the DA conversion circuit (DAC) 6 before supplied to the unillustrated 3D display unit.

Since the left-eye image signal has a different horizontal phase from that of the right-eye image signal, a parallax is produced between the left eye image and the right eye image. As a result, by viewing the left eye image with the left eye alone and the right eye image with the right eye alone, a stereoscopic image is established wherein the subject is located to the front against the background.

Figure 28:
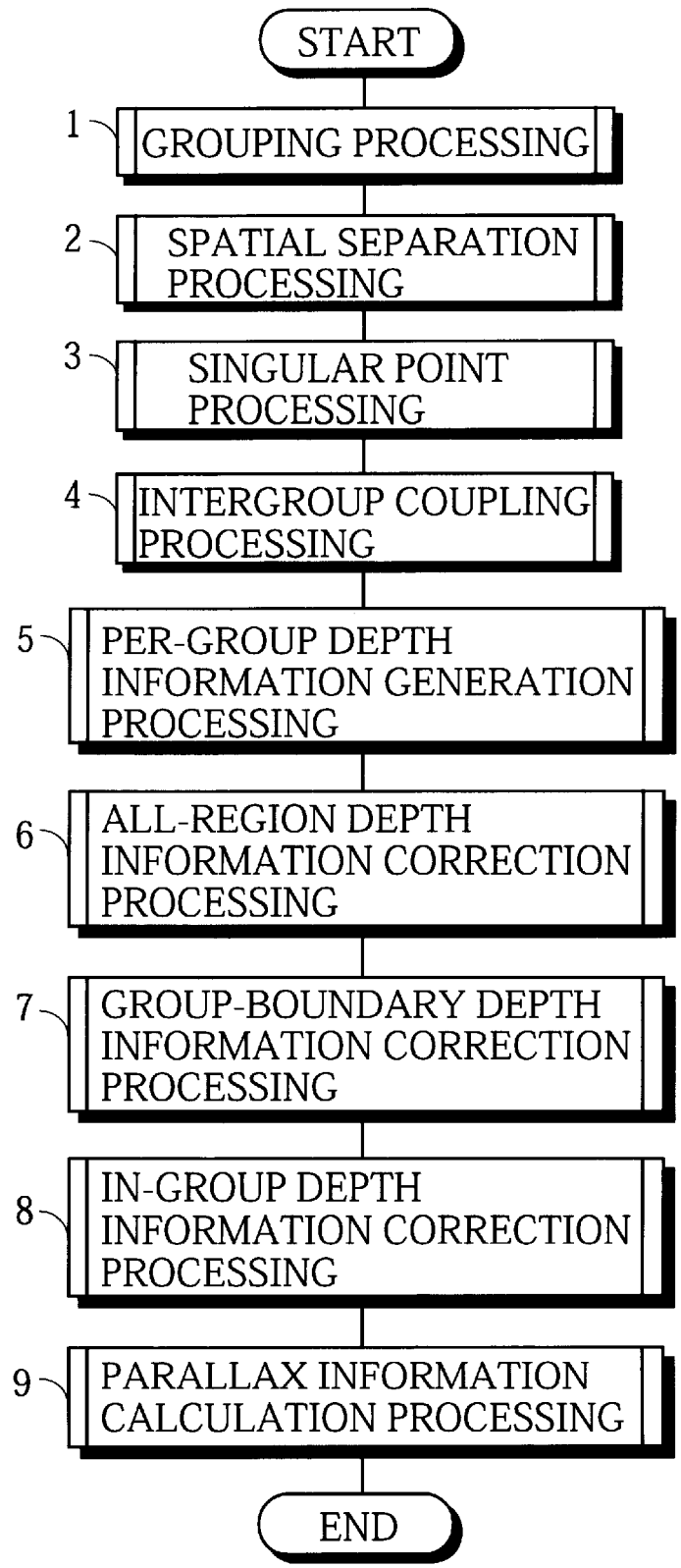
FIG. 28 is a flow chart representing steps in a parallax information generating procedure taken by the CPU.

FIG. 28 is a flow chart representing steps of a parallax information generating procedure taken by the CPU 3 on a per-parallax-calculation-region basis.

The parallax information generating procedure performed on each segment region includes: a grouping processing (Step 1); a spatial separation processing (Step 2) a singular point processing (Step 3); an intergroup coupling processing (Step 4); a per-group depth information generation processing (Step 5); an all-region depth information correction processing (Step 6); a group-boundary depth information correction processing (Step 7); an in-group depth information correction processing (Step 8); and a parallax information calculation processing (Step 9).

Now the parallax information generating procedure will hereinbelow be described by way of example of 60 parallax calculation regions actually defined in one field. FIG. 15 shows 60 parallax calculation regions F1–F60 actually defined in one field.

(1) Grouping Processing

The grouping processing of Step 1 is an initial processing of the procedure which is intended to divide all the regions constituting one image frame into groups associated with respective objects included in the image frame. There are two grouping methods which will be described as below.

(1-1) First Method

Figure 29:
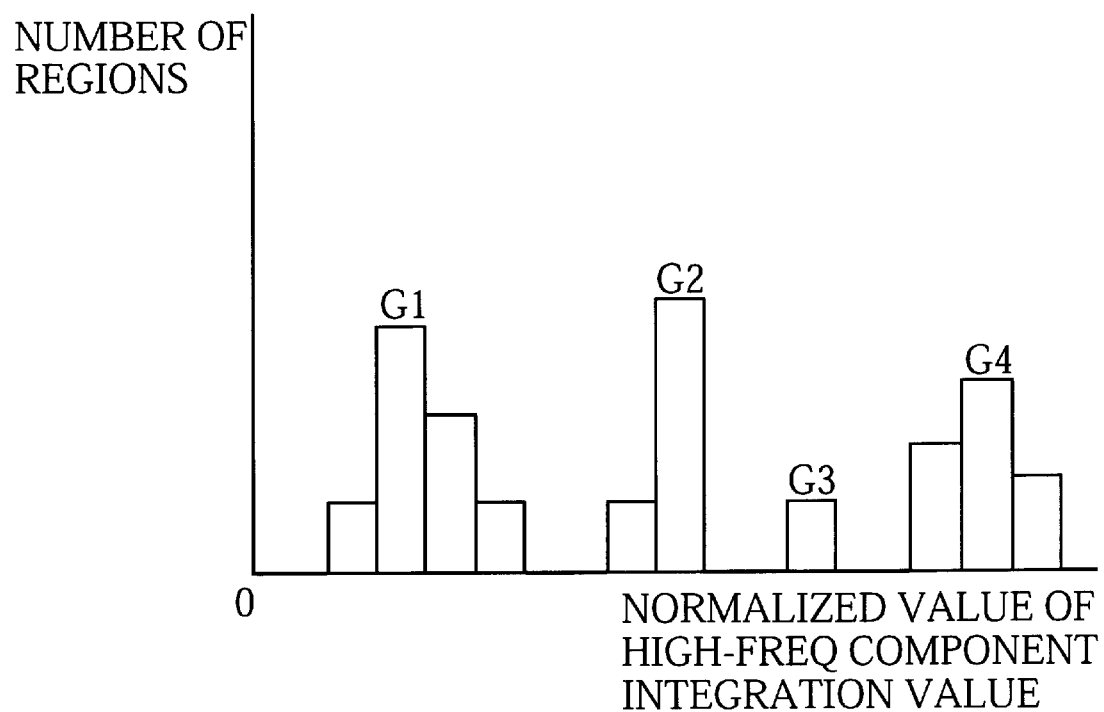
FIG. 29 is a histogram representing parallax calculation regions (in number) with respect to respective normalized values of high-frequency component integration values.
Figure 30:
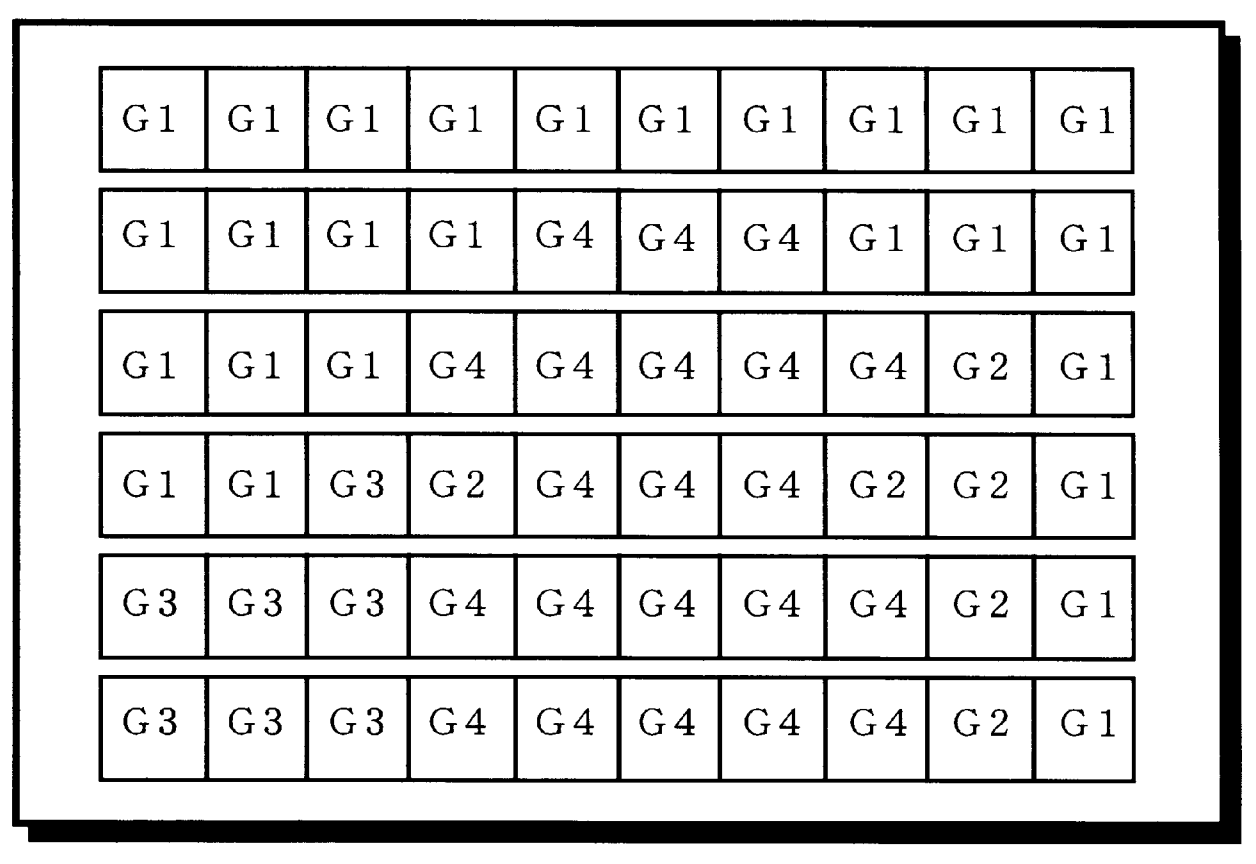

First, high-frequency component integration values of the respective parallax calculation regions F1–F60 are normalized to values in a predetermined range (e.g., 0 to 20). This is followed by the production of a distribution (histogram) of parallax calculation regions (in number) belonging to the respective high-frequency component integration values thus normalized. FIG. 29 shows an example of the histogram thus produced. Parallax calculation regions included in bars between valleys in the histogram are combined into one group. The histogram may be based on the luminance contrast instead of the high-frequency component integration value. FIG. 30 shows a result of dividing the parallax calculation regions F1–F60 into groups with symbols G1 to G4 each indicating a group number.

(1-2) Second Method

First, R-Y component integration values of the respective parallax calculation regions F1–F60 are normalized to values in a range of between 0 and 20. This is followed by the production of distribution (histogram) of parallax calculation regions (in number) belonging to the respective normalized values of the R-Y component integration values. Based on the resultant histogram, intergroup boundary values are found from the normalized values of the R-Y component integration values.

On the other hand, the B-Y component integration values of the respective parallax calculation regions F1–F60 are normalized to values in a range of between 0 and 10. This is followed by the production of distribution (histogram) of parallax calculation regions (in number) belonging to the respective normalized B-Y component integration values. Based on the resultant histogram, intergroup boundary values are found from the normalized B-Y component integration values.

Figure 31:
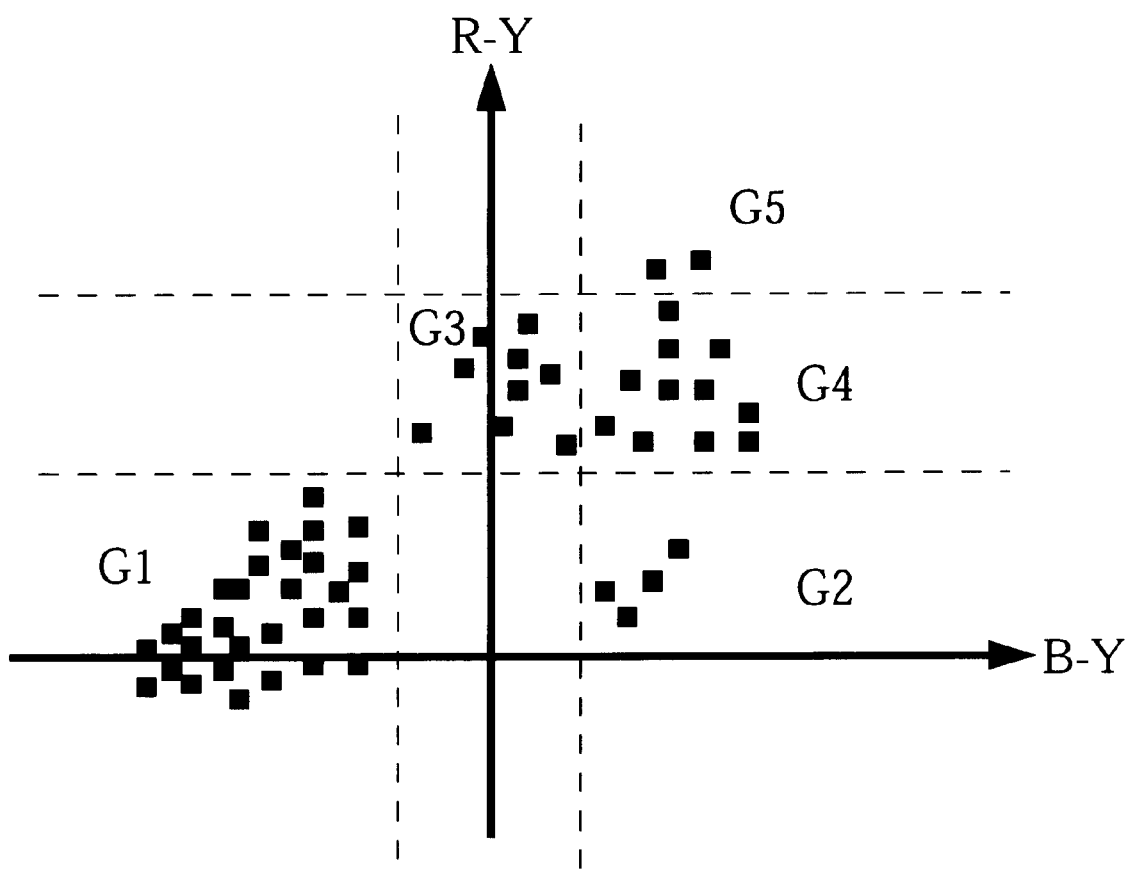
FIG. 31 is a graphical representation of a parallax calculation region distribution wherein the normalized values of R-Y component integration values are plotted as ordinate while the normalized values of B-Y component integration values are plotted as abscissa.
Figure 33:
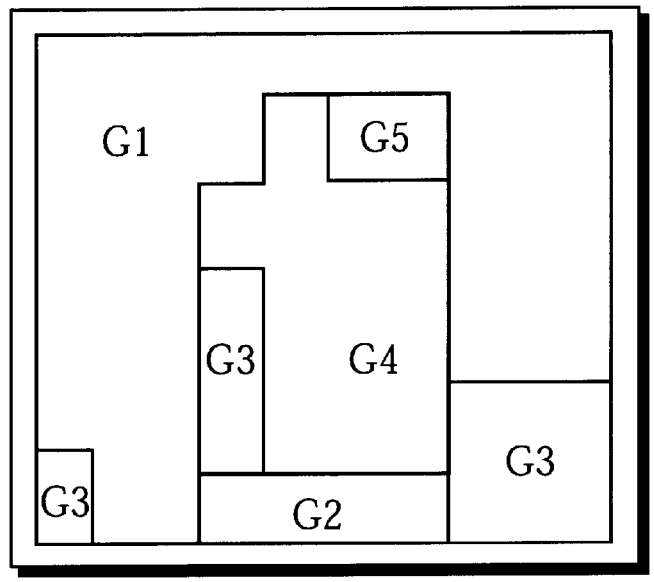
FIG. 33 is a schematic diagram showing the result of the grouping processing based on the graph of FIG. 31.

By using the two types of boundary values thus found, all the parallax calculation regions F1–F60 are divided into groups, as shown in FIG. 31. FIGS. 32 and 33 show results of dividing the parallax calculation regions F1–F60 into groups with symbols G1 to G5 each indicating a group number.

In this example, the grouping processing is performed according to the second method.

(2) Spatial Separation Processing

In the spatial separation processing of Step 2, out of the parallax calculation regions combined into the same group at Step 1, parallax calculation regions spatially adjoining each other are considered to belong to the same group. That is, although combined into the same group by the processing of Step 1, parallax calculation regions spatially separated by another group are considered to belong to different groups.

Figure 34:
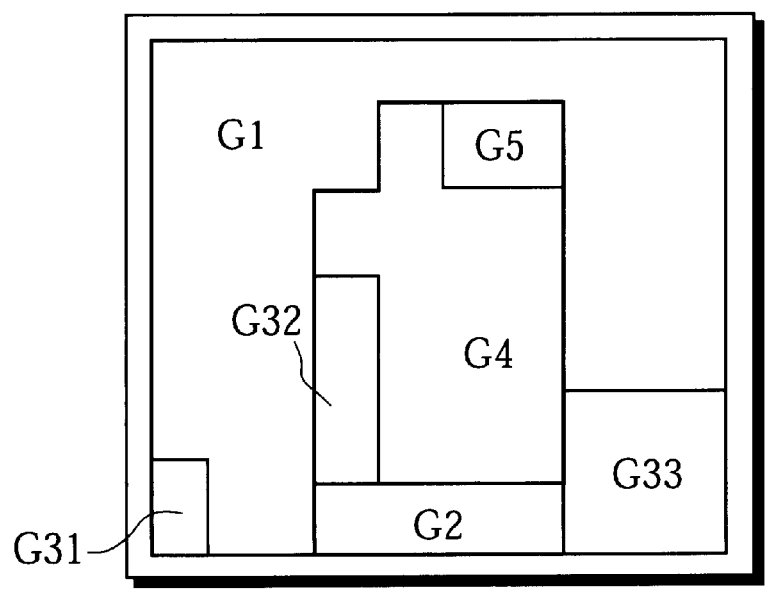
FIG. 34 is a schematic diagram showing a result of the grouping processing corrected through a spatial separation processing.

More specifically, the parallax calculation regions determined to belong to the group 3 (G3) are divided into three groups 31 (G31), 32 (G32) and 33 (G33), as shown in FIG. 34.

(3) Singular Point Processing

In a case where a group consisting of a single parallax calculation region exists, the singular point processing determines whether the single parallax calculation region corresponds to an object different from object(s) corresponded by neighboring groups or to the same object with that corresponded by any one of the neighboring groups.

Figure 35:
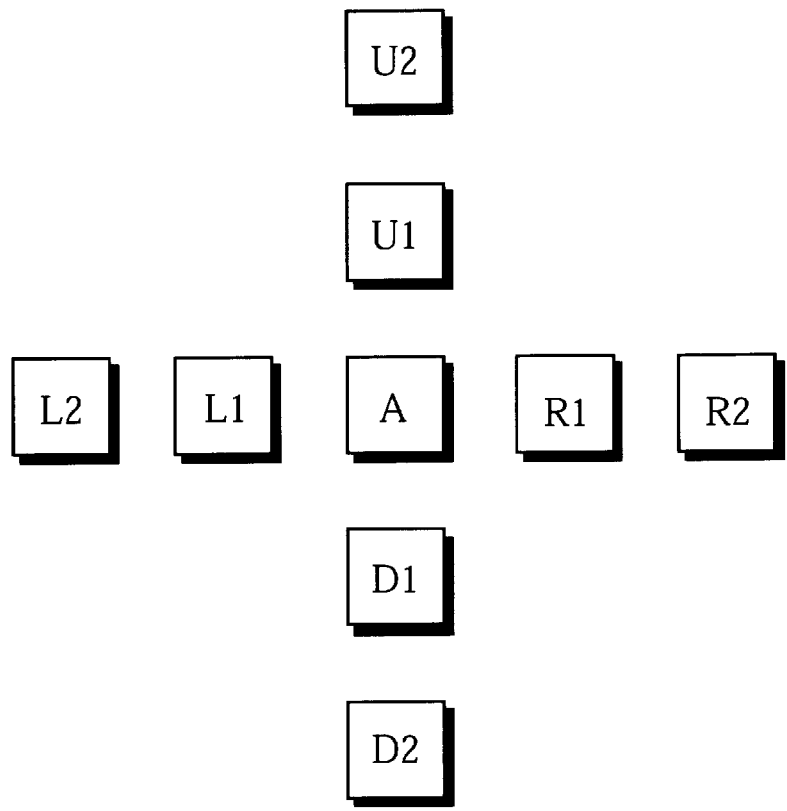
FIG. 35 is a schematic diagram illustrating a singular point processing.

It is assumed, for example, that a group consists of a parallax calculation region A alone, as shown in FIG. 35. In the figure, of the two parallax calculation regions located upwardly of the parallax calculation region A, the closer one to the region A is denoted by U1 and the other by U2. Of the two parallax calculation regions located downwardly of the region A, the closer one to the region A is denoted by D1 and the other by D2. Of the two parallax calculation regions located leftwardly of the region A, the closer one to the region A is denoted by L1 and the other by D2. Of the two parallax calculation regions located rightwardly of the region A, the closer one to the region A is denoted by R1 and the other by R2.

In this case, when color distances between the region A and the adjoining regions U1, D1, L1 and R1 are greater than those between the regions U1, D1, L1 and R1 and their adjoining regions U2, D2, L2 and R2, respectively, the group consisting of the region A alone is determined to constitute one independent group. Otherwise, the region A is determined to belong to any one of the neighboring groups. That is, the grouping of the regions is corrected.

Now, the definition of the color distance will be described. A color distance "dist" between a certain parallax calculation region Fa and another parallax calculation region Fb is defined by the following equation (5):

$$\text{dist} = |Fa(B\text{-}Y) - Fb(B\text{-}Y)| + |Fa(R\text{-}Y) - Fb(R\text{-}Y)| \quad (5)$$

wherein Fa(B-Y) and Fa(R-Y) denote a B-Y component integration value and an R-Y component integration value of the parallax calculation region Fa and Fb (B-Y) and Fb (R-Y) denote a B-Y component integration value and an R-Y component integration value of the parallax calculation region Fb.

Assumed that, for example, the region A shown in FIG. 35 has (B-Y component integration value, R-Y component integration value) of (−4, 5), the region U2 has those of (−5, 4) and the region U2 has those of (−7, 2). Then, a color distance "dist" between the regions A and U1 is "2" whereas a color distance "dist" between the regions U1 and U2 is "4".

Figure 36:
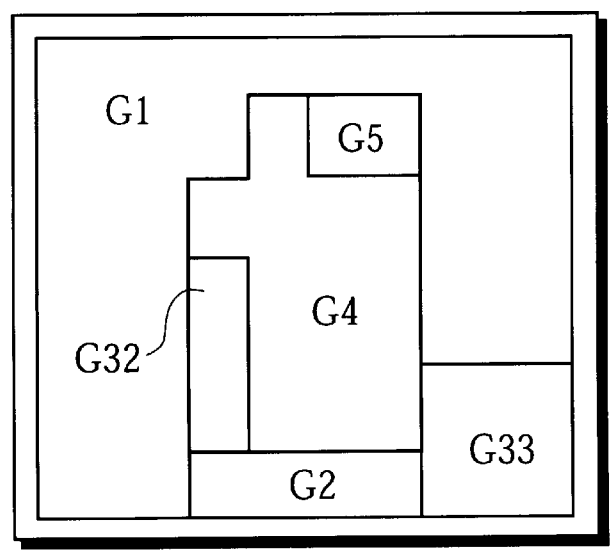
FIG. 36 is a schematic diagram showing a result of the grouping processing corrected through the singular point processing.

If the group 31 (G31) in FIG. 34 consists of a single parallax calculation region and is determined to belong to the group 1 (G1) by the above singular point processing, the grouping of the regions is corrected as shown in FIG. 36.

(4) Intergroup Coupling Processing

In the intergroup coupling processing of Step 4, firstly calculated are mean values of the R-Y component integration values and of the B-Y component integration values of parallax calculation regions constituting each group.

Subsequently, a color distance between adjacent groups is calculated. Assumed that the two adjoining groups are denoted by Ga and Gb. If the group Ga consists of n parallax calculation regions a1, a2, ... an, a mean value *Ga (B-Y) of the B-Y component integration values and a mean value *Ga (R-Y) of the R-Y component integration values of the group Ga are given by the following equations (6):

$$^*Ga(B\text{-}Y)=\{a1(B\text{-}Y)+a2(B\text{-}Y)+\ldots+an(B\text{-}Y)\}\div n$$

$$^*Ga(R\text{-}Y)=\{a1(R\text{-}Y)+a2(R\text{-}Y)+\ldots+an(R\text{-}Y)\}\div n \quad (6)$$

Assumed that the group Gb consists of m parallax calculation regions b1, b2, ... bm, a mean value *Gb(B-Y) of the B-Y component integration values and a mean value *Gb(R-Y) of the R-Y component integration values of the group Gb are given by the following equations (7):

$$^*Gb(B\text{-}Y)=\{b1(B\text{-}Y)+b2(B\text{-}Y)+\ldots+bm(B\text{-}Y)\}\div m$$

$$^*Gb(R\text{-}Y)=\{b1(R\text{-}Y)+b2(R\text{-}Y)+\ldots+bm(R\text{-}Y)\}\div m \quad (7)$$

A color distance "dist" between the groups Ga and Gb is defined by the following equation (8):

$$\text{dist}=|^*Ga(B\text{-}Y)-^*Gb(B\text{-}Y)|+|^*Ga(R\text{-}Y)-^*Gb(R\text{-}Y)| \quad (8)$$

Then, whether the color distance between the adjacent groups is smaller than a threshold value or not is determined. If the color distance is smaller than the threshold value, these two groups are coupled together or combined into one group.

(5) Per-Group Depth Information Generation Processing

In the per-group depth information generation processing of Step 5, high-frequency component integration values of the respective parallax calculation regions F1–F60 are first normalized to values in a range of between 0 and 10. Further, luminance contrasts of the respective parallax calculation regions F1–F60 are also normalized to values in the range of between 0 and 10.

The resultant normalized high-frequency component integration values and luminance contrasts as well as background weight components previously given to the respective parallax calculation regions F1–F60 are used to generate depth information on a group-by-group basis.

Now, description will be made on a process of generating depth information on one optional group. First, the number n of parallax calculation regions included in this group is found. On the other hand, a calculation is performed to find a sum total $\Sigma a$ of normalized values "a" of high-frequency component integration values of the parallax calculation regions included in this group. A calculation is also performed to find a sum total $\Sigma b$ of normalized values "b" of luminance contrasts of the parallax regions of the group. Further, a calculation is performed to find a sum total $\Sigma c$ of weight components "c" of the parallax calculation regions of this group.

Subsequently, depth information H on the group is generated based on the following equation (9):

$$H=(K1\cdot\Sigma a+K2\cdot\Sigma b+K3\cdot\Sigma c)\div n \quad (9)$$

wherein K1, K2 and K3 denote factors defined as, for example, K1=3/8, K2=1/8, K3=4/8.

(6) All-Region Depth Information Correction Processing

In the all-region depth information correction processing of Step 6, a mean value of depth information on the parallax calculation regions F1–F60 is first determined on a row-by-row basis. In a case where the depth information per parallax calculation region F1–F60 is as shown in FIG. 38, for example, the first to the sixth region rows have a mean value of 1.2, 3.6, 6.0, 7.2, 4.0 and 1.2, respectively.

Of the rows of parallax calculation regions, extracted is a row of regions wherein foreground object(s) occupy a greater area than in the other region rows. That is, the region row having the greatest mean value of the depth information is extracted. According to the example of FIG. 38, the regions of the fourth row are extracted.

Subsequently, regions of rows below the extracted row are each adjusted in the depth information thereof so that each of the regions is not sharply decreased in the depth information thereof relative to that of the region immediately thereabove. More specifically, of the regions included in the rows below the extracted row, a region, having depth information smaller than a region thereabove by not less than 3, is changed in its depth information to a value smaller than that of the region thereabove by 2.

Figure 38:
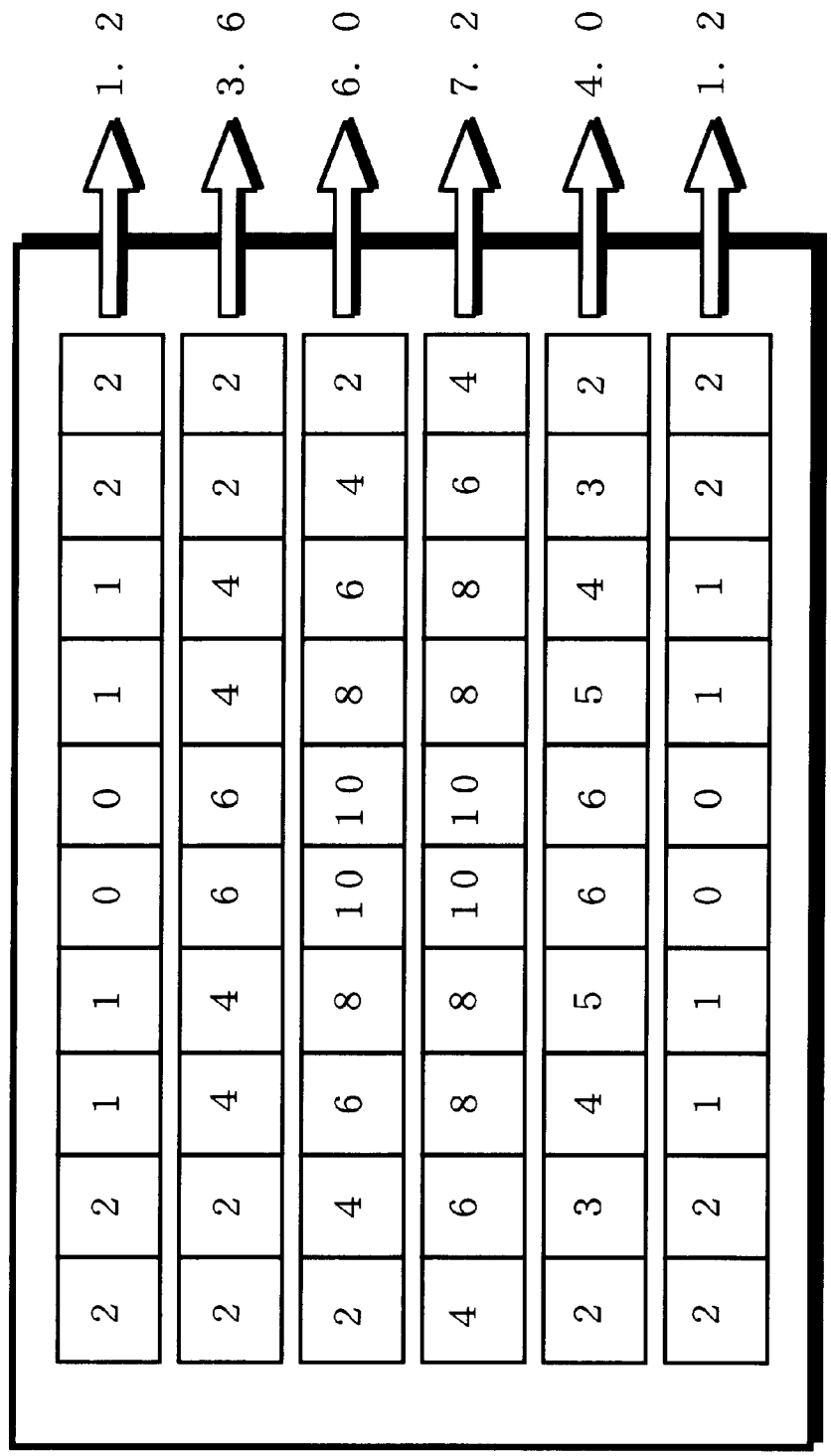
FIG. 38 is a schematic diagram showing one example of depth information on the respective parallax calculation regions prior to a depth correction processing.
Figure 40:
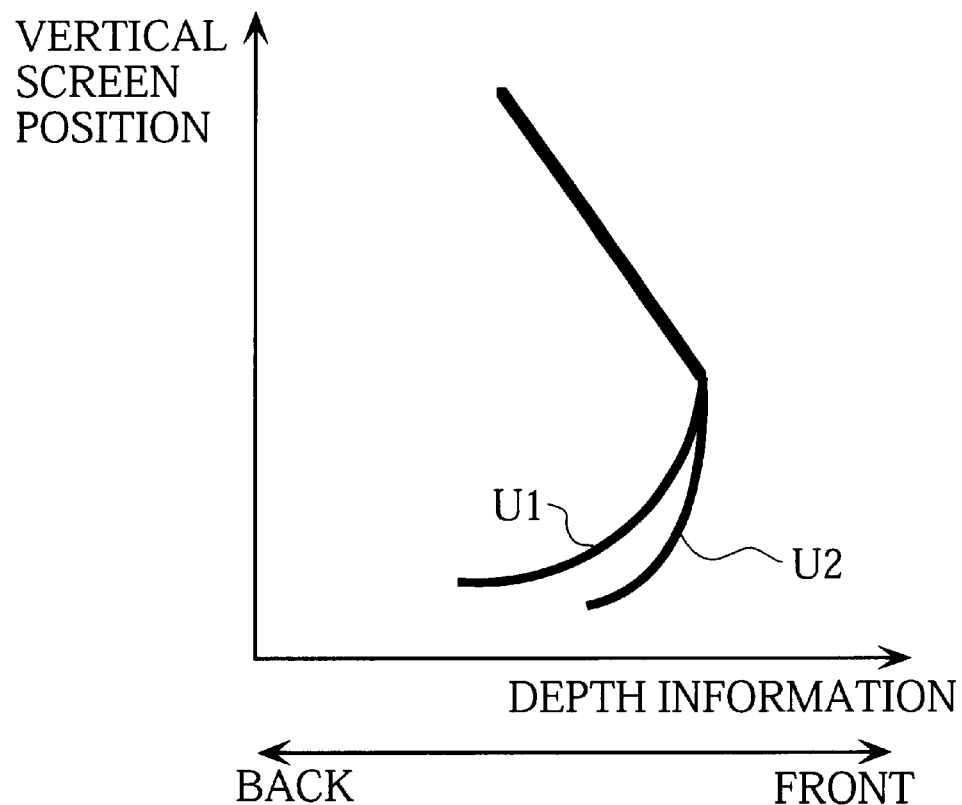
FIG. 40 is a graphical representation of a relation of the depth information versus vertical screen position prior to the depth correction processing and a relation of the corrected depth information versus the vertical screen position.

In the example of FIG. 38, out of the regions F41–F50 of the fifth row, the regions F42–F49 having the depth information smaller than the respective regions thereabove by not less than 3 are first corrected in their depth information, as shown in FIG. 39. Subsequently, out of the regions F51–F60 of the sixth row, the regions F53–F58 having the depth information smaller than those (after correction) of the respective regions thereabove by not less than 3 are corrected in the depth information thereof.

Where depth information has such a relation with a vertical screen position at an optional horizontal position as represented by a curve U1 shown in FIG. 40, the relation of the depth information versus the vertical screen position is corrected to that represented by a curve U2 shown in FIG. 40.

Out of the rows of parallax calculation regions, the region rows below the region row wherein foreground object(s) occupy a greater area than the other rows are corrected in the depth information thereof for the following reason.

In most cases, objects on the front of the scene are located on the lower side of the screen. In addition, images of objects located on the lower side of the screen, such as of ground and the like, often have little variations. The image with little variations like that of the ground has a low high-frequency component and therefore, has a low depth information value despite being located to the front of the scene. Hence, the depth correction is provided in order to increase the depth information value of the image of the foreground object, which has a low high-frequency component, to a degree that the depth information value of such a region does not exceed that of a region thereabove.

(7) Group-Boundary Depth Information Correction Processing

In some cases, regions in a boundary portion between two adjacent groups may not be divided into correct groups. Further if, in the boundary portion between the adjacent groups, depth estimations of the respective groups have great difference from each other, a serious image distortion results.

Hence, the group-boundary depth information correction processing of Step 7 first checks a boundary portion between the respective pairs of adjacent groups to determine whether a difference between depth information of parallax calculation regions of one group and that of regions of the other group exceeds a predetermined value or not. If the difference in depth information between the two groups exceeds the predetermined value, the smaller depth information (or that of the parallax calculation regions corresponding to objects located relatively rearwardly) is increased so that the difference in depth information therebetween may be less than the predetermined value.

(8) In-Group Depth Information Correction Processing

The aforesaid correction processings of Steps 6 and 7 may result in production of difference in the depth information of regions of the same group. If this difference is great, a serious image distortion results. Therefore, the in-group depth information correction processing of Step 8 smoothes out depth estimations with respect to regions of each group.

Figure 41:
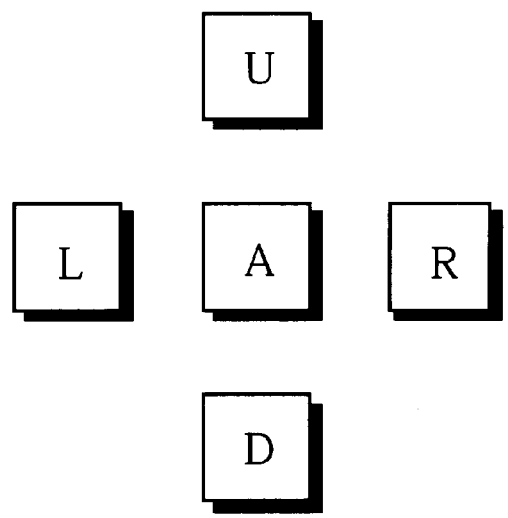
FIG. 41 is a schematic diagram illustrating an in-group depth information correction processing.

It is assumed that a target region A has depth information HA while four regions U, D, L and R adjacent thereto and included in the same group with the region A have depth information Hu, HD, HL and HR, respectively, as shown in FIG. 41. The depth estimation HA of the target region A is corrected based on the following equation (10):

$$HA=(HA/2)+\{(HU+HD+HL+HR)/8\} \quad (10)$$

Depth information on the respective parallax calculation regions F1–F60 thus obtained are normalized again within the range of between 1 and 10.

(9) Parallax Information Calculation Processing

In the parallax information calculation processing of Step 9, the depth information on the respective parallax calculation regions F1–F60 is converted into parallax information on the respective regions F1–F60.

More specifically, based on a predetermined relation between the depth information and the parallax information, the depth information on each of the regions F1–F60 is converted into the parallax information on each of the regions. The relation of the parallax information versus the depth information is inversely proportional, as shown by a straight line S1 or S2 in FIG. 42.

Figure 42:
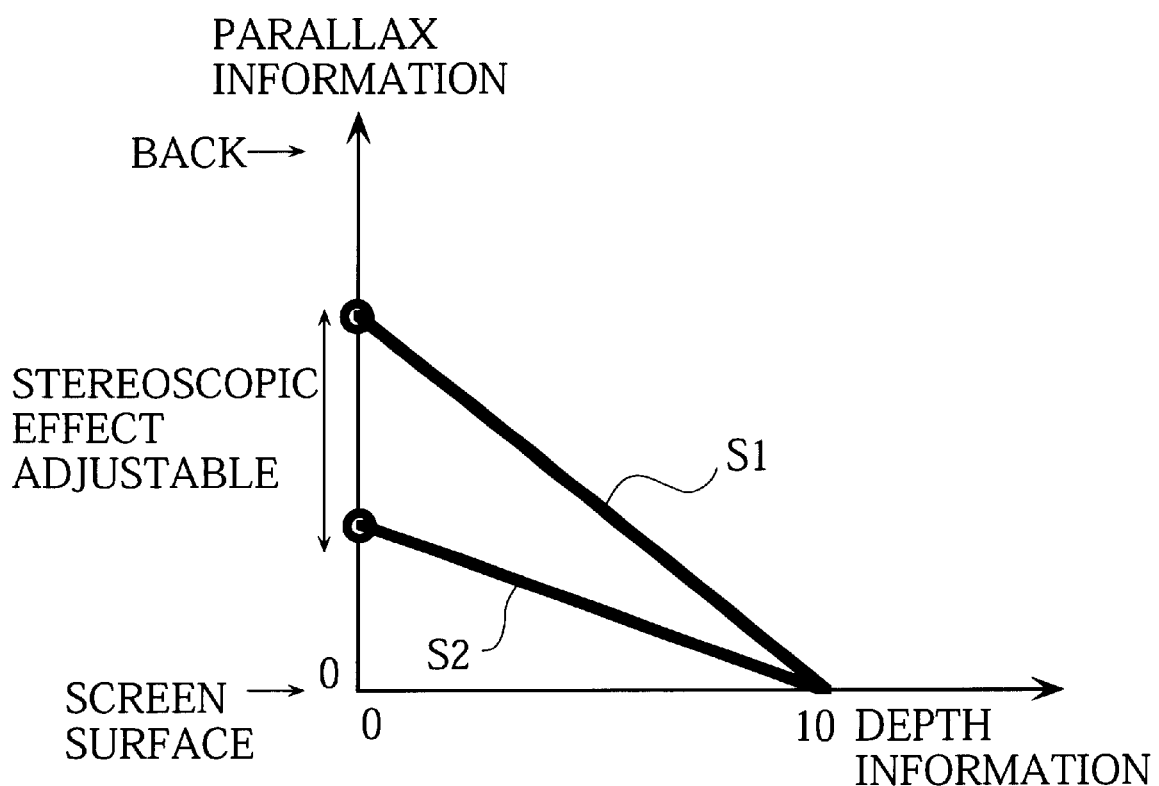
FIG. 42 is a graphical representation of a relation between the depth information and parallax information.

Referring to FIG. 42, the relation of the parallax information with the depth information represented by the straight line S1 is used for obtaining a 3D image with a relatively great stereoscopic effect. On the other hand, the relation of the parallax information with the depth information represented by the straight line S2 is used for obtaining a 3D image with a relatively small stereoscopic effect. The stereoscopic effect can be adjusted by controlling the relation of the parallax information versus the depth information in a range of between the straight lines S1 and S2.

The parallax information per parallax calculation region thus obtained is supplied to the parallax control circuit 4 (see FIG. 27).

The configuration and operation of the parallax control circuit 4 according to the second embodiment hereof are the same with those of the parallax control circuit according to the first embodiment shown in FIGS. 1 and 20 and therefore, the description thereof is omitted.

The 2D/3D image conversion apparatus according to the above embodiment eliminates the need for the field memories for generating the image signal timed delayed relative to the original 2D image signal and hence, accomplishes the cost reduction. Additionally, the 2D/3D image conversion apparatus of the above embodiment is adapted to produce the stereoscopic image even from the original 2D image signal representing the still image.

Further, the perspective image information on each group is generated after all the regions in the one-field screen are divided into groups associated with the respective objects in the screen. Therefore, variations in the parallax of different parts of the same object are reduced. As a result, distortion of image portions representing different parts of the same object is reduced so that a favorable stereoscopic image is provided.

[3] Third Embodiment

Now, a third embodiment of the invention will be described with reference to FIGS. 21, and 43 to 45.

Figure 43:
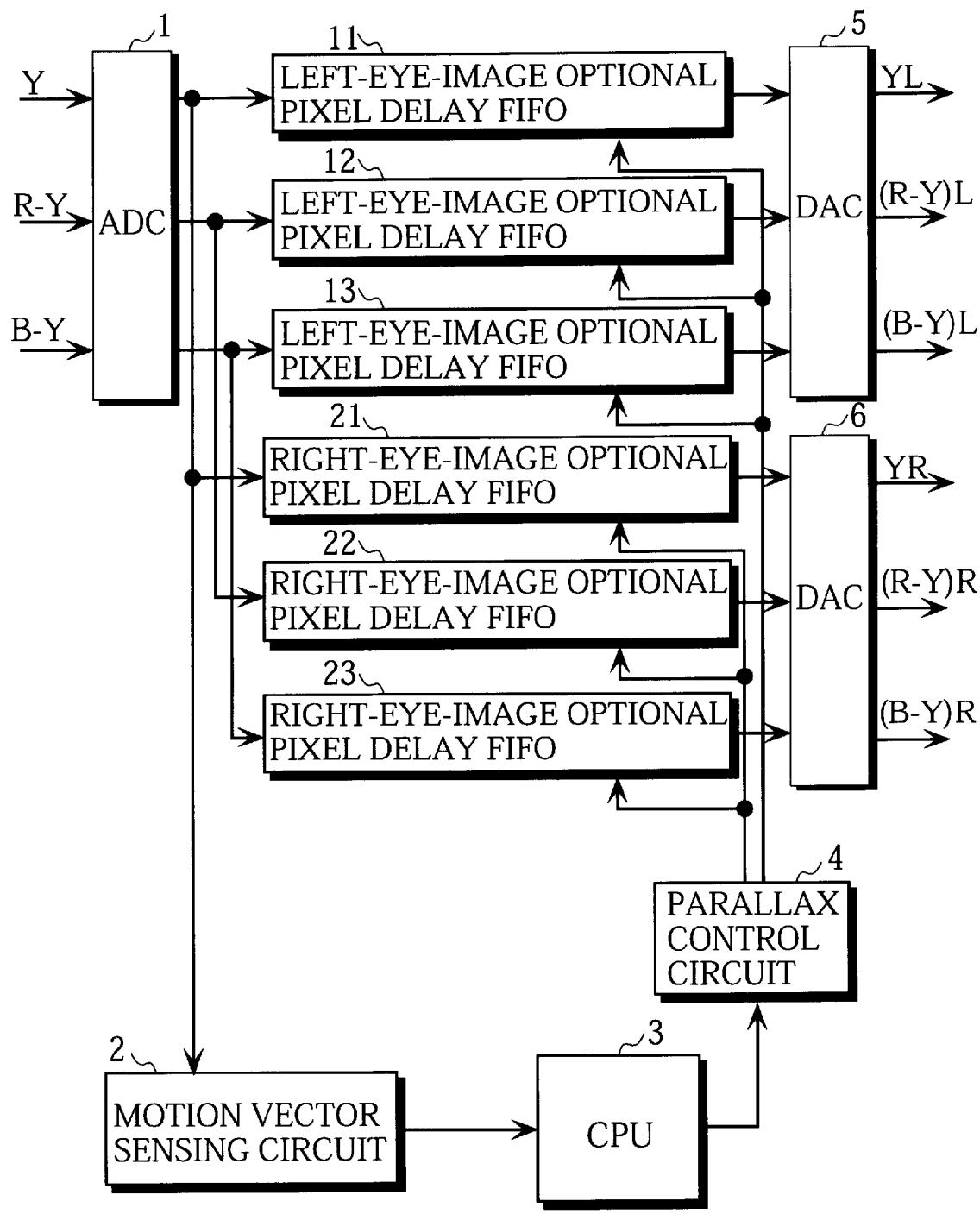
FIG. 43 is a block diagram showing an exemplary whole construction of a 2D/3D image conversion apparatus according to the invention.

FIG. 43 diagrammatically illustrates a construction of a 2D/3D image conversion apparatus. In the figure, like parts to those shown in FIG. 1 are represented by like reference numerals, respectively.

The luminance signal Y, and color difference signals R-Y and B-Y, which constitute the 2D image signal, are converted by the AD conversion circuit 1 (ADC) into digital Y, R-Y and B-Y signals, respectively.

Y signal is supplied to a motion vector sensing circuit 2 as well as to the first left-eye-image optional pixel delay FIFO 11 and the first right-eye-image optional pixel delay FIFO 21. R-Y signal is supplied to the second left-eye-image optional pixel delay FIFO 12 and the right-eye-image optional pixel delay FIFO 22. B-Y signal is supplied to the third left-eye-image optional pixel delay FIFO 13 and the third right-eye-image optional pixel delay FIFO 23.

The motion vector sensing circuit 2 calculates a motion vector of each of the twelve motion vector detection regions E–E12 (hereinafter referred to as "parallax calculation region") on a field-by-field basis, the regions defined in the one-field screen, as shown in FIG. 21. The motion vector sensing circuit 2 supplies to the CPU 3 on a field-by-field basis, data indicative of a region presenting a calculated motion vector of a low reliability (hereinafter referred to as "NG region"), X-motion vectors of any of the regions E1–E12 exclusive of the NG region, the maximum value of the X-motion vectors of any of the regions E1–E12 exclusive of the NG region (including data of a region presenting the maximum X-motion vector), the minimum value of the X-motion vectors of any of the regions E1–E12 exclusive of the NG region (including data of a region presenting the minimum X-motion vector), and an integration value of absolute values of the X-motion vectors of any of the regions E1–E12 exclusive of the NG region.

The CPU 3 calculates a depth value or a projection value of each of the parallax calculation regions E1–E12 based on the information supplied by the motion vector sensing circuit 2. Based on the depth value or projection value thus determined, the CPU 3 generates parallax information on each of the parallax calculation regions E1–E12. In this example, the depth value per parallax calculation region E1–E12 is calculated in a manner that a region including the background may have a great depth value while a region including the subject may have a small depth value. A calculation method of the depth value will hereinafter be described in detail.

The parallax information per parallax calculation region E1–E12 calculated by the CPU 3 is supplied to the parallax control circuit 4. The parallax control circuit 4, in turn, generates parallax information per pixel position in each field based on the parallax information on each parallax calculation regions E1–E12. Based on the parallax information per pixel position thus obtained, the parallax control circuit 4 controls the read addresses of the left-eye-image optional pixel delays FIFOs 11–13 and the right-eye-image optional pixel delays FIFOs 21–23 to read the image signal (Y, R-Y and B-Y signals) therefrom such that the addresses of FIFOs 11–13 are shifted from those of FIFOs 21–23, respectively. Hence, the left-eye image signal read out from the left-eye-image optional pixel delays FIFOs 11–13 has a different horizontal phase from the right-eye image signal read out from the right-eye-image optional pixel delays FIFOs-23.

The left-eye image signal (YL signal, (R-Y) L signal and (B-Y) L signal) read out from the left-eye-image optional pixel delays FIFOs 11–13 is converted into an analog signal by the DA conversion circuit (DAC) 5 before supplied to the unillustrated 3D display unit. The right-eye image signal (YR signal, (R-Y) R signal and (B-Y) R signal) read out from the right-eye-image optional pixel delays FIFOs 21–23 is converted into an analog signal by the DA conversion circuit (DAC) 6 before supplied to the unillustrated 3D display unit.

Since the left-eye image signal has a different horizontal phase from that of the right-eye image signal, a parallax is produced between the left eye image and the right eye image. Hence, by viewing the left eye image with the left eye alone and the right eye image with the right eye alone, a stereoscopic image is established wherein the subject is located to the front against the background.

Figure 44:
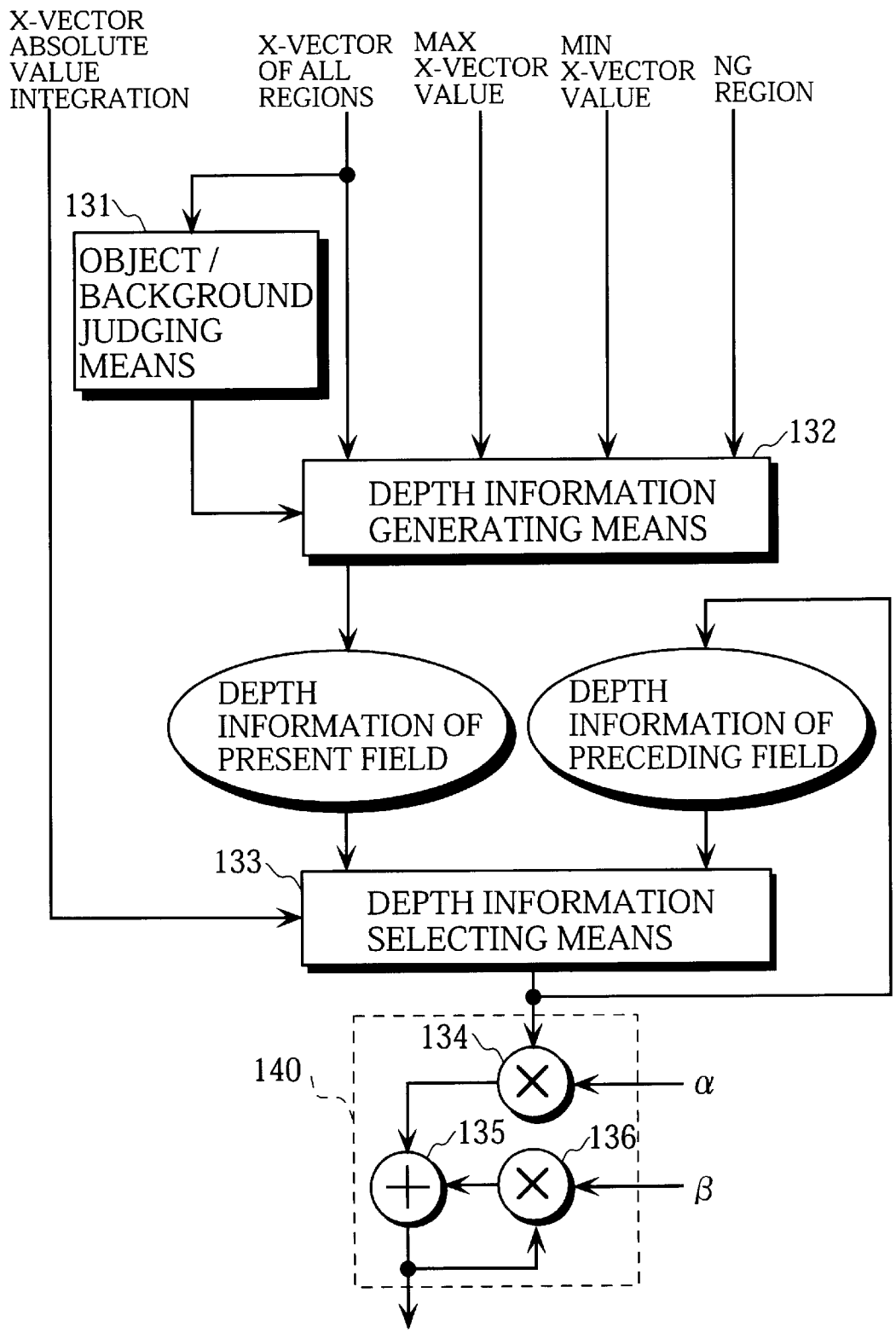
FIG. 44 is a functional block diagram illustrating a parallax information generating procedure taken by the CPU.

FIG. 44 is a diagram illustrating a parallax information generation process performed by the CPU 3.

Subject/background judging means 131 checks the X-motion vector of each of the parallax calculation regions E1–E12 exclusive of the NG region to determine whether the image of each region represents a subject or a background. The judging method may be exemplified by a method disclosed in Japanese Unexamined Patent Publication No. 8(1996)-149517, for example.

Depth information generating means 132 determines a depth value (depth information) per parallax calculation region E1–E12 based on the X-motion vector of each of the parallax calculation regions E1–E12 exclusive of the NG region, the maximum value of the X-motion vectors of the parallax calculation regions E1–E12 exclusive of the NG region (including data on a region presenting the maximum X-motion vector), the minimum value of the X-motion vectors of the parallax calculation regions E1–E12 exclusive of the NG region (including data on a region presenting the minimum X-motion vector), and data indicative of the NG region.

Figure 45:
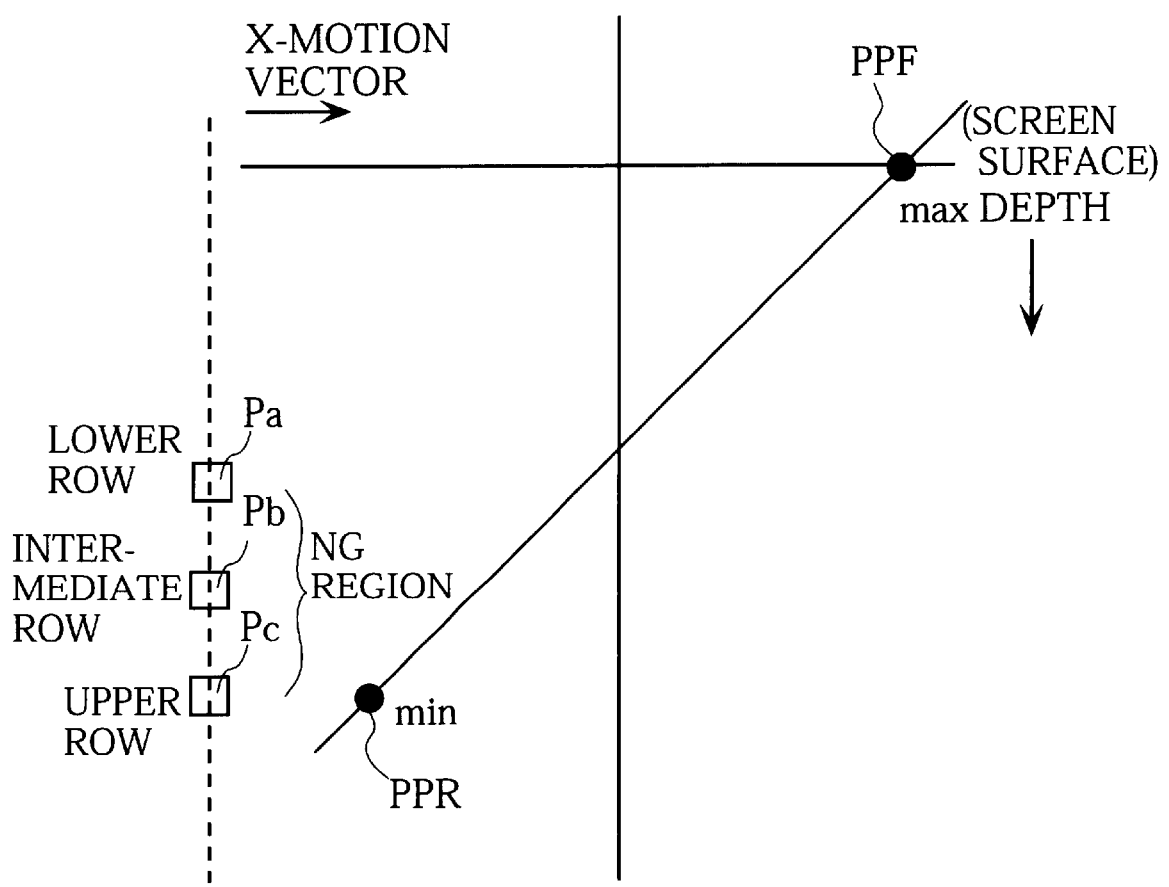
FIG. 45 is a schematic diagram illustrating the parallax information generating procedure taken by the CPU.

More specifically, the depth information generating means decides a stereoscopic position of either one of the parallax calculation regions presenting the maximum X-motion vector and the minimum X-motion vector to be at a screen-surface position PPF and a stereoscopic position of the other region to be at a rearmost position PPR, based on the judgments which the subject/background judging means 131 made on any of the parallax calculation regions E1–E12 except for the NG region, the maximum value of the X-motion vectors of any of the parallax calculation regions E1–E12 exclusive of the NG region (including the data on the region presenting the maximum X-motion vector) and the minimum value of the X-motion vectors of any of the parallax calculation region E1–E12 exclusive of the NG region (including the data on the region presenting the minimum X-motion vector).

Where an image of the parallax calculation region with the maximum X-motion vector represents the subject while an image of the parallax calculation region with the minimum X-motion vector represents the background, a stereoscopic position of the region with the maximum X-motion vector is determined to be at the screen-surface position PPF while a stereoscopic position of the parallax calculation region with the minimum X-motion vector is determined to be at the rearmost position PPR, as shown in FIG. 45.

Where an image of the parallax calculation region with the maximum X-motion vector represents the background while an image of the parallax calculation region with the minimum X-motion vector represents the subject, a stereoscopic position of the parallax calculation region with the maximum X-motion vector is determined to be at the rearmost position PPR while a stereoscopic position of the parallax calculation region with the minimum X-motion vector is determined to be at the screen-surface position PPF.

The description on the method of determining the depth value of each parallax calculation region E1–E12 will herein be made on assumption that the image of the parallax calculation region with the maximum X-motion vector represents the subject while the image of the parallax calculation region with the minimum X-motion vector represents the background whereby, as shown in FIG. 45, the stereoscopic position of the parallax calculation region with the maximum X-motion vector is at the screen-surface position PPF and that of the parallax calculation region with the minimum X-motion vector is at the rearmost position PPR.

As to the parallax calculation regions other than the parallax calculation regions having the maximum X-motion value and the minimum X-motion value and the NG region, respective stereoscopic positions such parallax calculation regions are determined to be somewhere between the screen-surface position PPF and the rearmost position PPR according to the respective X-motion vectors thereof. In this example, the greater X-motion vector the region has, the closer to the screen-surface position PPF is the stereoscopic position of the region. On the other hand, the smaller X-motion vector the region has, the closer to the rearmost position PPR is the stereoscopic position of the region.

A stereoscopic position of each NG region is determined based on which row of the screen includes the NG region: an upper row (regions E1–E4), an intermediate row (regions E5–E8) or a lower row (E9–E12) of the screen.

A stereoscopic position of an NG region in the lower row of the screen is determined to be at an intermediate position Pa between the screen-surface position PPF and the rearmost position PPR. A stereoscopic position of an NG region in the upper row of the screen is determined to be at a position Pc equivalent to the rearmost position PPR. A stereoscopic position of an NG region in the intermediate row of the screen is determined to be at an intermediate position Pb between the stereoscopic position Pa of the NG region in the lower row of the screen and the stereoscopic position Pc of the NG region in the upper row of the screen.

Now a reason for determining the stereoscopic position of the NG region in the aforementioned manner will be described. It is presumed that the image of the NG region represents the background. Normally, a background image portion occupying a lower part of the screen correspondingly represents a nearer view, whereas a background image portion occupying a higher part of the screen correspondingly represents a more distant view. Hence, the stereoscopic position of each NG region is determined such that as the NG region is positioned higher with respect to the screen, the stereoscopic position thereof becomes more backward from the screen-surface position PPF. Further, since the NG region is presumed to represent the background, the NG region at the lower part of the screen is determined to have a stereoscopic position backward from that of a region representing the subject.

Thus, the respective depth values (depth information) of the parallax calculation regions E1–E12 from the screen-surface position PPF are determined by deciding the respective stereoscopic positions of the parallax calculation regions E1–E12.

Depth information selecting means 133 is supplied with depth information on the parallax calculation regions E1–E12 of the present field, which information is generated by the depth information generating means 132, and with depth information on the parallax calculation regions E1–E12 of the preceding field, which information is previously selected by the depth information selecting means 133. The depth information selecting means 133 is also supplied with data indicative of respective integration values of the absolute values of the X-motion vectors of any of the parallax calculation regions E1–E12 other than the NG region.

When the integration values of the absolute values of the X-motion vectors of any of the parallax calculation regions E1–E12 other than the NG region are not less than a predetermined value, or when an image motion of the present field is greater than that of the preceding field, the depth information selecting means 133 selectively outputs the depth information of the present field. When the integration values of the absolute values of the X-motion vectors of any of the parallax calculation regions E1–E12 other than the NG region are less than the predetermined value or when the image motion of the present field is smaller than that of the preceding field, the depth information selecting means selectively outputs the depth information of the preceding field.

Depth information per parallax calculation region E1–E12 outputted from the depth information selecting means 133 (hereinafter referred to as "first depth information per parallax calculation region E1–E12") is supplied to smoothing means 140 which, in turn, smoothes the depth information for prevention of abrupt change in the depth information between adjacent fields. The smoothing means 140 includes a first multiplying means 134, a first adding means 135 and a second multiplying means 136.

The first multiplying means 134 serves to multiply the first depth information per parallax calculation region E1–E12 by a factor α, which is set to, for example, 1/8. However, the factor α is set to 1 when a scene of the present field is changed from that of the preceding field (scene change). A method disclosed in Japanese Unexamined Patent Publication No. 8(1996)-149514, for example, may be used for detecting such a scene change.

Output from the first multiplying means 134 (hereinafter, referred to as "second depth information per parallax calculation region E1–E12") is supplied to the adding means 135, which is also supplied with output from the second multiplying means 136 (hereinafter, referred to as "fourth depth information per parallax calculation region E1–E12"). The adding means 135 serves to calculate a sum of the second depth information per parallax calculation region E1–E12 and the corresponding fourth depth information per parallax calculation region.

The second multiplying means 136 serves to multiply the preceding output from the adding means 135 (hereinafter, referred to as "third depth information per parallax calculation region E1–E12") by a factor β, which is normally set to 7/8, for example. However, the factor β is set to 0 when a scene of the present field is changed from that of the preceding field (scene change).

That is, when the scene of the present field is not changed from that of the preceding field, the first multiplying means 134 multiplies, by 1/8, the first depth information on each parallax calculation region E1–E12 outputted from the depth information selecting means 133, thereby to give the second depth information per parallax calculation region E1–E12.

The second depth information per parallax calculation region E1–E12 is supplied to the adding means 135. The adding means 135 is also supplied with the fourth depth information per parallax calculation region E1–E12 which is determined by the second multiplying means 136 multiplying, by 7/8, the third depth information per parallax calculation region E1–E12 previously outputted by the adding means 135.

The adding means 135 adds together a second depth information piece on each parallax calculation region E1–E12 and a corresponding fourth depth information piece on each parallax calculation region E1–E12. Thus is obtained the third depth information per parallax calculation region E1–E12, which is supplied as the parallax information to the parallax control circuit 4 (see FIG. 43).

Where the scene of the present field is changed from that of the preceding field, the first multiplying means 134 multiplies by 1 the depth information piece on each parallax calculation region E1–E12 outputted from the depth information selecting means 133. That is, the first multiplying means 134 outputs the depth information per parallax calculation region E1–E12 which is at the same value as the depth information supplied from the depth information selecting means 133.

The second multiplying means 136 has the factor of 0, thus providing an output of 0. Therefore, the adding means 135 outputs the depth information per parallax calculation region E1–E12 which is the same as the depth information outputted from the depth information selecting means 133. That is, where the scene of the present field is changed from that of the preceding field, the depth information per parallax calculation region E1–E12 outputted from the depth information selecting means 133 is supplied as the parallax information to the parallax control circuit 4 (see FIG. 43).

A configuration and operation of the parallax control circuit 4 according to the third embodiment hereof are the same as the parallax control circuit according to the first embodiment hereof shown in FIGS.1 and 20. Therefore, the description thereof is omitted.

The aforementioned 2D/3D image conversion apparatus negates the need for the field memories for generating the image signal time-delayed relative to the original 2D image signal, thus accomplishing the cost reduction.

[4] Fourth Embodiment

Now referring to FIGS. 46 to 51, a fourth embodiment of the invention will be described.

[4-1] Description on the Embodiment where the Invention is Applied to a 2D/3D Image Conversion System.

Figure 46:
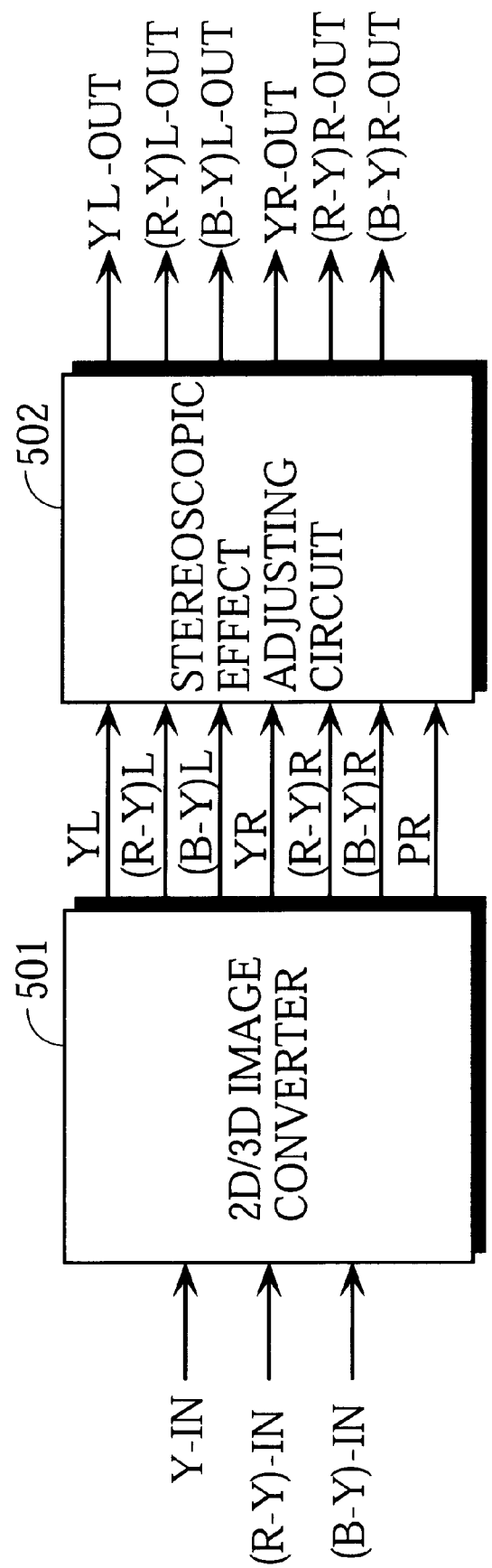
FIG. 46 is a block diagram showing a construction of a 2D/3D image conversion system according to the invention.

FIG. 46 is a block diagram showing a construction of the 2D/3D image conversion system.

The 2D/3D image conversion system includes a 2D/3D image converter 501 for converting 2D images into 3D images and a stereoscopic effect adjusting circuit 502 for making adjustment to the stereoscopic effect of 3D image signal obtained by the 2D/3D image converter 501.

The 2D/3D image converter 501 is supplied with a luminance signal Y-IN, and color difference signals (R-Y) -IN and (B-Y) -IN, which signals compose the 2D image signal. The 2D/3D image converter 501 outputs a luminance signal YL and color difference signals (R-Y) L and (B-Y) L, which signals composes a left-eye image signal; a luminance signal YR and color difference signals (R-Y) R and (B-Y) R, which signals compose a right-eye image signal; and parallax information PR per pixel.

The respective output signals from the 2D/3D image converter 501 are sent to the stereoscopic effect adjusting circuit 502, which, in turn, outputs a luminance signal YL-OUT and color difference signals (R-Y) L-OUT and (B-Y) L-OUT which signals compose a left-eye image signal with the stereoscopic effect adjusted, as well as a luminance signal YR-OUT and color difference signals (R-Y) R-OUT and (B-Y) R-OUT which signals compose a right-eye image signal with the stereoscopic effect adjusted.

As the 2D/3D image converter 501, there may be used, for example, the 2D/3D image conversion apparatus of the first embodiment hereof (see FIG. 1), the 2D/3D image conversion apparatus of the second embodiment hereof (see FIG. 27) or the 2D/3D image conversion apparatus of the third embodiment hereof (see FIG. 43).

Figure 47:
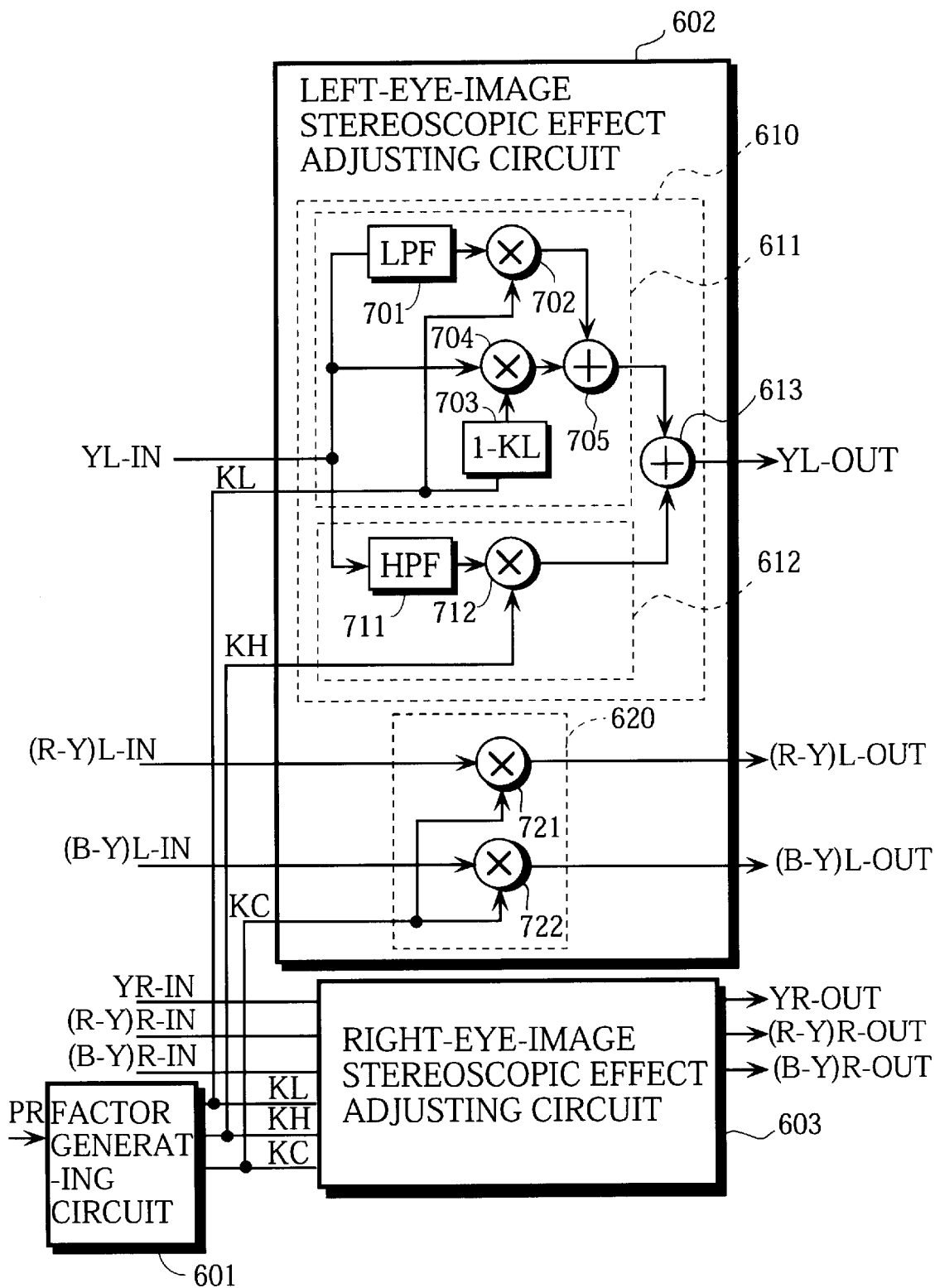
FIG. 47 is a block diagram showing a configuration of a stereoscopic effect adjusting circuit.

FIG. 47 diagrammatically illustrates a configuration of the stereoscopic effect adjusting circuit 502.

The stereoscopic effect adjusting circuit 503 includes a factor generating circuit 601, a left-eye-image stereoscopic effect adjusting circuit 602 for making adjustment to the stereoscopic effect of the left-eye image signal, and a right-eye-image stereoscopic effect adjusting circuit 603 for making adjustment to the stereoscopic effect of the right-eye image signal.

The left-eye-image stereoscopic effect adjusting circuit 602 is configured the same way as the right-eye-image stereoscopic effect adjusting circuit 603 and therefore, the description will be made only on the left-eye-image stereoscopic effect adjusting means 602.

The factor generating circuit 601 generates a first factor KL, a second factor KH and a third factor KC based on the parallax information per pixel PR (information on the perspective image characteristics) supplied from the 2D/3D image converter 501. The first factor KL is generated within the range of not less than 0 and not more than 1 ($0 \leq KL \leq 1$) and used for adjusting a proportion of a low-frequency component of the image signal. More specifically, the first factor KL is used for blurring an image contour or reducing a sharpness of the image contour. The greater the value of the first factor KL, the more blurred the resultant image.

Figure 48:
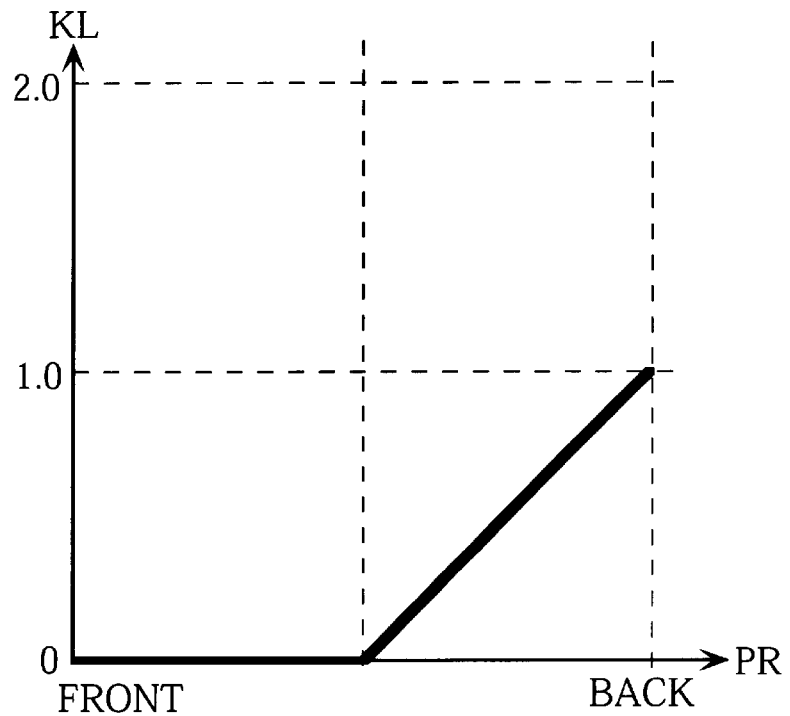
FIG. 48 is a graphical representation of a relation between parallax information PR per pixel and a first factor KL.

The factor generating circuit 601 generates the first factor KL such that the first factor KL is at a smaller value for a pixel forming an image positioned to the front but is at a greater value for a pixel forming an image positioned to the back. According to this embodiment, as mentioned above, the parallax information PR is at a smaller value for the pixel forming the image positioned to the front but at a greater value for the pixel forming the image positioned to the back. Hence, as shown in FIG. 48, the factor generating circuit 601 is adapted to provide the first factor KL of 0 corresponding to the parallax information PR of a predetermined value or less, but to progressively increase the value of the first factor KL with increase in the parallax information PR which exceeds the predetermined value.

The second factor KH is generated in the range of not less than 0 and not more than 1 ($0 \leq KH \leq 1$) and is used for adjusting a proportion of a high-frequency component of the image signal. More specifically, the second factor KH is used for sharpening the image contour or for enhancing the sharpness of the image contour. The greater is the value of the second factor KH, the sharper contour has the resultant image.

Figure 49:
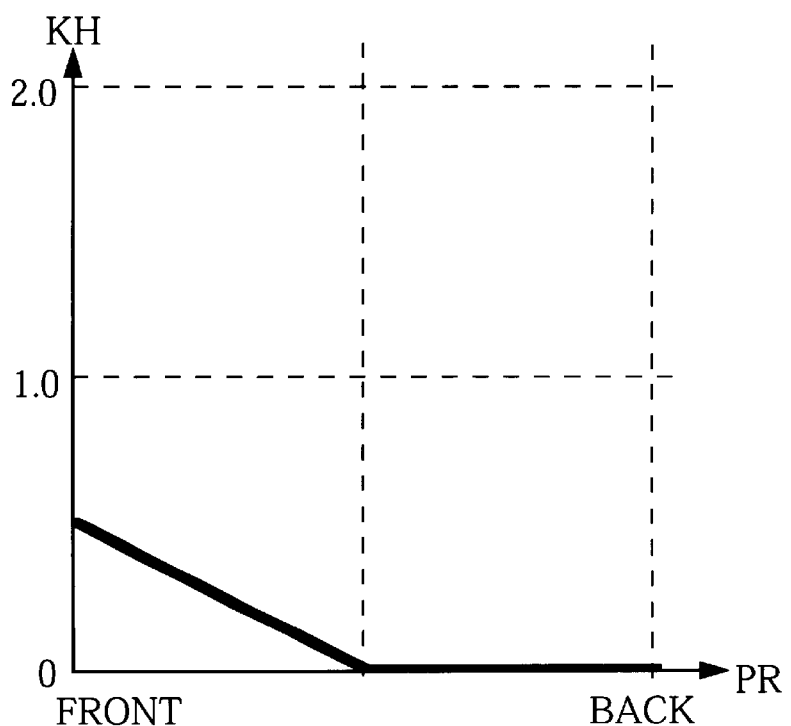
FIG. 49 is a graphical representation of a relation between the parallax information PR per pixel and a second factor KH.

The factor generating circuit 601 generates the second factor KH such that the second factor KH is at a greater value for the pixel forming the image positioned to the front but at a smaller value for the pixel forming the image positioned to the back. According to this embodiment, as mentioned above, the parallax information PR is at a smaller value for the pixel forming the image positioned to the front but at a greater value for the pixel forming the image positioned to the back. Hence, as shown in FIG. 49, the factor generating circuit 601 is adapted to progressively decrease the value of the second factor KH as the parallax information PR increases up to a predetermined value but to provide the second factor KH of 0 corresponding to the parallax information PR excessive of the predetermined value.

Figure 50:
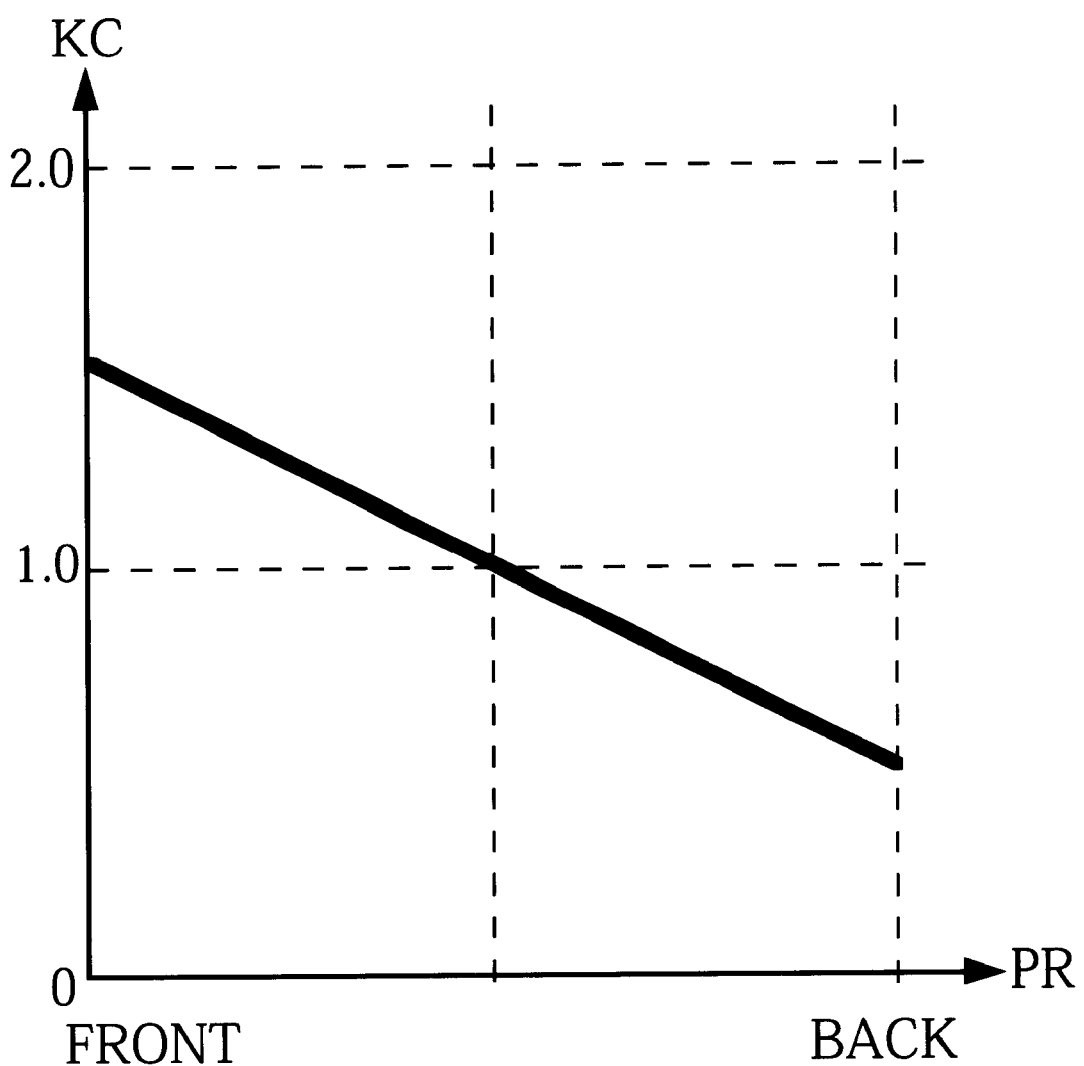
FIG. 50 is a graphical representation of a relation between the parallax information PR per pixel and a third factor KC.

The third factor KC is used for adjusting the image chroma. The greater the value of the third factor KC, the more enhanced the image chroma. The factor generating circuit 601 generates the third factor KC such that the third factor KC is at a greater value for the pixel forming the image positioned to the front but at a smaller value for the pixel forming the image positioned to the back. According to this embodiment, as mentioned above, the parallax information PR is at a smaller value for the pixel forming the image positioned to the front but at a greater value for the pixel forming the image positioned to the back. Hence, as shown in FIG. 50, the factor generating circuit 601 is adapted to progressively decrease the value of the third factor KC with increase in the parallax information PR.

The left-eye-image stereoscopic effect adjusting circuit 602 is supplied with the luminance signal YL and color difference signals (R-Y) L and (B-Y) L from the 2D/3D image converter 501, the luminance signal and color difference signals composing the left-eye image.

The left-eye-image stereoscopic effect adjusting circuit 602 includes a circuit 610 for adjusting the sharpness of the image contour, and a circuit 620 for adjusting the image chroma.

Now, the circuit 610 for adjusting the sharpness of the image contour will be described. The circuit 610 for adjusting the sharpness of the image contour includes a circuit 611 for adjusting the proportion of the low-frequency component of the image, a circuit 612 for adjusting the proportion of the high-frequency component of the image, and an adder circuit 613 for adding together outputs from these circuits.

The circuit 611 for adjusting the proportion of the proportion of the low-frequency component of the image includes a low-pass filter (LPS) 701 for extracting the low-frequency component of the luminance signal YL; a first multiplier 702 for multiplying, by the first factor KL, the low-frequency component of the luminance signal YL extracted by the low-pass filter 701; a functional unit 703 for performing 1-KL operation; a second multiplier 704 for multiplying the luminance signal YL by (1-KL) which is an output from the functional unit 703; and a first adder 705 for adding together outputs from the first multiplier 702 and the second multiplier 704.

The circuit 612 for adjusting the proportion of the high-frequency component of the image includes a high-pass filter (HPF) 711 for extracting the high-frequency component of the luminance signal YL, and a third multiplier 712 for multiplying, by the second factor KH, the high-frequency component of the luminance signal YL extracted by the high-pass filter 711.

An output from the circuit 611 for adjusting the proportion of the low-frequency component of the image (output from the first adder 705) and an output from the circuit 612 for adjusting the proportion of the high-frequency component of the image (output from the third multiplier 712) are added together by the adder circuit 613. An output YL-OUT from the adder circuit 613 is supplied to an unillustrated 3D display unit.

As mentioned in the foregoing, the pixel forming the image positioned to the front is decreased in the value of the first factor KL but increased in the value of the second factor KH. Accordingly, the pixel forming the image positioned to the front is decreased in the proportion of the low-frequency component of the luminance signal YL but increased in the proportion of the high-frequency component of the luminance signal YL. Therefore, the pixels corresponding to the image positioned to the front produce the image in a sharp contour.

On the other hand, the pixel forming the image positioned to the back is increased in the value of the first factor K1 but decreased in the value of the second factor KH. Accordingly, the pixel forming the image positioned to the back is increased in the proportion of the low-frequency component of the luminance signal YL but decreased in the proportion of the high-frequency component of the luminance signal YL. Therefore, the pixels corresponding to the image positioned to the back produce the image in a blurred contour. That is, the pixels corresponding to the image positioned to the front produce the image in the sharp contour while the pixels corresponding to the image positioned to the back produce the image in the blurred contour. As a result, the stereoscopic effect is enhanced.

Now, the circuit 620 for adjusting the image chroma will be described. The circuit 620 for adjusting the image chroma includes a fifth multiplier 721 for multiplying the color difference signal (R-Y)L by the third factor KC, and a sixth multiplier 722 for multiplying the color difference signal (B-Y) L by the third factor KC. An output from the fifth multiplier 721 (R-Y) L-OUT and an output from the sixth multiplier 722 (B-Y) L-OUT are supplied to the unillustrated 3D display unit.

As described above, the pixel forming the image positioned to the front is increased in the value of the third factor KC. Accordingly, the pixel forming the image positioned to the front is increased in the values of the color difference signals (R-Y) L and (B-Y) L, thus increased in chroma. In contrast, the pixel forming the image positioned to the back is decreased in the value of the third factor KC. Accordingly, the pixel forming the image positioned to the back is decreased in the values of the color difference signals (R-Y) L and (B-Y) L, thus decreased in chroma. Thus, the pixels forming the image positioned to the front have increased chroma whereas the pixels forming the image positioned to the back have decreased chroma. As a result, the stereoscopic effect is enhanced.

Figure 51:
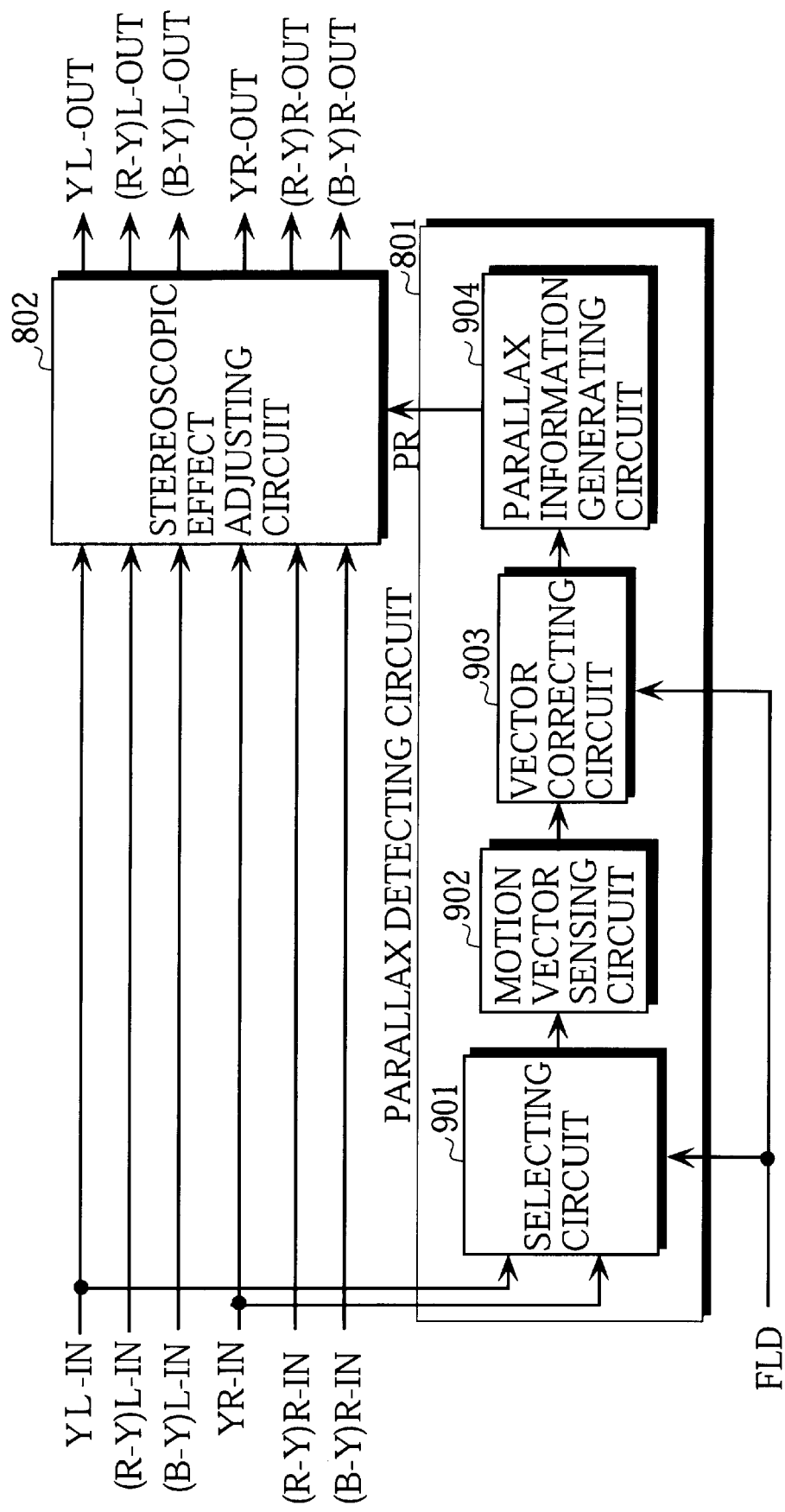
FIG. 51 is a block diagram showing a construction of a stereoscopic effect adjusting system.

[4-2] Description on the Embodiment where the Invention is Applied to a System for Adjusting the Stereoscopic Effect of the 3D Image Signal Composed of the Left-eye Image Signal and the Right-eye Image Signal Picked up by Two Cameras FIG. 51 diagrammatically illustrates a construction of a stereoscopic effect adjusting system.

The stereoscopic effect adjusting system includes a parallax detecting circuit 801 for detecting the parallax information PR per pixel on a field-by-field basis, and a stereoscopic effect adjusting circuit 802 for making adjustment to the stereoscopic effect of the 3D image signal based on the parallax information PR per pixel obtained by the parallax detecting circuit 801.

The parallax detecting circuit 801 includes a selecting circuit 901, a motion vector sensing circuit 902, a vector correcting circuit 903 and a parallax information generating circuit 904.

The selecting circuit 901 is supplied with the left-eye-image luminance signal YL-IN and the right-eye-image luminance signal YR-IN, which luminance signals YL-IN and YR-IN compose the 3D image. The selecting circuit is also supplied with a field identification signal FLD as a control signal.

The selecting circuit 901 outputs the left-eye-image luminance signal YL-IN and the right-eye-image luminance signal YR-IN as switching, based on the field identification signal FLD, between the left-eye-image luminance signal and the right-eye-image luminance signal on a field-by-field basis. In this example, the field identification signal FLD is at H-level when the input image signal is in an odd field and at L-level when the input image signal is in an even field. When the field identification signal FLD is at H-level (odd field), the selecting circuit 901 selectively outputs the left-eye-image luminance signal YL-IN. When the field identification signal FLD is a L-level (even field), the selecting circuit selectively outputs the right-eye-image luminance signal YR-IN.

The motion vector sensing circuit 902 performs calculation on a field-by-field basis to determine, from the image signal outputted from the selecting circuit 901, an X-motion vector of each of the twelve motion vector detection regions (hereinafter, referred to as "parallax calculation region") E1–E12 defined in the one-field screen, as shown in FIG. 21.

The X-motion vector per parallax calculation region E1–E12 given by the motion vector sensing circuit 902 is supplied to the vector correcting circuit 903. The X-motion vector per parallax calculation region E1–E12 obtained by the motion vector sensing circuit 902 represents a horizontal image motion between the left-eye image and the right-eye image per parallax calculation region E1–E12. Since the left-eye image and the right-eye image have a parallax therebetween, both the images, representing the same object, have horizontal positions different from each other depending upon distances from the cameras. Hence, the X-motion vector per parallax calculation region E1–E12 corresponds to the parallax between the both images per parallax calculation region E1–E12.

However, with respect to an object moving in the same direction, an X-vector obtained by shifting from the left-eye image to the right-eye image has an opposite sign to an X-motion vector obtained by shifting from the right-eye image to the left-eye image. Hence, the vector correcting circuit 903 is provided for agreement of the sign of the X-vectors obtained with respect to the object moving in the same direction.

When the field identification signal FLD is at H-level (odd field), the vector correcting circuit 903 receives the X-motion vector per parallax calculation region E1–E12 from the motion vector sensing circuit 902 and sends the X-motion vector, in the as-is state, to the parallax information generating circuit 904.

When the field identification signal FLD is at L-level (even field), the vector correcting circuit 903 receives the X-motion vector per parallax calculation region E1–E12 from the motion vector sensing circuit 902 and inverts the sign of the X-motion vector per parallax calculation region before sending the same to the parallax information generating circuit 904.

The parallax information generating circuit 904, in turn, generates the parallax information PR per pixel based on the X-motion vector per parallax calculation region E1–E12 thus supplied from the vector correcting circuit 903.

More specifically, the parallax information generating circuit uses the X-motion vector per parallax calculation region E1–E12, supplied from the vector correcting circuit 903, as the parallax information per parallax calculation region E1–E12 for generating the parallax information per pixel PR in the same manner as described with reference to FIG. 21.

Based on the parallax information per pixel PR obtained by the parallax detecting circuit 801, the stereoscopic effect adjusting circuit 802 performs a processing for correcting the stereoscopic effect of the 3D image signal. The stereoscopic effect adjusting means 802 is identical to the stereoscopic effect adjusting circuit 502 shown in FIG. 46 and therefore, the description on the configuration and operation thereof is omitted.

The aforementioned fourth embodiment hereof allows for the adjustment to the stereoscopic effect offered by the 3D image signal.

[5] Fifth Embodiment

Now referring to FIGS. 52 to 55, a fifth embodiment of the invention will be described.

Figure 52:
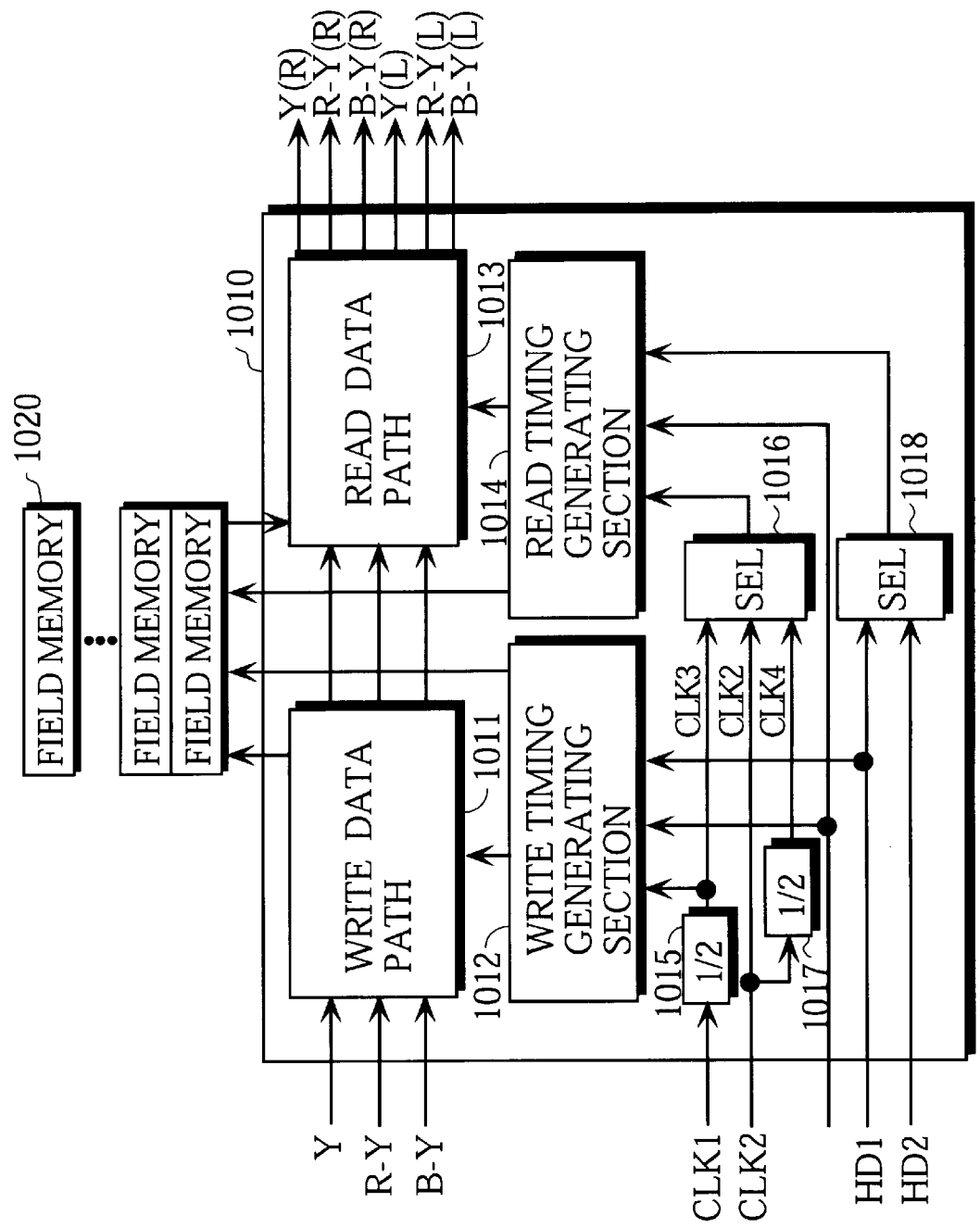
FIG. 52 is a block diagram showing a construction of a 2D/3D image converter according to the invention.

FIG. 52 is a block diagram showing a construction of a 2D/3D image converter of this embodiment.

The 2D/3D image converter includes an integrated circuit (LSI) 1010 for converting 2D images into 3D images, and a plurality of delay field memories 1020 connected to the integrated circuit 1010.

FIG. 52 illustrates only a part of the integrated circuit 1010 components that is involved in the writing of data to and the reading of data from the delay field memories 1020. More specifically, there are shown a write data path 1011, a write timing generating section 1012, a read data path 1013 and a read timing generating section 1014 as the components of the integrated circuit 1010. Besides these components, the integrated circuit 1010 includes a motion vector detecting section, an interface connected to a CPU and the like.

The integrated circuit 1010 is supplied with a luminance signal (Y signal) and color difference signals (R-Y and B-Y signals), which signals compose the 2D image signal. The integrated circuit 1010 outputs the right-eye image signal and the left-eye image signal which have time difference relatively from each other. The right-eye image signal is composed of a right-eye luminance signal Y(R) and right-eye color difference signals R-Y(R) and B-Y(R) whereas the left-eye image signal is composed of a left-eye luminance signal Y(L) and left-eye color difference signals R-Y(L) and B-Y(L).

The 2D/3D image converter has three 2D/3D image conversion modes.

(1) First Normal Mode

The first normal mode is arranged such that the 3D image signal having the same horizontal and vertical frequencies with the 2D image signal is generated based on the 2D image signal which has either one of the right-eye image signal and the left-eye image signal thereof supplied to the read data path 1013 without using the field memories.

(2) Second Normal Mode

The second normal mode is arranged such that the 3D image signal having the same horizontal and vertical frequencies with the 2D image signal is generated based on the 2D image signal which has both the right-eye image signal and the left-eye image signal thereof supplied to the read data path 1013 via the field memories.

(3) Double Speed Mode

The double speed mode is arranged so as to generate the 3D image signal, a horizontal and a vertical frequency of which are twice the respective frequencies of the 2D image signal. In this case, the 3D image signal is generated based on the 2D image signal which has both the right-eye image signal and the left-eye image signal thereof supplied to the read data path 1013 via the field memories.

The integrated circuit 1010 is supplied with a first reference clock signal CLK1 generated based on the horizontal synchronizing signal HSYNC of the 2D image signal, a second reference clock signal CLK2 generated based on the horizontal synchronizing signal HSYNC of the 2D image signal, a vertical synchronizing signal VSYNC of the 2D image signal, a first horizontal synchronizing signal HD1 generated based on the horizontal synchronizing signal HSYNC of the 2D image signal as timed to the first reference clock signal CLK1, and a second horizontal synchronizing signal HD2 generated based on the horizontal synchronizing signal HSYNC of the 2D image signal as timed to the second reference clock signal CLK2.

Figure 53:
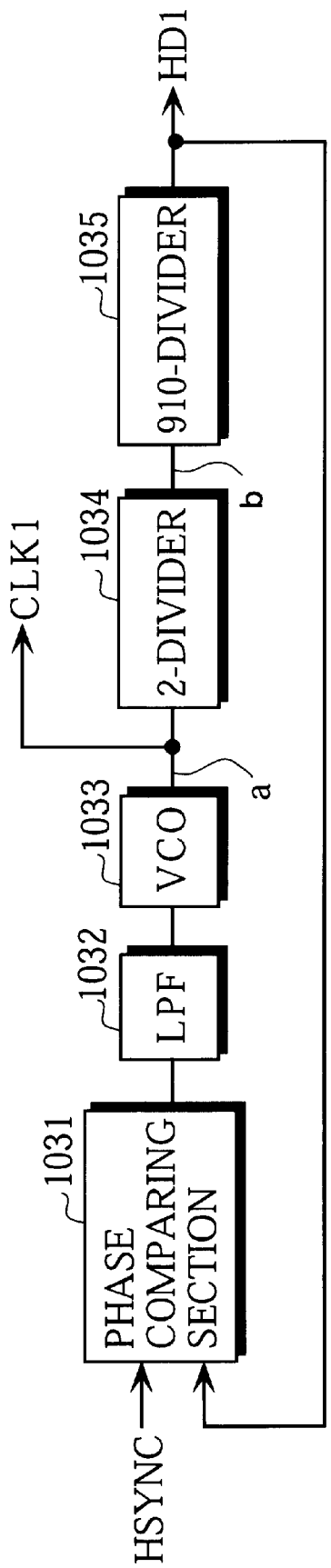
FIG. 53 is an electrical circuit diagram showing a configuration of a phase synchronizing circuit for generating a first reference clock CLK and a first horizontal synchronizing signal HD1.

FIG. 53 diagrammatically illustrates a phase-locked circuit (PLL circuit) for generating the first reference clock signal CLK1 and the first horizontal synchronizing signal HD1.

An input to the phase-locked circuit is the horizontal synchronizing signal HSYNC of the 2D image signal whereas an output of the phase-locked circuit is the first horizontal synchronizing signal HD1. A result of comparison between the horizontal synchronizing signal HSYNC as the input to the phase-locked circuit and the first horizontal synchronizing signal HD1 as the output from the phase-locked circuit is converted into voltage by a phase comparing section 1031. An output voltage from the phase comparing section 1031 is smoothed by a low-pass filter (LPF) 1032 before supplied to a voltage-controlled oscillator (VOC) 1033. The voltage-controlled oscillator 1033 outputs a signal at a frequency depending upon an incoming voltage.

An output (signal a) from the voltage-controlled oscillator 1033 is fetched as the first reference clock signal CLK1 and applied to a 2-divider circuit 1034. The 2-divider circuit 1034 outputs a signal "b", a frequency of which is reduced to half of that of the output signal "a" of the voltage-controlled oscillator 1033. The output signal "b" of the 2-divider circuit 1034 is applied to a 910-divider circuit 1035 which, in turn, outputs the signal HD1 having a frequency reduced to 1/910 of that of the output signal "b" of the 2-divider circuit 1035.

When a phase difference between the input and the output of the phase-locked circuit is zero, the output signal (the first reference clock signal CLK1) of the voltage-controlled oscillator 1033 has a frequency $f_{CLK1}$ (15.75[kHz]) which is 1820 times the frequency $f_H$ of the horizontal synchronizing signal HSYNC. That is, the frequency $f_{CLK1}$ of the first reference clock signal CLK1 is at 1820 $f_H$, or about 28.6 [MHz].

The first reference clock signal CLK1 is obtained by dividing one period of the horizontal synchronizing signal HSYNC of the 2D image signal into 1820 clocks. In a case where a VTR reproduces an image from the 2D image signal, the horizontal synchronizing signal HSYNC may be varied in the frequency. The frequency of the first reference clock signal CLK1 varies according to the variations in the frequency of the horizontal synchronizing signal HSYNC.

The second reference clock signal CLK2 and the second horizontal synchronizing signal HD2 are generated by a similar phase-locked circuit to that shown in FIG. 53. When the phase difference between the input and output of the phase-locked circuit is zero, the second reference clock signal CLK2 has a frequency $f_{CLK2}$ (15.75 [kHz]) which is 1820 times the frequency $f_H$ of the horizontal synchronizing signal HSYNC. That is, the frequency of the second reference clock signal CLK2 is at 1820 $f_H$, or about 28.6 [Mhz].

In the phase-locked circuit for generating the second reference clock signal CLK2 and the second horizontal synchronizing signal HD2, a low-pass filter (LPF) has a cutoff frequency set to a lower value than that of the low-pass filter (LPF) 1032 shown in FIG. 53. Therefore, the second reference clock signal CLK2 is less susceptible to frequency variations if the horizontal synchronizing signal HSYNC is varied in frequency.

As shown in FIG. 52, the frequency of the first reference clock signal CLK1 is divided into a half by the 2-divider circuit 1015. Outputted from the 2-divider circuit 1015, a third clock signal CLK3 is supplied to the write timing generating section 1012 and to a first selector 1016. The third clock signal CLK3 has a frequency $f_{CLK3}$ which is half the frequency $f_{CLK1}$ of the first reference clock signal CLK1.

The reference clock signal CLK2 is supplied to the first selector 1016 as well as to a 2-divider circuit 1017. Outputted from the 2-divider circuit 1017, a fourth clock signal CLK4 is supplied to the first selector 1016. The fourth clock signal CLK4 has a frequency $f_{CLK4}$ which is half the frequency $f_{CLK2}$ of the second reference clock signal CLK2.

The vertical synchronizing signal VSYNC is supplied to the write timing generating section 1012 and the read timing generating section 1014. The first horizontal synchronizing signal HD1 is supplied to the write timing generating section 1012 and a second selector 1018. The second horizontal synchronizing signal HD2 is supplied to the second selector 1018.

The first selector 1016 selects one from the third clock signal CLK3, the second reference clock signal CLK2 and the fourth clock signal CLK4 according to a set mode for 2D/3D image conversion and applies the selected signal to the read timing section 1014.

The second selector 1018 selects either one of the first horizontal synchronizing signal HD1 and the second horizontal synchronizing signal HD2 according to set mode for 2D/3D image conversion and applies the selected signal to the read timing generating section 1014.

In the case of the first normal mode for 2D/3D image conversion, the first selector 1016 selectively supplies the third clock signal CLK3 to the read timing section 1014. In this case, the third clock signal CLK3, which is the first reference clock signal CLK1 divided into a half, is used as the write clock and read clock for the field memories 1020. Accordingly, the integrated circuit 1010 operates the same way as the integrated circuit 1100 shown in FIG. 55.

In the case of the second normal mode for 2D/3D image conversion, the first selector selectively supplies the fourth clock signal CLK4 to the read timing generating section 1014. In this case, the third clock signal CLK3, which is the first reference clock divided into a half, is used as the write clock for the field memories 1020 whereas the fourth clock signal CLK4, which is the second reference clock signal CLK2 divided into a half, is used as the read clock for the field memories 1020. Accordingly, if the horizontal synchronizing signal HSYNC of the 2D image signal is varied in frequency, jitter may be accommodated.

In the case of the double speed mode for 2D/3D image conversion, the first selector 1016 selectively supplies the second reference clock signal CLK2 to the read timing generating section 1014. In this case, the third clock signal CLK3, which is the first reference clock signal CLK1 divided into a half, is used as the write clock for the field memories 1020 whereas the second reference clock signal CLK2 is used as the read clock for the field memories 1020.

More specifically, when the 2D/3D image conversion is performed in the double speed mode, the read clock for the field memories 1020 has a frequency twice the frequency of the write clock. Accordingly, the integrated circuit 1010 outputs the 3D image signal, a horizontal and a vertical frequency of which are twice as great as those of the 2D image signal. Additionally, if the horizontal synchronizing signal HSYNC of the 2D image signal is varied in frequency, the jitter may be accommodated.

Figure 54:
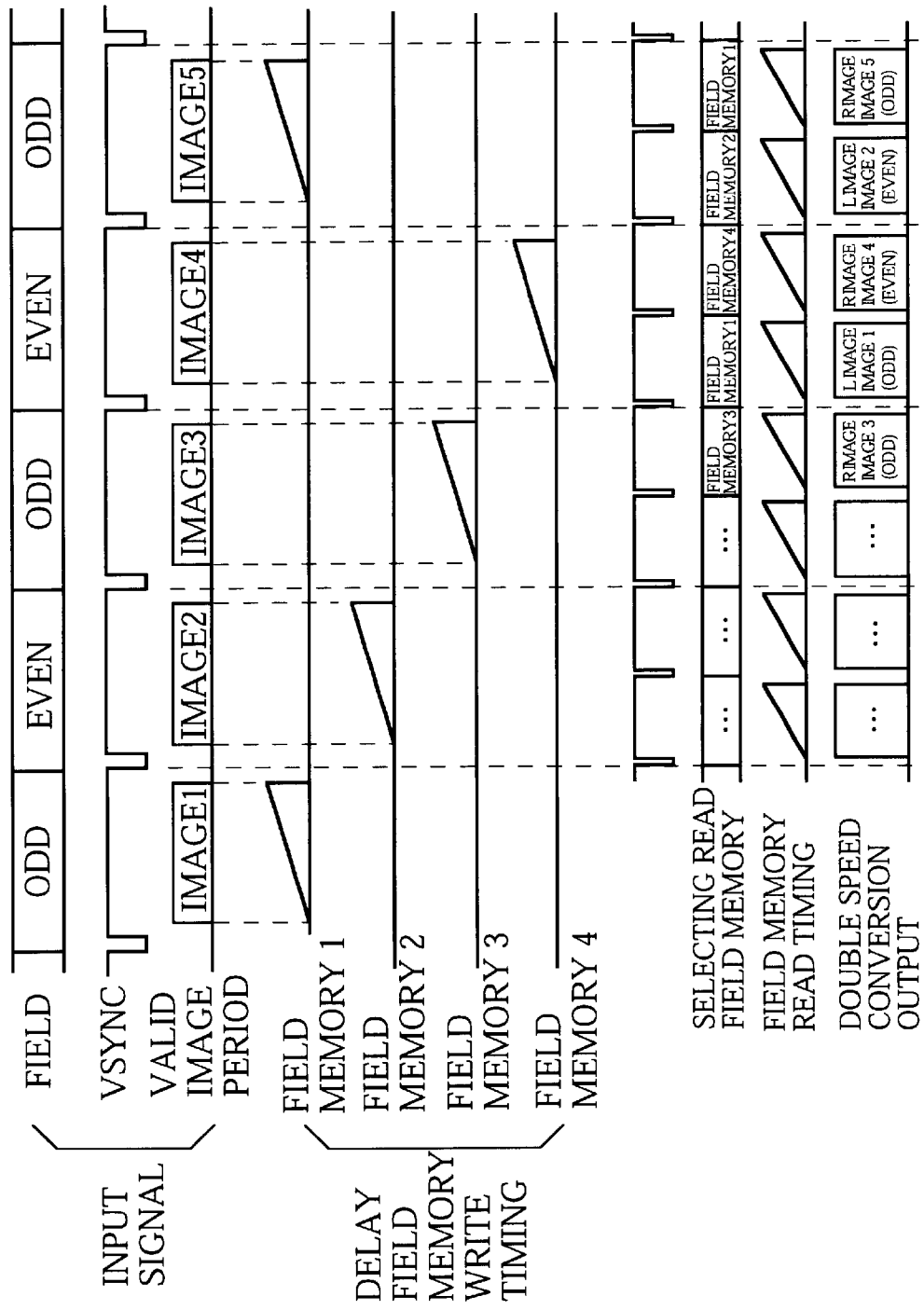
FIG. 54 is a timing chart showing signals in respective parts of FIG. 51 in a double speed conversion mode as a mode of converting the 2D image into the 3D image.

FIG. 54 is a timing chart showing signals in respective parts of the 2D/3D image converter in the double speed mode. It is to be noted that FIG. 54 shows an example wherein four delay field memories are provided and the left-eye image signal is delayed from the right-eye image signal by two fields.

Figure 55:
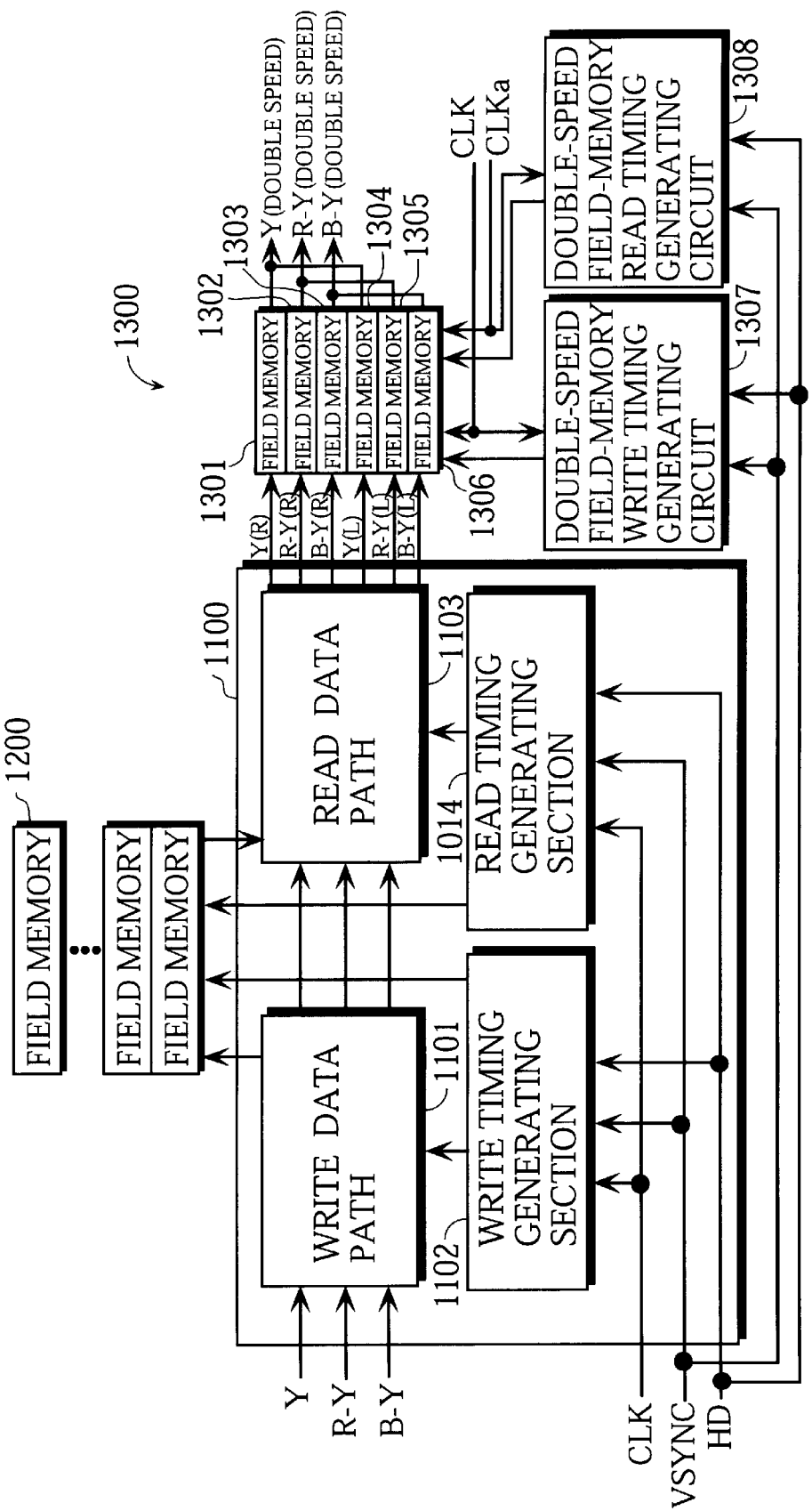
FIG. 55 is a block diagram showing a construction of a prior-art 2D/3D image converter for generating a double-speed 3D image signal from the 2D image signal.
Figure 56:
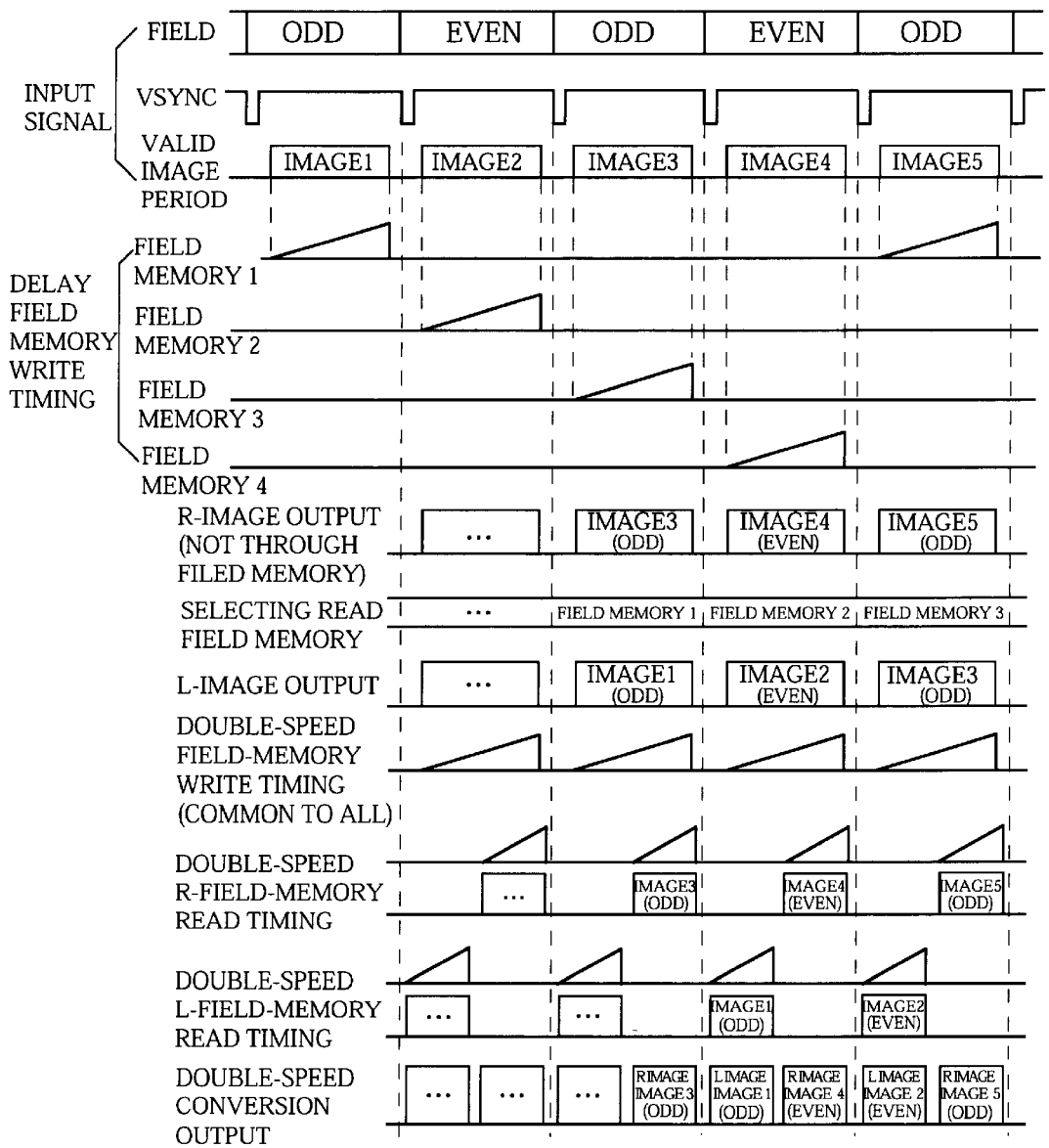
FIG. 56 is a timing chart showing signals in respective parts in FIG. 55.

Unlike the prior-art 2D/3D image converter shown in FIG. 55, the image converter of this embodiment negates the need for a doubling circuit, thus accomplishing a simplified circuit configuration and cost reduction.

What is claimed is:

1. An apparatus for converting two-dimensional images into three-dimensional images comprising:

characteristic value extracting means for extracting, from an inputted two-dimensional image signal, a perspective image characteristic value of each of plural parallax calculation regions defined in a one-field screen on a field-by-field basis;

parallax information generating means for generating parallax information on each of predetermined unit areas in the one-field screen by using the image characteristic value extracted per parallax calculation region; and phase control means for generating a first image signal and a second image signal from a signal of the inputted two-dimensional image signal which resides in each predetermined unit area, the first and second image signals having a horizontal phase difference therebetween based on the parallax information related to the predetermined unit area;

the parallax information generating means includes:
first means for dividing all the parallax calculation regions in the one-field screen into groups associated with respective objects included in the one-field screen by using the perspective image characteristic value of each parallax calculation region;

second means for generating perspective image information per group by using grouping results given by the first means and the perspective image characteristic value of each parallax calculation region;

third means for generating perspective image information per parallax calculation region by using the perspective image information per group; and fourth means for converting the perspective image information per parallax calculation region into parallax information per parallax calculation region.

2. An apparatus for converting the two-dimensional images into the three-dimensional images as set forth in claim 1, wherein the first means divides all the regions in the one-field screen into groups based on a histogram showing a number of parallax calculation regions for each perspective image characteristic value, each group including parallax calculation regions with perspective image characteristic values close to one another.

3. An apparatus for converting the two-dimensional images into the three-dimensional images as set forth in claim 1, wherein the first means includes:

means for dividing all the regions in the one-field screen into groups based on a histogram showing a number of parallax calculation regions for each perspective image characteristic value, each group including parallax calculation regions with perspective image characteristic values close to one another; and means which, when a single group includes a plurality of regions spatially separated from each other, divides the spatially separated regions into different groups.

4. An apparatus for converting the two-dimensional images into the three-dimensional images as set forth in claim 1, wherein the first means includes:

means for dividing all the regions in the one-field screen into groups based on a histogram showing a number of parallax calculation regions for each perspective image characteristic value, each group including parallax calculation regions with perspective image characteristic values close to one another;

means which, when a single group includes a plurality of regions spatially separated from each other, divides the spatially separated regions into different groups; and means which, when there is a group including a predetermined number of parallax calculation regions or fewer, checks perspective image characteristic values of the parallax calculation regions of the group and parallax calculation regions adjacent to the group to determine whether or not to combine the group with any one of neighboring groups, and combines the group with the neighboring group when the group is determined to be combined therewith.

5. An apparatus for converting the two-dimensional images into the three-dimensional images as set forth in claim 1, wherein the first means includes:

means for dividing all the regions of the one-field screen into groups based on a histogram showing a number of parallax calculation regions for each perspective image characteristic value, each group including parallax calculation regions with perspective image characteristic values close to one another;

means which, when a single group includes a plurality of regions spatially separated from each other, divides the spatially separated regions into different groups;

means which, when there is a group including a predetermined number of parallax calculation regions or fewer, checks perspective image characteristic values of the parallax calculation regions of the group and parallax calculation regions adjacent to the group to determine whether or not to combine the group with any one of neighboring groups, and combines the group with the neighboring group when the group is determined to be combined therewith; and means which checks perspective image characteristic values of parallax calculation regions of adjacent groups to determine whether to combine them together or not, and combines the two groups together when they are determined to be combined together.

6. An apparatus for converting the two-dimensional images into the three-dimensional images as set forth in claim 1, wherein the second means calculates the perspective image information per group by using the perspective image characteristic value of each parallax calculation region of each group and a weighting factor previously defined for each parallax calculation region.

7. An apparatus for converting the two-dimensional images into the three-dimensional images as set forth in claim 1, wherein the third means includes means for correcting a perspective image information piece on a parallax calculation region which is included in a group of parallax calculation regions located vertically lower in screen than a parallax calculation region having a perspective image information piece indicative of the nearest perspective position and which has a perspective image information piece indicative of a perspective position a predetermined value or more farther from a perspective position indicated by a perspective image information piece on a parallax calculation region immediately thereabove, the perspective image information piece on the former parallax calculation region being corrected to indicate a closer perspective position to that indicated by the perspective image information piece on the latter parallax calculation region.

8. An apparatus for converting the two-dimensional images into the three-dimensional images as set forth in claim 1, wherein the third means includes:

means for correcting a perspective image information piece on a parallax calculation region which is included in a group of parallax calculation regions located vertically lower in screen than a parallax calculation region having a perspective image information piece indicative of the nearest perspective position and which has a perspective image information piece indicative of a perspective position a predetermined value or more farther from a perspective position indicated by a perspective image information piece on a parallax calculation region immediately thereabove, the perspective image information piece on the former parallax calculation region being corrected to indicate a closer perspective position to that indicated by the perspective image information piece on the latter parallax calculation region; and means for correcting perspective image information pieces on respective pairs of parallax calculation regions included in adjacent groups and defining a boundary portion therebetween, thereby to limit a difference between the perspective image information pieces on the respective pairs within a predetermined range.

9. An apparatus for converting the two-dimensional images into the three-dimensional images as set forth in claim 1, wherein the third means includes:

means for correcting a perspective image information piece on a parallax calculation region which is included in a group of parallax calculation regions located vertically lower in screen than a parallax calculation region having a perspective image information piece indicative of the nearest perspective position and which has a perspective image information piece indicative of a perspective position a predetermined value or more farther from a perspective position indicated by a perspective image information piece on a parallax calculation region immediately thereabove, the perspective image information piece on the former parallax calculation region being corrected to indicate a closer perspective position to that indicated by the perspective image information piece on the latter parallax calculation region;

means for correcting perspective image information pieces on respective pairs of parallax calculation regions included in adjacent groups and defining a boundary portion therebetween thereby to limit a difference between the perspective image information pieces on the respective pairs within a predetermined range; and means for smoothing perspective image information pieces on parallax calculation regions of the same group thereby to limit a difference in the perspective image information pieces thereon within a predetermined range.

10. An apparatus for converting the two-dimensional images into the three-dimensional images as set forth in claim 1, wherein the phase control means includes:

first storage means having a capacity to store the two-dimensional image signal representing up to the number of pixels included in one horizontal line and temporarily storing the two-dimensional image signal;

second storage means having a capacity to store the two-dimensional image signal representing up to the number of pixels included in one horizontal line and temporarily storing the two-dimensional image signal;

first read-address control means which controls a read address of the first storage means relatively to a standard read address decided based on a horizontal/vertical position of the inputted two-dimensional image signal according to the parallax information related to the predetermined unit area which includes a horizontal/vertical position of the inputted two-dimensional image signal, thereby generating the first image signal a horizontal phase of which leads from a reference horizontal phase defined by said standard read address by a value based on said parallax information; and second read-address control means which controls a read address of the second storage means relatively to said standard read address according to the parallax information related to the predetermined unit area which includes the horizontal/vertical position of the inputted two-dimensional image signal, thereby generating the second image signal a horizontal phase of which lags from the reference horizontal phase defined by said standard read address by a value based on said parallax information.

11. An apparatus for converting the two-dimensional images into the three-dimensional images as set forth in claim 1, wherein the perspective image characteristic value is an optional one selected from the group consisting of luminance high-frequency component integration value, luminance contrast, luminance integration value, R-Y component integration value, B-Y component integration value and chroma integration value or an optional combination of the above.

12. An apparatus for converting the two-dimensional images into the three-dimensional images as set forth in claim 1, wherein the predetermined unit area is an area consisting of one pixel.

13. A two-dimensional/three-dimensional image converter comprising a plurality of field memories serving to store a predetermined number of fields of an inputted two-dimensional image signal which are earlier than the current field and means for reading, from the plural field memories, respective pairs of image signals having a relative time difference therebetween and outputting one of the image signal pair as a left-eye image signal and the other as a right-eye image signal, the two-dimensional/three-dimensional image converter wherein a read clock for each field memory has a frequency set to twice the frequency of a write clock for the field memory.

* * * * *

UNITED STATES PATENT AND TRADEMARK OFFICE
CERTIFICATE OF CORRECTION

PATENT NO.   : 6,445,833 B1                                             Page 1 of 1
DATED        : September 3, 2002
INVENTOR(S)  : Murata et al.

It is certified that error appears in the above-identified patent and that said Letters Patent is hereby corrected as shown below:

<u>Title page, Item [54] and Column 1, line 1,</u>
Please change the title to:

-- AN APPARATUS AND METHOD FOR CONVERTING 2D IMAGES INTO 3D IMAGES --.

Signed and Sealed this

Seventeenth Day of June, 2003

JAMES E. ROGAN
*Director of the United States Patent and Trademark Office*